(12) United States Patent
Hori

(10) Patent No.: US 8,965,103 B2
(45) Date of Patent: Feb. 24, 2015

(54) IMAGE PROCESSING APPARATUS AND IMAGE PROCESSING METHOD

(75) Inventor: Fumio Hori, Tokyo (JP)

(73) Assignee: Olympus Corporation, Tokyo (JP)

( * ) Notice: Subject to any disclaimer, the term of this patent is extended or adjusted under 35 U.S.C. 154(b) by 187 days.

(21) Appl. No.: 12/837,944

(22) Filed: Jul. 16, 2010

(65) Prior Publication Data

US 2011/0013846 A1 Jan. 20, 2011

(30) Foreign Application Priority Data

Jul. 16, 2009 (JP) ................ P2009-168012
Jul. 31, 2009 (JP) ................ P2009-179323

(51) Int. Cl.
*G06K 9/00* (2006.01)
*G06T 7/00* (2006.01)

(52) U.S. Cl.
CPC ....... *G06T 7/001* (2013.01); *G06T 2207/30164* (2013.01)
USPC .......................................... 382/152; 382/100

(58) Field of Classification Search
None
See application file for complete search history.

(56) References Cited

U.S. PATENT DOCUMENTS

| | | | |
|---|---|---|---|
| 4,562,831 A * | 1/1986 | Murakoshi et al. ........... 600/109 |
| 4,891,697 A * | 1/1990 | Saito et al. ................. 348/71 |
| 5,966,168 A * | 10/1999 | Miyazaki ................... 348/68 |
| 6,063,023 A | 5/2000 | Sakiyama et al. |
| 6,539,106 B1 | 3/2003 | Gallarda et al. |
| 6,583,883 B2 | 6/2003 | Egelhof |
| 7,064,811 B2 | 6/2006 | Twerdochlib |
| 7,337,058 B1 | 2/2008 | Mylaraswamy et al. |
| 7,564,626 B2 | 7/2009 | Bendall et al. |
| 7,574,035 B2 | 8/2009 | Koonankeil |
| 7,796,801 B2 | 9/2010 | Kitamura et al. |
| 2003/0167616 A1 | 9/2003 | Harding et al. |
| 2004/0066964 A1 | 4/2004 | Neubauer et al. |
| 2004/0068884 A1 | 4/2004 | Jones et al. |
| 2004/0183900 A1 | 9/2004 | Karpen et al. |
| 2005/0117017 A1 | 6/2005 | Baer |
| 2006/0078193 A1 | 4/2006 | Brummel et al. |
| 2006/0181686 A1* | 8/2006 | Matsuda .......................... 353/69 |

(Continued)

FOREIGN PATENT DOCUMENTS

JP 56060843 A 5/1981
JP 64025835 A 1/1989

(Continued)

OTHER PUBLICATIONS

U.S. Office Action dated Sep. 19, 2012 issued in corresponding U.S. Appl. No. 12/847,733.

(Continued)

*Primary Examiner* — Asfand Sheikh
(74) *Attorney, Agent, or Firm* — Scully, Scott, Murphy & Presser, P.C.

(57) ABSTRACT

An image processing apparatus includes: an image processing apparatus comprising: a template image extracting section that extracts a template image from blade images obtained by capturing blades periodically arrayed in a jet engine; an image comparing section that compares the template image with the blade images; an image selecting section that selects an image from the blade images based on a result of the image comparison of the image comparing section; and a first difference extracting section that extracts a difference between the template image and the image selected by the image selecting section.

6 Claims, 52 Drawing Sheets

(56) References Cited

U.S. PATENT DOCUMENTS

| | | |
|---|---|---|
| 2008/0158556 A1 | 7/2008 | Bendall et al. |
| 2009/0092278 A1 | 4/2009 | Doi et al. |
| 2009/0158315 A1 | 6/2009 | Bendall et al. |
| 2009/0266160 A1 | 10/2009 | Jeffrey et al. |
| 2011/0013846 A1 | 1/2011 | Hori |
| 2011/0026805 A1 | 2/2011 | Hori |

FOREIGN PATENT DOCUMENTS

| | | |
|---|---|---|
| JP | 05065173 U | 8/1993 |
| JP | 06231254 A | 8/1994 |
| JP | 07113749 A | 5/1995 |
| JP | 10-248806 | 9/1998 |
| JP | 2000259832 A | 9/2000 |
| JP | 2001128982 A | 5/2001 |
| JP | 2001-275934 | 10/2001 |
| JP | 2003093339 A | 4/2003 |
| JP | 2004-049638 | 2/2004 |
| JP | 2004135929 A | 5/2004 |
| JP | 2005-055756 | 3/2005 |
| JP | 2005204724 A | 8/2005 |
| JP | 2005348870 A | 12/2005 |
| JP | 2006046959 A | 2/2006 |
| JP | 2006187385 A | 7/2006 |
| JP | 2007047930 A | 2/2007 |
| JP | 2007-163723 | 6/2007 |
| JP | 2007180933 A | 7/2007 |
| JP | 2008292405 A | 12/2008 |
| JP | 2009108849 A | 5/2009 |
| JP | 2009168774 A | 7/2009 |

OTHER PUBLICATIONS

U.S. Office Action dated Dec. 12, 2012 issued in corresponding U.S. Appl. No. 12/847,758.
U.S. Office Action dated Mar. 12, 2013 issued in corresponding U.S. Appl. No. 12/847,733.
U.S. Office Action dated Apr. 29, 2013 issued in corresponding U.S. Appl. No. 12/847,758.
European Search Report issued Oct. 27, 2010 in corresponding European Application No. EP10007398.
Notice of Allowance dated Oct. 23, 2013 from related U.S. Appl. No. 12/847,733.
Notice of Reasons for Rejection dated Jun. 4, 2013 received in corresponding Application No. 2009-205336 together with an English Language Translation.
Notice of Reasons for Rejection dated Jun. 18, 2013 received in corresponding Application No. 2009-179323 together with an English Language Translation.
Notice of Reasons for Rejection dated Jul. 2, 2013 received in corresponding Application No. 2009-205337 together with an English Language Translation.
Notice of Reasons for Rejection dated Jul. 23, 2013 received in corresponding Application No. 2009-205338 together with an English Language Translation.
U.S. Office Action dated Sep. 26, 2013 from related U.S. Appl. No. 12/847,758.

* cited by examiner

| SAVE FOLDER No | RECORD START DATE AND TIME | FOLDER NAME |
|---|---|---|
| 1 | 2007/12/26 21:32:21 | 20071226_213221 |
| 2 | 2007/12/25 08:09:43 | 20071225_080943 |
| 3 | 2007/12/23 15:12:29 | 20071223_151229 |
| ... | ... | ... |
| ... | ... | ... |
| ... | ... | ... |
| ... | ... | ... |
| 24 | 2007/05/30 13:47:43 | 20070530_134743 |

FIG. 10

IMAGE FILE LIST OF SAVE FOLDER "20071226_213221"

| IMAGE FILE No | FILE SAVE DATE AND TIME | FILE NAME |
|---|---|---|
| 1 | 2007/12/26 21:32:32 | 001. jpg |
| 2 | 2007/12/26 21:32:45 | 002. jpg |
| 3 | 2007/12/26 21:32:56 | 003. jpg |
| 4 | 2007/12/26 21:33:07 | 004. jpg |
| 5 | 2007/12/26 21:32:21 | Temp. jpg |

IMAGE FILE LIST OF SAVE FOLDER "20071225_080943"

| IMAGE FILE No | FILE SAVE DATE AND TIME | FILE NAME |
|---|---|---|
| 1 | 2007/12/25 08:09:44 | 001. jpg |
| 2 | 2007/12/25 08:09:55 | 002. jpg |
| ... | ... | ... |
| ... | ... | ... |
| ... | ... | ... |
| ... | ... | ... |
| 19 | 2007/12/25 08:11:23 | 019. jpg |
| 20 | 2007/12/25 08:11:34 | 020. jpg |
| 21 | 2007/12/25 08:09:43 | Temp. jpg |

⋮

IMAGE FILE LIST OF SAVE FOLDER "20070530_134743"

| IMAGE FILE No | FILE SAVE DATE AND TIME | FILE NAME |
|---|---|---|
| 1 | 2007/05/30 13:47:54 | 001. jpg |
| 2 | 2007/05/30 13:47:05 | 002. jpg |
| ... | ... | ... |
| ... | ... | ... |
| ... | ... | ... |
| ... | ... | ... |
| 24 | 2007/05/30 13:50:03 | 019. jpg |
| 25 | 2007/05/30 13:50:14 | 020. jpg |
| 26 | 2007/05/30 13:47:43 | Temp. jpg |

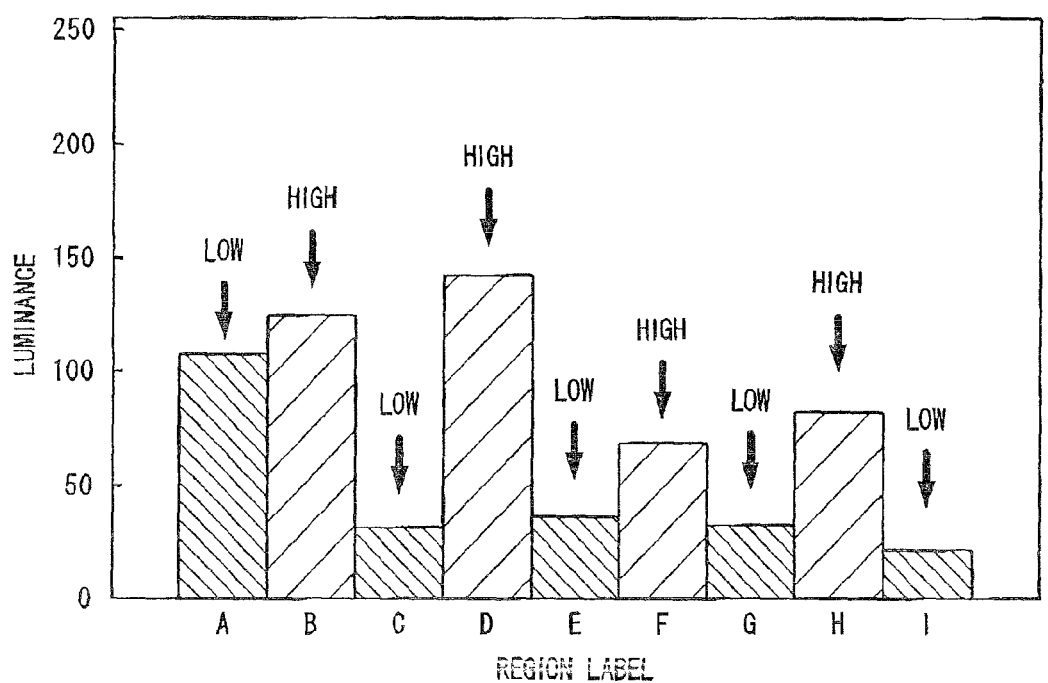

IMAGE PROCESSING APPARATUS AND IMAGE PROCESSING METHOD

BACKGROUND OF THE INVENTION

1. Field of the Invention

The present invention relates to an image processing apparatus and an image processing method.

Priority is claimed on Japanese Patent Application Nos. 2009-168012 filed on Jul. 16, 2009 and 2009-179323 filed on Jul. 31, 2009, the content of which is incorporated herein by reference.

2. Description of Related Art

Conventionally, in order to inspect blades in a jet engine, the blades are observed using an observation jig, such as an endoscope. For example, a method of detecting defects in blades by imaging the blades sequentially and comparing two sequential images with each other is disclosed in U.S. Patent Application Publication No. 2004/183900. In addition, a method of detecting defects in blades on the basis of the feature amount of known defect pattern is disclosed in Japanese Unexamined Patent Application, First Publication No. 2007-163723.

SUMMARY OF THE INVENTION

According to an aspect of the invention, there is provided an image processing apparatus which includes: a template image extracting section that extracts a template image from blade images obtained by capturing blades periodically arrayed in a jet engine; an image comparing section that compares the template image with the blade images; an image selecting section that selects an image from the blade images based on a result of the image comparison of the image comparing section; and a first difference extracting section that extracts a difference between the template image and the image selected by the image selecting section.

BRIEF DESCRIPTION OF THE DRAWINGS

FIG. 10 is a reference view showing an image file list according to the first embodiment of the invention;

FIGS. 36A to 36F are reference views for explaining defect designation processing according to the second embodiment of the invention;

FIG. 53 is a reference view showing blade region extraction processing according to the third embodiment of the invention;

FIG. 54 is a reference view showing blade region extraction processing according to the third embodiment of the invention;

FIG. 55 is a graph showing the average luminance of blade regions according to the third embodiment of the invention;

DETAILED DESCRIPTION OF THE INVENTION

Hereinafter, embodiments of the invention will be described with reference to the accompanying drawings.

First Embodiment

Figure 1:
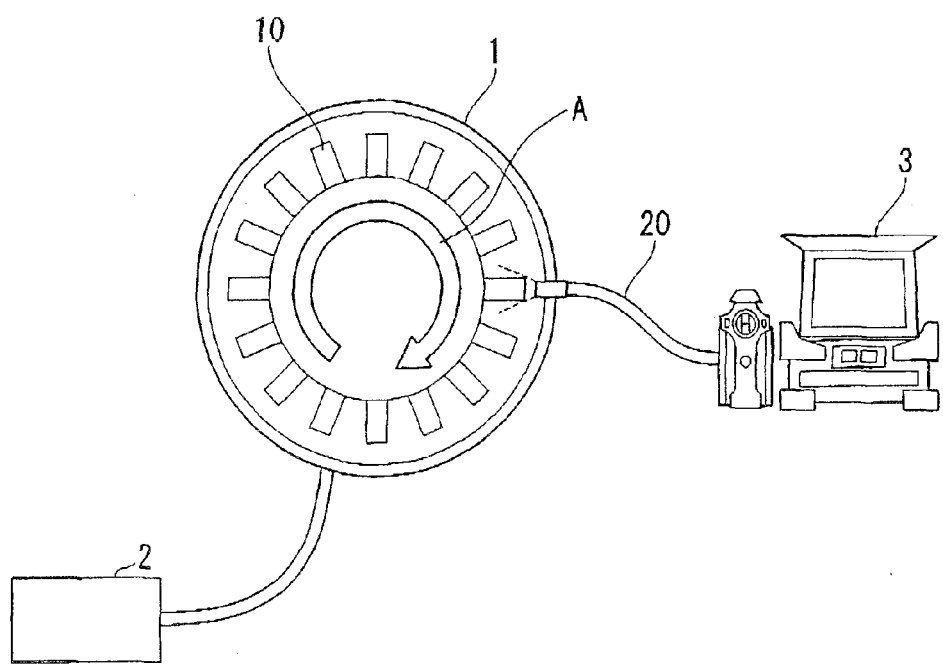
FIG. 1 is a block diagram showing the configuration of a blade inspection system according to a first embodiment of the invention.

First, a first embodiment of the invention will be described. FIG. 1 shows the configuration of a blade inspection system according to the present embodiment. In a jet engine 1, a plurality of turbine blades 10 (or compressor blade) to be inspected are periodically arrayed at predetermined intervals. In addition, a turning tool 2 which rotates the turbine blades 10 in a rotation direction A at the predetermined speed is connected to the jet engine 1. In the present embodiment, the turbine blades 10 are always rotated while an image of the turbine blades 10 is being captured.

In the present embodiment, an endoscope apparatus 3 (corresponding to an image processing apparatus of the invention) is used to acquire the image of the turbine blades 10. An endoscope insertion section 20 of the endoscope apparatus 3 is inserted into the jet engine 1, so that an image of the rotating turbine blades 10 is exported through the endoscope insertion section 20. In addition, blade recording software for recording an image, which is obtained by imaging the turbine blades 10 at the desired angle, is stored in the endoscope apparatus 3.

Figure 2:
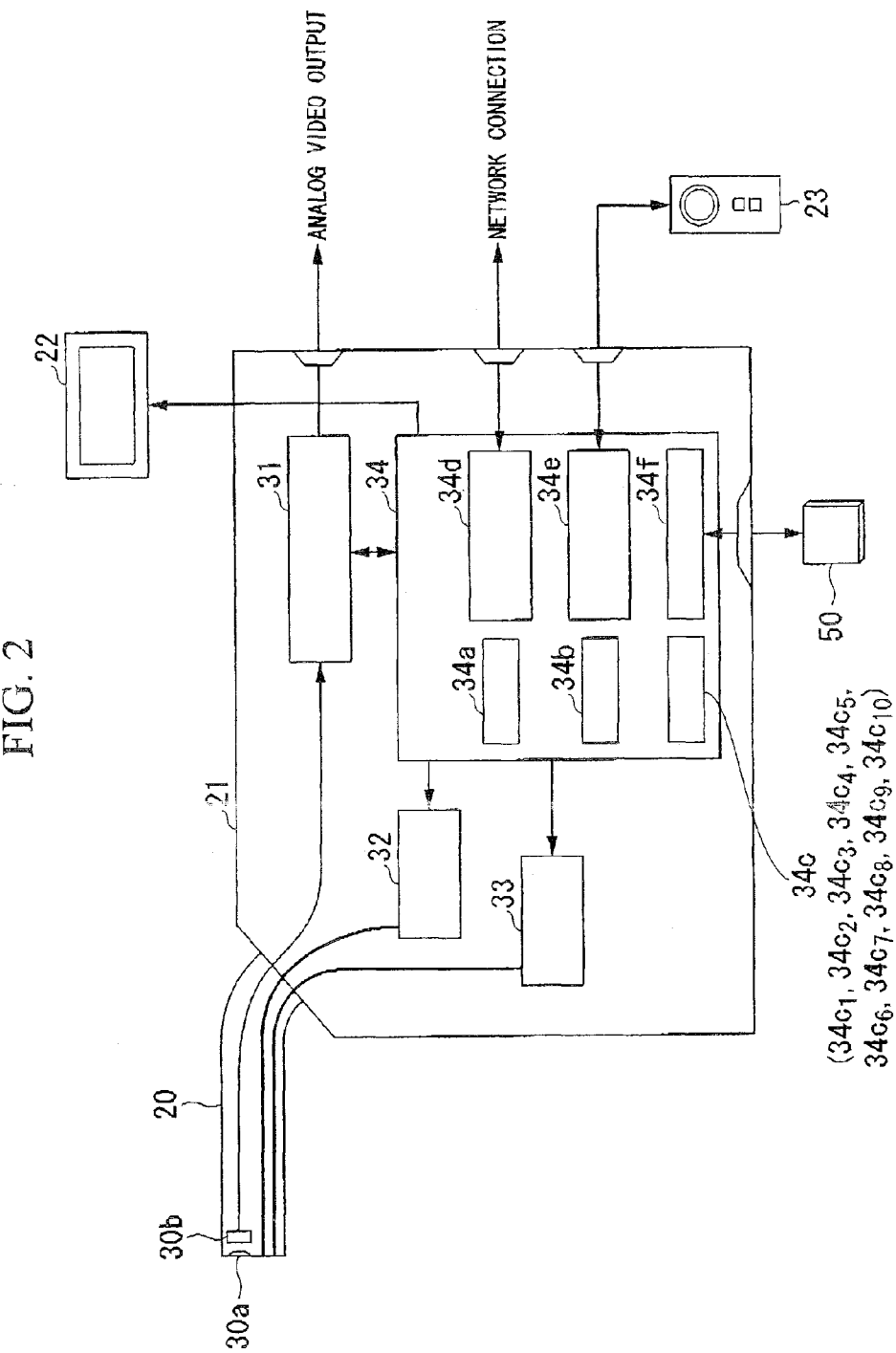
FIG. 2 is a block diagram showing the configuration of an endoscope apparatus included in the blade inspection system according to the first embodiment of the invention.

FIG. 2 shows the configuration of the endoscope apparatus 3. The endoscope apparatus 3 is configured to include the endoscope insertion section 20, an endoscope apparatus body 21, a monitor 22, and a remocon (remote controller) 23. An imaging optical system 30a and an imaging element 30b are provided at the tip of the endoscope insertion section 20. In addition, an image signal processor (CCU) 31, a light source 32, a curve control unit 33, and a computer 34 for control are provided in the endoscope apparatus body 21.

In the endoscope insertion section 20, the imaging optical system 30a condenses light from a subject and forms the subject image on the imaging surface of the imaging element 30b. The imaging element 30b generates an imaging signal by performing photoelectric conversion of the subject image. The imaging signal output from the imaging element 30b is input to the image signal processor 31.

In the endoscope apparatus body 21, the image signal processor 31 converts the imaging signal from the imaging element 30b into a video signal, such as an NTSC signal and supplies the video signal to the computer 34 for control. If necessary, the image signal processor 31 outputs the video signal to the outside as analog video output.

The light source 32 is connected to the tip of the endoscope insertion section 20 through an optical fiber or the like, so that the light source 32 can irradiate the light to the outside. The curve control unit 33 is connected to the tip of the endoscope insertion section 20, so that the curve control unit 33 can curve the tip vertically and horizontally. Control of the light source 32 and the curve control unit 33 is performed by the computer 34 for control.

The computer 34 for control is configured to include a RAM 34a, a ROM 34b, a CPU 34c, a network I/F 34d, an RS232C I/F 34e, and a card IF 34f as external interfaces. The RAM 34a is used to temporarily store the data, such as image information required for software operation. A series of software for controlling the endoscope apparatus 3 is stored in the ROM 34b. Blade recording software, which will be described later, is also stored in the ROM 34b. The CPU 34c executes operations and the like for various kinds of control using the data stored in the RAM 34a according to a command code of software stored in the ROM 34b.

The network I/F 34d is an interface for connection with an external PC using a LAN cable. Through the network I/F 34d, the image information output from the image signal processor 31 can be transmitted to the external PC. The RS232C I/F 34e is an interface for connection with the remocon 23. A user can control various operations of the endoscope apparatus 3 by operating the remocon 23. Various memory cards 50, which are recording media, may be freely mounted in the card I/F 34f or released from the card I/F 34f. If the memory card 50 is mounted, data such as the image information stored in the memory card 50 may be exported or the data such as the image information may be recorded in the memory card 50 by control of the CPU 34c.

Figure 3:
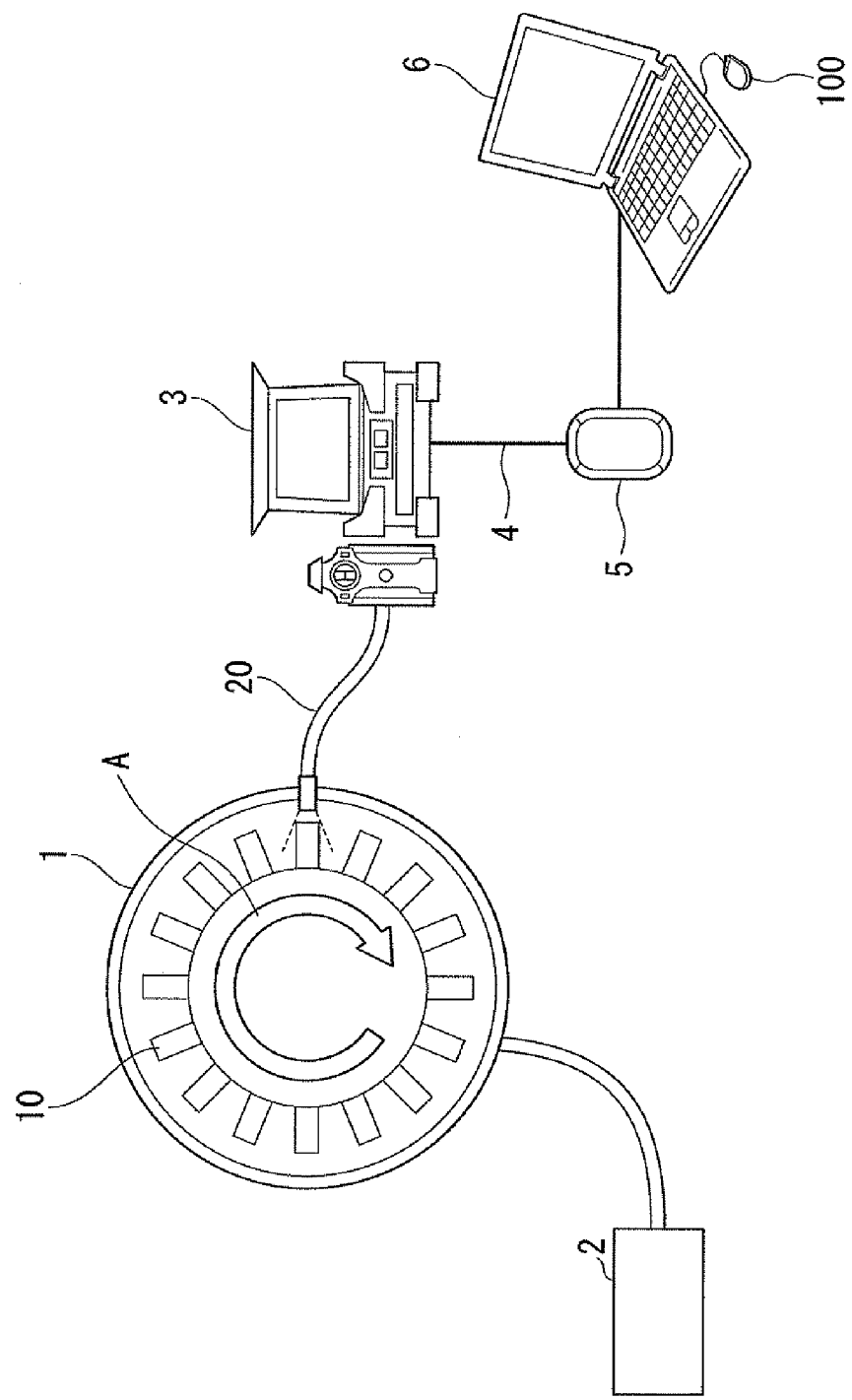
FIG. 3 is a block diagram showing the configuration of a blade inspection system (modification) according to the first embodiment of the invention.

As a modification of the configuration of the blade inspection system in the present embodiment, the configuration shown in FIG. 3 may be used. In this modification, a video terminal cable 4 and a video capture card 5 are connected to the endoscope apparatus 3. By the video terminal cable 4 and the video capture card 5, an image captured by the endoscope apparatus 3 may be exported to a PC 6 (corresponding to the image processing apparatus of the invention). The PC 6 is shown as a notebook PC in FIG. 3, but it may be a desktop PC or the like. In addition, blade recording software for recording an image, which is obtained by imaging the turbine blades 10 at the desired angle, is stored in the PC 6.

Figure 4:
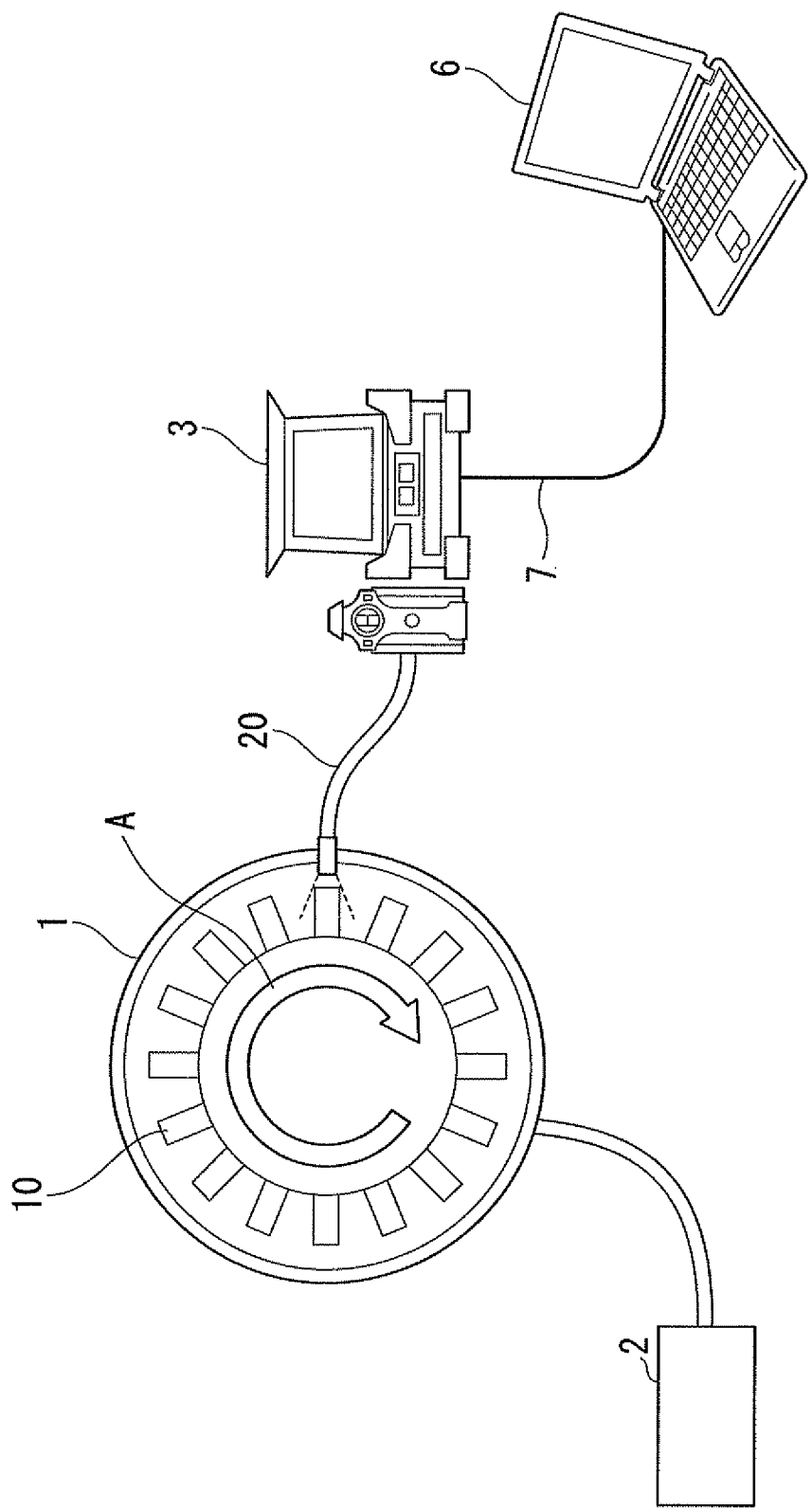
FIG. 4 is a block diagram showing the configuration of a blade inspection system (modification) according to the first embodiment of the invention.

In addition, although the video terminal cable 4 and the video capture card 5 are used to export an image to the PC 6 in FIG. 3, a LAN cable 7 may be used as shown in FIG. 4. The endoscope apparatus 3 includes a network I/F 34d through which the captured image can be loaded on a LAN network. In addition, an image can be exported to the PC 6 through the LAN cable 7.

Figure 5:
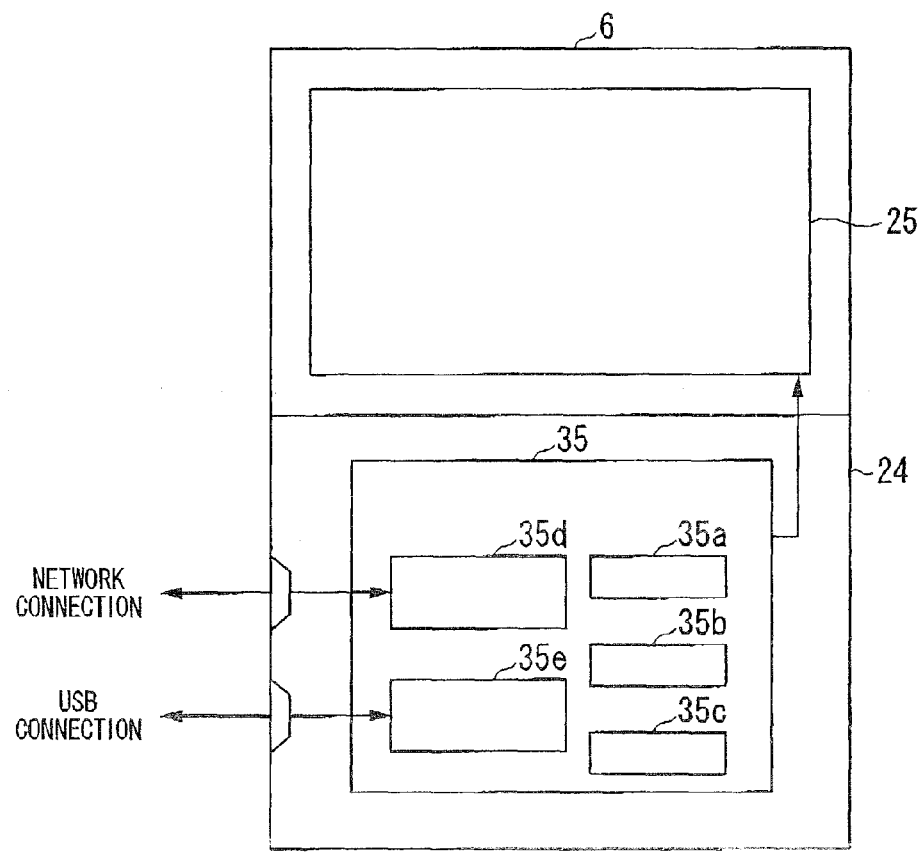
FIG. 5 is a block diagram showing the configuration of a PC included in the blade inspection system (modification) according to the first embodiment of the invention.

FIG. 5 shows the configuration of the PC 6. The PC 6 includes a PC body 24 and a monitor 25. A computer 35 for control is provided in the PC body 24. The computer 35 for control is configured to include a RAM 35a, an HDD (hard disk drive) 35b, a CPU 35c, a network I/F 35d, and a USB I/F 35e as external interfaces. The computer 35 for control is connected to the monitor 25 so that the image information, a software screen, and the like are displayed on the monitor 25.

The RAM 35a is used to temporarily store the data, such as image information required for software operation. A series of software for controlling the endoscope apparatus is stored in the HDD 35b. Blade recording software is also stored in the HDD 35b, Moreover, in the present embodiment, a save folder for saving an image of the turbine blade 10 is set in the HDD 35b. The CPU 35c executes operations and the like for various kinds of control using the data stored in the RAM 35a according to a command code of software stored in the HDD 35b.

The network I/F 35d is an interface for connecting the endoscope apparatus 3 with the PC 6 using the LAN cable 7. Through the network I/F 35d, the image information out put through the LAN cable 7 from the endoscope apparatus 3 can be input to the PC 6. The USB I/F 35e is an interface for connecting the endoscope apparatus 3 with the PC 6 using the video capture card 5. Through the USB I/F 35e, the image information output as analog video from the endoscope apparatus 3 can be input to the PC 6.

In the blade inspection system shown in FIGS. 3 and 4, the same effects as in the blade inspection system shown in FIG. 1 can be obtained. Especially in the case where the performance of the endoscope apparatus is inferior to the performance of the PC and the operation speed or the like of the endoscope apparatus is not enough, the blade inspection system shown in FIGS. 3 and 4 is effective.

Figure 6:
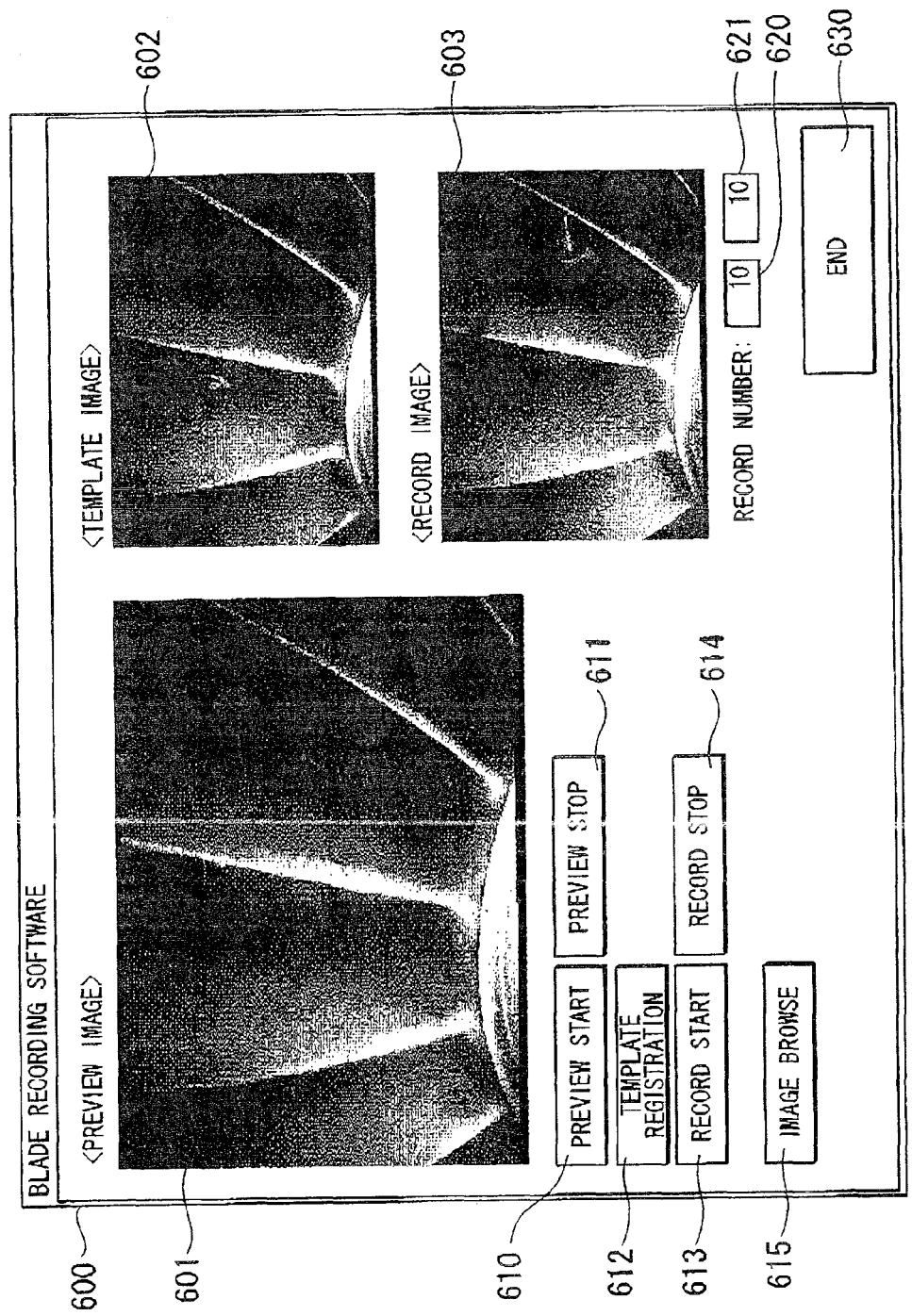
FIG. 6 is a reference view showing a screen of blade recording software according to the first embodiment of the invention.

Next, a screen of blade recording software will be described. FIG. 6 shows a main window of the blade recording software. A main window 600 shown in FIG. 6 is displayed when a user starts the blade recording software.

The main window 600 is displayed according to the control of the CPU 34c. The CPU 34c generates a graphic image signal (display signal) for displaying the main window 600 and outputs the graphic image signal to the monitor 22. Moreover, when displaying images captured by the endoscope apparatus 3 (hereinafter, described as endoscope images) on the main window 600 so that they superimpose each other, the CPU 34c performs a processing of superimposing the image data exported from the image signal processor 31 on the graphic image signal and outputs a signal after the processing (display signal) to the monitor 22.

In addition, when updating a display state of a GUI on the main window 600, the CPU 34c generates a graphic image signal corresponding to the main window 600 after updating and performs the same processing as above. Processing related to the display of windows other than the main window 600 is the same as above. Hereinafter, processing when the CPU 34c generates a graphic image signal in order to display the main window 600 and the like (including update) is described as processing for displaying the main window 600 and the like.

The user can view an endoscope image and save an image file by operating the main window 600 through the remocon 23 using a GUI (graphical user interface) function. Hereinafter, functions of various GUIs will be described.

A [preview image] box 601, a [template image] box 602, and a [record image] box 603 are disposed in the upper part of the main window 600.

The [preview image] box 601 is a box for displaying an endoscope image. If a [preview start] button 610, which will be described later, is pressed when the turbine blades 10 are rotating by the turning tool 2, an endoscope image (image showing that the turbine blades 10 are rotating) is displayed in real time. Thus, the user can view the endoscope image through the [preview image] box 601. Hereinafter, displaying an endoscope image in the [preview image] box 601 is described as a preview.

The [template image] box 602 is a box for displaying a template image. If a [template registration] button 612 to be described later is pressed, an image of one frame captured at that timing among images of respective frames, which form the endoscope image, is displayed as a template image in the [template image] box 602. The template image is an image as a reference when displaying a record image, which will be described later.

The [record image] box 603 is a box for displaying a record image to be described later. After a [record start] button 613 to be described later is pressed, images (hereinafter, described as record images), which are highly correlated with the template image, among images of respective frames that form the endoscope image are sequentially displayed. The record images displayed in the [record image] box 603 are sequentially saved as image files in a save folder in the memory card 50.

Hereinafter, the image file saved here is described as a record image file. In addition, saving the record image files in the save folder in the memory card 50 is described as a record hereinbelow. Details of the save folder will be described later.

The [preview start] button 610 is a button for starting the display of an endoscope image in the [preview image] box 601. A [preview stop] button 611 is a button for stopping the display of an endoscope image in the [preview image] box 601.

The [template registration] button 612 is a button for registering a desired image as a template image. If the [template registration] button 612 is pressed, an image of one frame captured at that timing among images of respective frames, which form the endoscope image, is displayed as a template image in the [template image] box 602. In addition, the image of one frame is recorded as a template image in the RAM 34a. An operation until the image of one frame is recorded as a template image in the RAM 34a after the [template registration] button 612 is pressed is performed by a template extracting section $34c_1$ of the CPU 34c.

The [record start] button 613 is a button for starting record. If the [record start] button 613 is pressed, the value of a [record number] box 620, which will be described later, is reset to 0. Then, the endoscope image and the template image are compared with each other for every frame and the record image of one frame, which are highly correlated with the template image, among the images of respective frames which form the endoscope image are displayed sequentially in the [record image] box 603. Moreover, the displayed record images are sequentially saved as image files in a save folder in the memory card 50. The comparison between the endoscope image and the template image is performed for every frame and the record image of one frame, which are highly correlated with the template image, are displayed sequentially in the [record image] box 603. Here, among the operations in which the displayed record images are being saved sequentially as image files in the save folder in the memory card 50, an operation of comparing an endoscope image with a template image is performed by an image comparing section $34c_2$ of the CPU 34c and the subsequent operation is performed by an image selecting section $34c_3$.

More specifically, the image of one frame when the position or angle of the turbine blade 10 in the endoscope image becomes equal to that of the turbine blade 10 in the template image (simply speaking, when the turbine blade 10 in the endoscope image and the turbine blade 10 in the template image are viewed in the same way) are displayed and saved.

A [record stop] button 614 is a button for stopping record. An [image browse] button 615 is a button for browsing an image file saved in the save folder in the memory card 50. If the [image browse] button 615 is pressed, an [image browse] window, which will be described later, is displayed. While the [image browse] window is being displayed, a user operation on the main window 600 is invalid.

The [record number] box 620 is a box for displaying the number of record image files which are currently saved (hereinafter, described as a record number). However, image files of the template image are not counted. Moreover, as described above, the value of the [record number] box 620 is reset to 0 if the [record start] button 613 is pressed.

A [maximum record number] box 621 is a box for displaying the maximum number of record image files (hereinafter, described as a maximum record number). If the record number becomes equal to the maximum record number during record, the record ends automatically. An arbitrary maximum record number may be input in the [maximum record number] box 621. For example, a required number of image files of the turbine blades 10 can be saved by inputting the number of blades corresponding to one round of the turbine blades 10 in the [maximum record number] box 621.

An [end] button 630 is a button for ending the blade recording software. If the [end] button 630 is pressed, the main window 600 is not displayed and the operation of the blade recording software ends.

Figure 7:
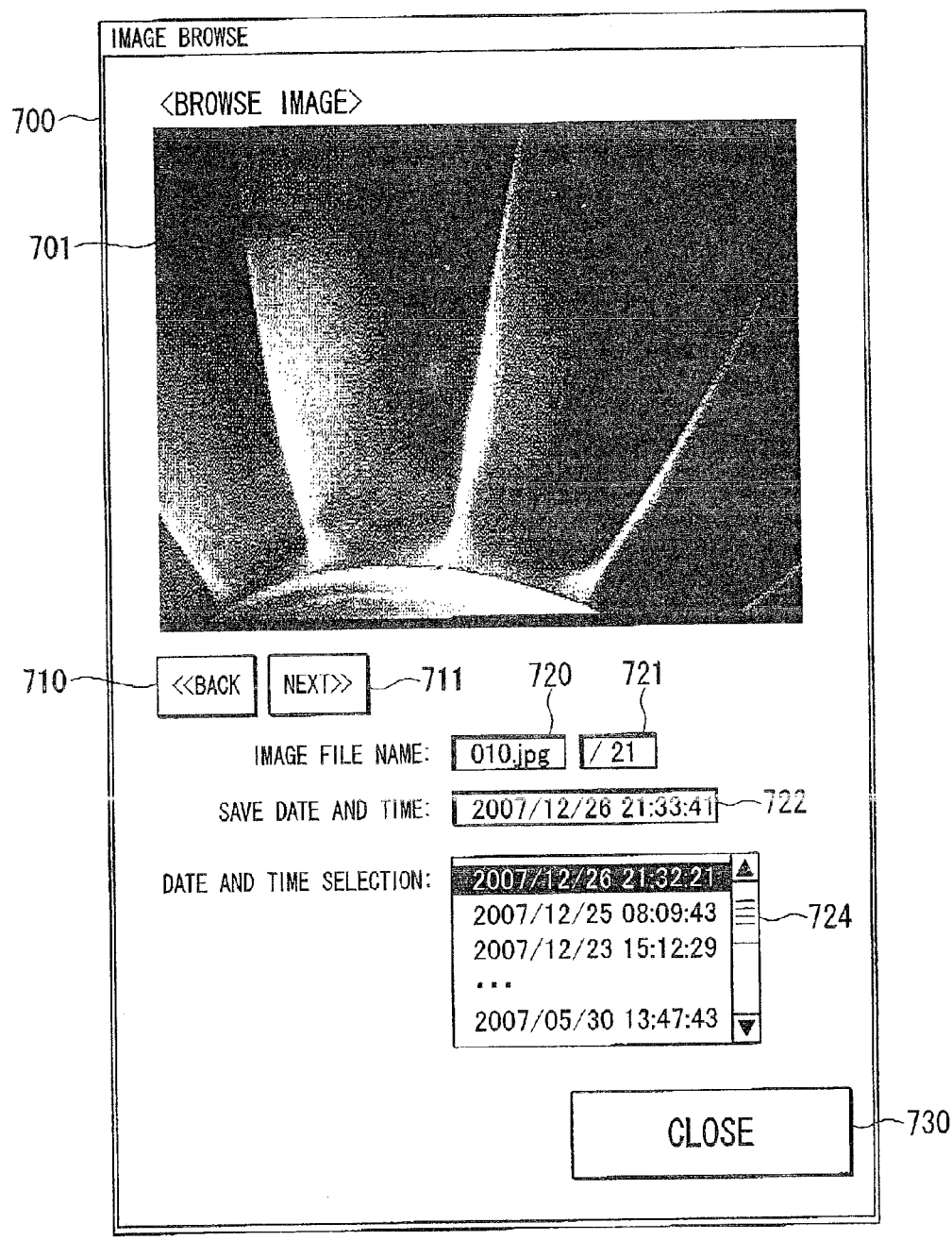
FIG. 7 is a reference view showing a screen of blade recording software according to the first embodiment of the invention.

FIG. 7 shows an [image browse] window of the blade recording software. An [image browse] window 700 shown in FIG. 7 is displayed when the [image browse] button 615 of the main window 600 is pressed as described above.

A user can browse a record image file by operating the [image browse] window 700 through the remocon 23 using a GUI function. Hereinafter, functions of various GUIs will be described.

A [browse image] box 701 is a box for displaying a record image file. If a [<<back] button 710 or a [next>>] button 711, which will be described, is pressed or if the selection of a [date and time selection] box 724 is changed, a record image file displayed in the [browse image] box 701 is changed. The user can browse a record image file through the [browse image] box 701. Hereinafter, a record image displayed in the [browse image] box 701 is described as a browse image, and the image file thereof is described as a browse image file.

The [<<back] button 710 is a button for changing an browse image. If the [<<back] button 710 is pressed, an image file with an image file No (image file number), which is smaller by 1 than the image file No of the image file displayed in the [browse image] box 701, among an image file list to be described later is displayed. Then, an image file name displayed in an [image file name] box 720, which will be described later, is also changed.

The [next>>] button 711 is also a button for changing a browse image. If the [next>>] button 711 is pressed, an image file with an image file No, which is larger by 1 than the image file No of the image file displayed in the [browse image] box 701, among the image file list to be described later is displayed. Then, an image file name displayed in the [image file name] box 720, which will be described later, is also changed.

The [image file name] box 720 is a box for displaying a file name of a browse image file. If the [<<back] button 710 or the [next>>] button 711 is pressed or the selection of the [date and time selection] box 724 is changed, display of the image file name of the [image file name] box 720 is changed.

A [number of image files] box 721 is a box for displaying the number of image files in the image file list to be described later. If the selection of the [date and time selection] box 724 is changed, display of the number of image files of the [number of image files] box 721 is changed.

A [save date and time] box 722 is a box for displaying save date and time of a browse image file. If the [<<back] button 710 or the [next>>] button 711 is pressed or the selection of the [date and time selection] box 724 is changed, the display of the save date and time of an image file of the [save date and time] box 722 is changed.

The [date and time selection] box 724 is a button for changing a browse image. Record start date and time of a save folder list, which will be described, is displayed in the list form in the [date and time selection] box 724. If the selection of record start date and time of the [date and time selection] box 724 is changed, a record image file saved in a save folder, which has the selected record start date and time, is displayed in the [browse image] box 701. Then, display of the image file name of the [image file name] box 720 and the number of the image files of the [number of image files] box 721 are also changed.

A [close] button 730 is a button for ending the browse of the images. If the [close] button 730 is pressed, the [image browse] window 701 is not displayed to return a state where the main window 600 is operated.

Figures 8, 9:
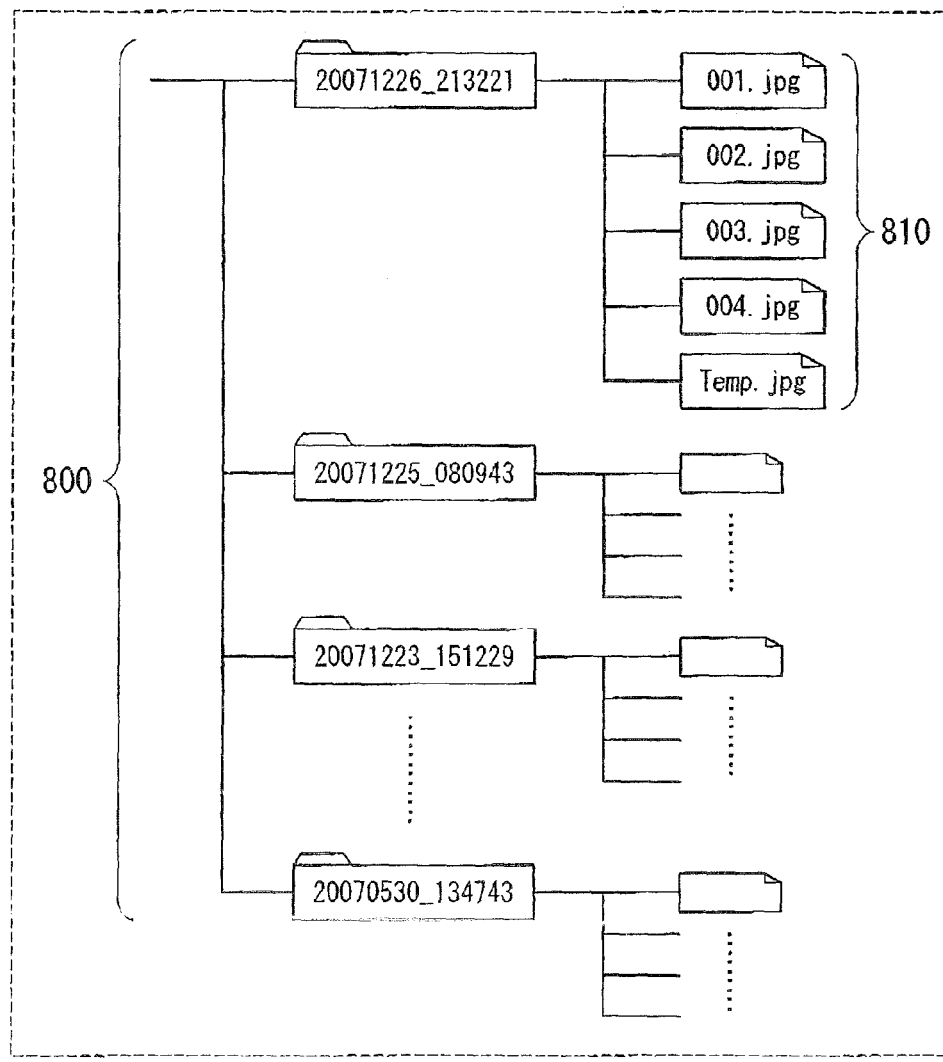
FIG. 8 is a reference view showing the directory structure in a memory card according to the first embodiment of the invention.
FIG. 9 is a reference view showing a save folder list according to the first embodiment of the invention.

Next, a directory structure in the memory card 50 will be described with reference to FIGS. 8 to 10. As shown in FIG. 8, a directory located immediately below the memory card 50 includes a plurality of save folders 800. The save folder 800 is a folder in which a record image file is saved. The record start date and time becomes a folder name of the save folder 800. For example, if the record start date and time is "2007/12/26 21:32:21", the folder name is set to "20071226_213221".

A directory located immediately below each save folder includes a plurality of record image files 810. The name of the record image files are saved as "001.jpg", "002.jpg", "003.jpg", in order in which the record image files are saved. However, a file name of a template image file becomes "Temp.jpg".

In addition, when an image browse processing to be described later is performed, a save folder list and an image file list are created.

The save folder list is a list of save folders. As shown in FIG. 9, the save folder list includes save folder No (save folder number), the record start date and time, and a folder name. Numbers of 1, 2, 3, are assigned to the save folder No in the order in which save folders are created.

The image file list is a list of record image files saved in each save folder. As shown in FIG. 10, the image file list includes an image file No, a file save date and time, and a file name. Numbers of 1, 2, 3, are assigned to the image file No in the order in which files are saved. However, a last image file No is assigned only to a template image.

Figure 11:
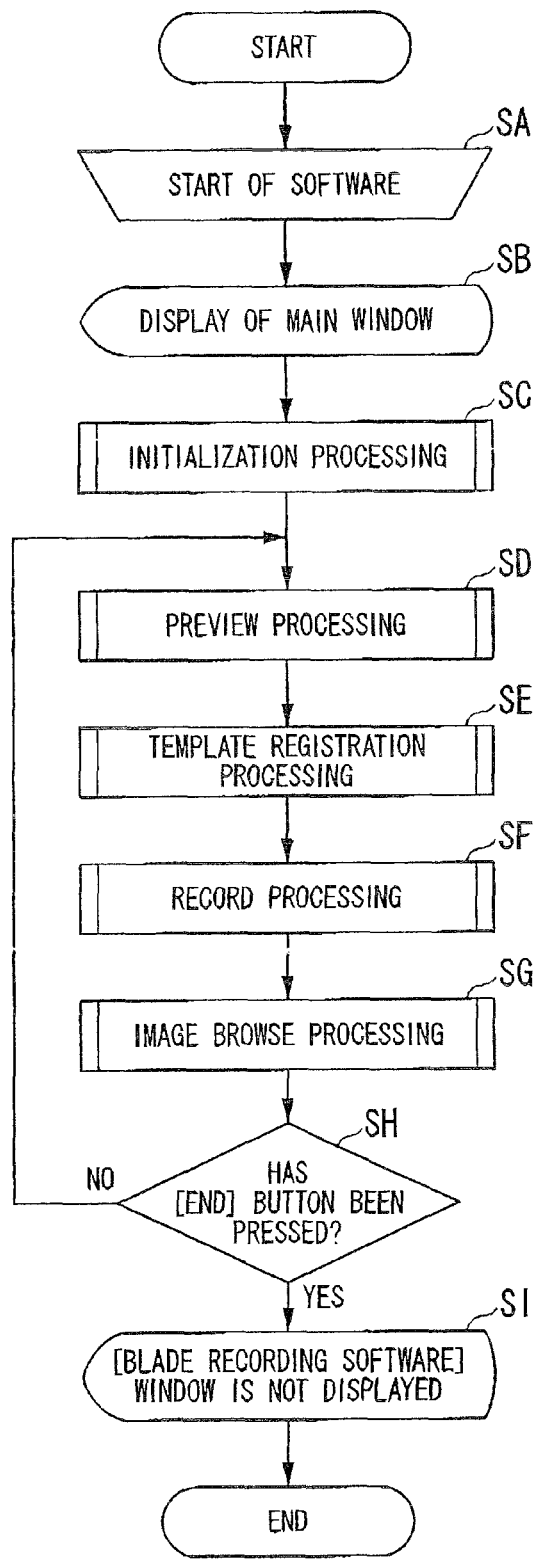
FIG. 11 is a flow chart showing the procedure of an operation based on blade recording software according to the first embodiment of the invention.

Next, the flow of operation of blade recording software will be described with reference to FIG. 11. In step SA, a user starts blade recording software. In this case, on the basis of an instruction to start the blade recording software which is input to the remocon 23, the CPU 34c reads the blade recording software stored in the ROM 34b into the RAM 34a and starts the operation according to the blade recording software. In step SB, the CPU 34c performs a processing for displaying the main window.

In step SC, the CPU 34c performs initialization processing. The initialization processing is a processing of setting the initial states of various GUIs within the main window or processing of setting the initial values of various kinds of data recorded in the RAM 34a. Details of the initialization processing will be described later. In step SD, the CPU 34c performs preview processing. The preview processing is a processing of starting and stopping the preview. Details of the preview processing will be described later.

In step SE, the CPU 34c performs template registration processing. The template registration processing is a processing of displaying a template image in a [template image] box and recording the template image in the RAM 34a. Details of the template registration processing will be described later. In step SF, the CPU 34c performs record processing. The record processing is a processing of starting and stopping the record. Details of the record processing will be described later.

In step SG, the CPU 34c performs the image browse processing. The image browse processing is a processing that a user performs to browse a record image file. Details of the image browse processing will be described later. In step SH, processing branches according to whether or not the user has pressed an [end] button. If the user has pressed the [end] button, the process proceeds to step SI. Moreover, if the user has not pressed the [end] button, the process proceeds to step SD. In step SI, the CPU 34c makes the main window be not displayed and ends the operation of the blade recording software.

Figure 12:
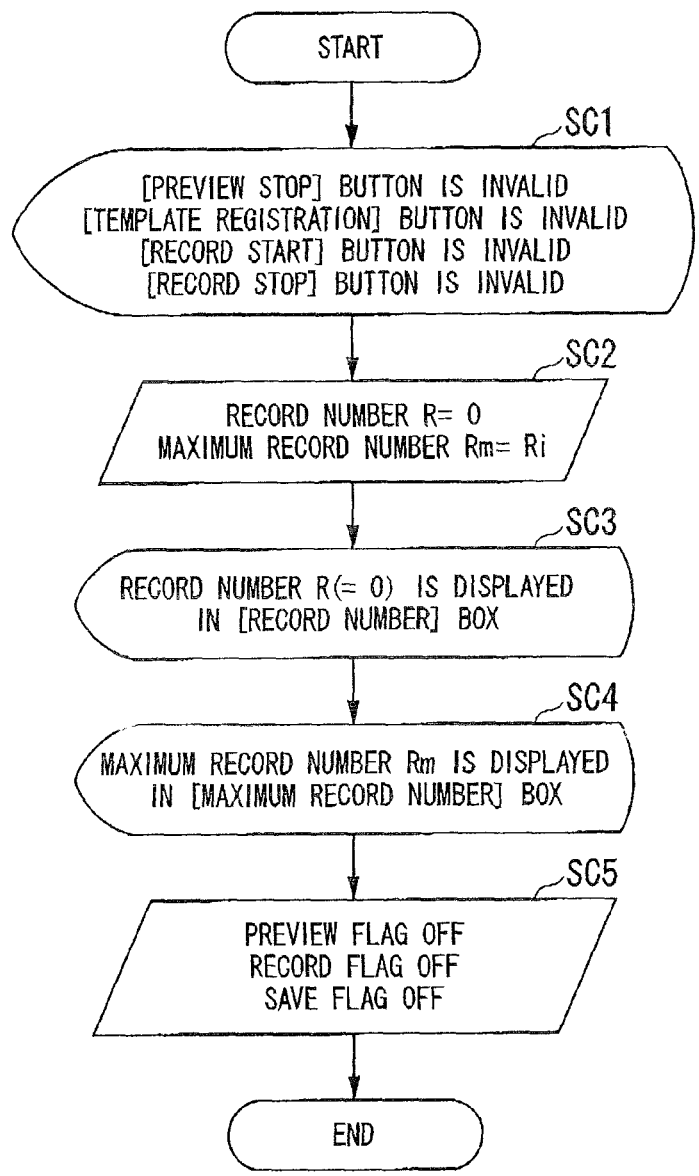
FIG. 12 is a flow chart showing the procedure of an operation based on blade recording software according to the first embodiment of the invention.

Next, the flow of initialization processing (step SC) will be described with reference to FIG. 12. In step SC1, the CPU 34c invalidates all user operations on the [preview stop] button, the [template registration] button, the [record start] button, and the [record stop] button. Hereinafter, it is simply described as "invalid" that a user operation using a GUI, such as a button, is in an invalid state (for example, gray state). Moreover, it is simply described as "valid" that a user operation using a GUI, such as a button, is in a valid state.

In step SC2, the CPU 34c records, in the RAM 34a, the record number R as 0 and the maximum record number Rm as Ri. Ri is an initial value of the maximum record number Rm, and a predetermined value is recorded as Ri in the RAM 34a. In step SC3, the CPU 34c performs a processing for displaying the record number R (=0) in the [record number] box. In step SC4, the CPU 34c performs a processing for displaying the maximum record number Rm in the [maximum record number] box.

In step SC5, the CPU 34c sets all of a preview flag, a record flag, and a save flag to OFF and records them in the RAM 34a. The preview flag is a flag indicating whether or not a current state is a preview state. The record flag is a flag indicating whether or not a current state is "under record". The save flag is a flag indicating whether or not a buffer image, which will be described later, is saved as a record image file during the record. Hereinafter, all flags used during the operation of the blade recording software have values of ON or OFF. After the processing in step SC5 ends, the process proceeds to step SD.

Figure 13:
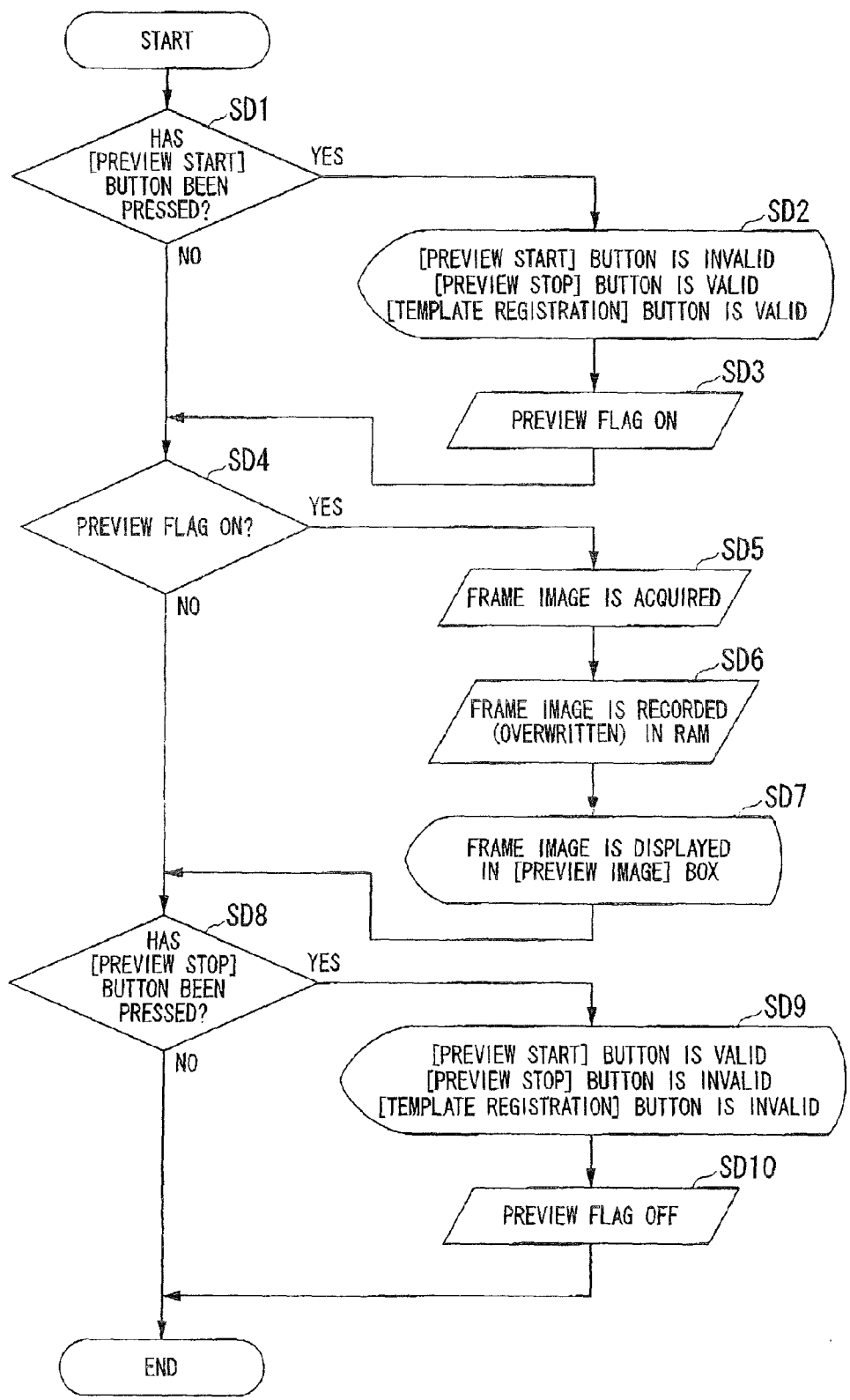
FIG. 13 is a flow chart showing the procedure of an operation based on blade recording software according to the first embodiment of the invention.

Next, the flow of preview processing in step SD will be described with reference to FIG. 13. In step SD1, the CPU 34c checks whether or not the [preview start] button has been pressed by the user. If the [preview start] button has been pressed, the process proceeds to step SD2. If the [preview start] button has not been pressed, the process proceeds to step SD4.

In step SD2, the CPU 34c makes the [preview start] button invalid, the [preview stop] button valid, and the [template registration] button valid. In step SD3, the CPU 34c sets a preview flag to ON and records it in the RAM 34a.

In step SD4, the CPU 34c checks whether or not the preview flag recorded in the RAM 34a is ON. If the preview flag is ON, the process proceeds to step SD5. If the preview flag is OFF, the process proceeds to step SD8.

In step SD5, the CPU 34c acquires an image of one frame (image signal) from the image signal processor 31 as a frame image. In addition, at a point of time before step SD5, the imaging element 30b generates an imaging signal of one frame, and the image signal processor 31 converts the imaging signal into a video signal to create an image of one frame.

In step SD6, the CPU 34c records the frame image, which was acquired in step SD5, in the RAM 34a. The frame image recorded in the RAM 34a is overwritten whenever the CPU 34c acquires a frame image. In step SD7, the CPU 34c performs a processing for displaying the frame image acquired in step SD5 in the [preview image] box.

In step SD8, the CPU 34c checks whether the [preview stop] button has been pressed by the user. If the [preview stop] button has been pressed, the process proceeds to step SD9. If the [preview stop] button has not been pressed, the process proceeds to step SE.

In step SD9, the CPU 34c makes the [preview start] button valid, the [preview stop] button invalid, and the [template registration] button invalid. In step SD10, the CPU 34c sets a preview flag to OFF and records it in the RAM 34a. After the processing in step SD10 ends, the process proceeds to step SE.

Figure 14:
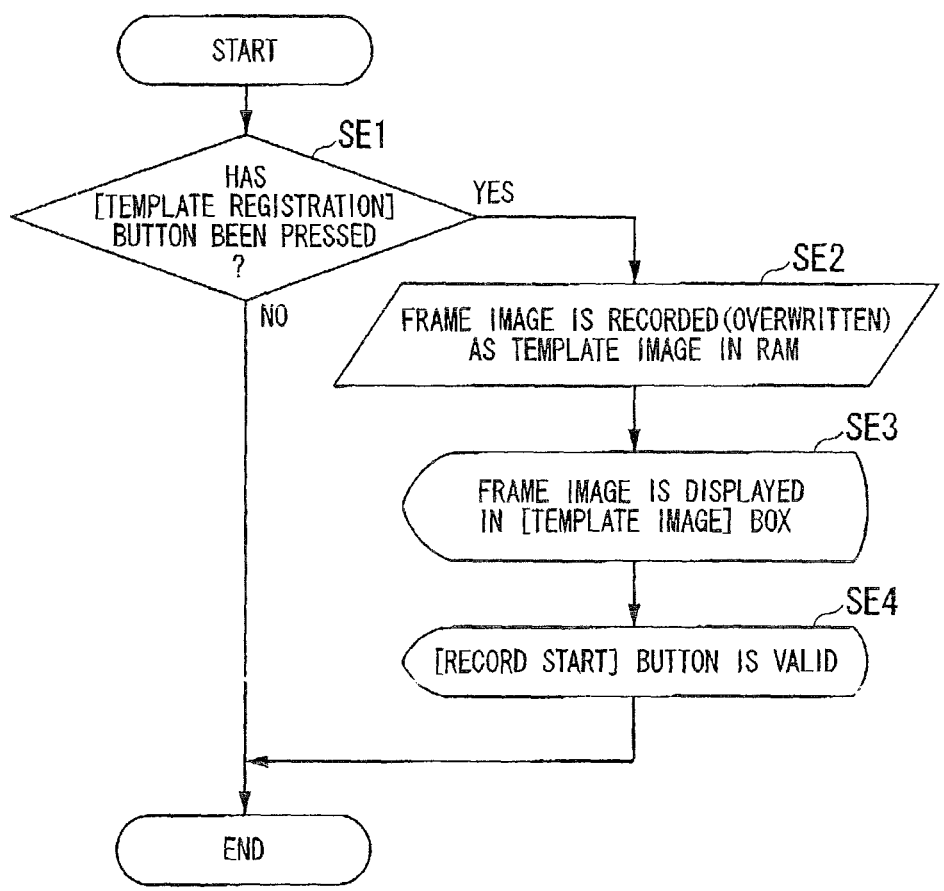
FIG. 14 is a flow chart showing the procedure of an operation based on blade recording software according to the first embodiment of the invention.

Next, the flow of template registration processing in step SE will be described with reference to FIG. 14. In step SE1, the CPU 34c checks whether or not the [template registration] button has been pressed by the user. If the [template registration] button has been pressed, the process proceeds to step SE2. If the [template registration] button has not been pressed, the process proceeds to step SF.

In step SE2, the CPU 34c records the frame image, which is recorded in the RAM 34a, as a template image in the RAM 34a. The template image recorded in RAM 34a is overwritten whenever the [template registration] button is pressed. In step SE3, the CPU 34c performs a processing for displaying the frame image recorded in the RAM 34a in the [template image] box. Specifically, the CPU 34c performs a processing of superimposing the frame image recorded in the RAM 34a on a graphic image signal and outputs a signal after the processing (display signal) to the monitor 22.

It can be seen from the above that the processing in steps SE2 and SE3 is processing of registering a frame image, which is captured at the timing when the [template registration] button is pressed, as a template image. In step SE4, the CPU 34c validates the [record start] button. After the processing in step SE4 ends, the process proceeds to step SF.

Figure 15:
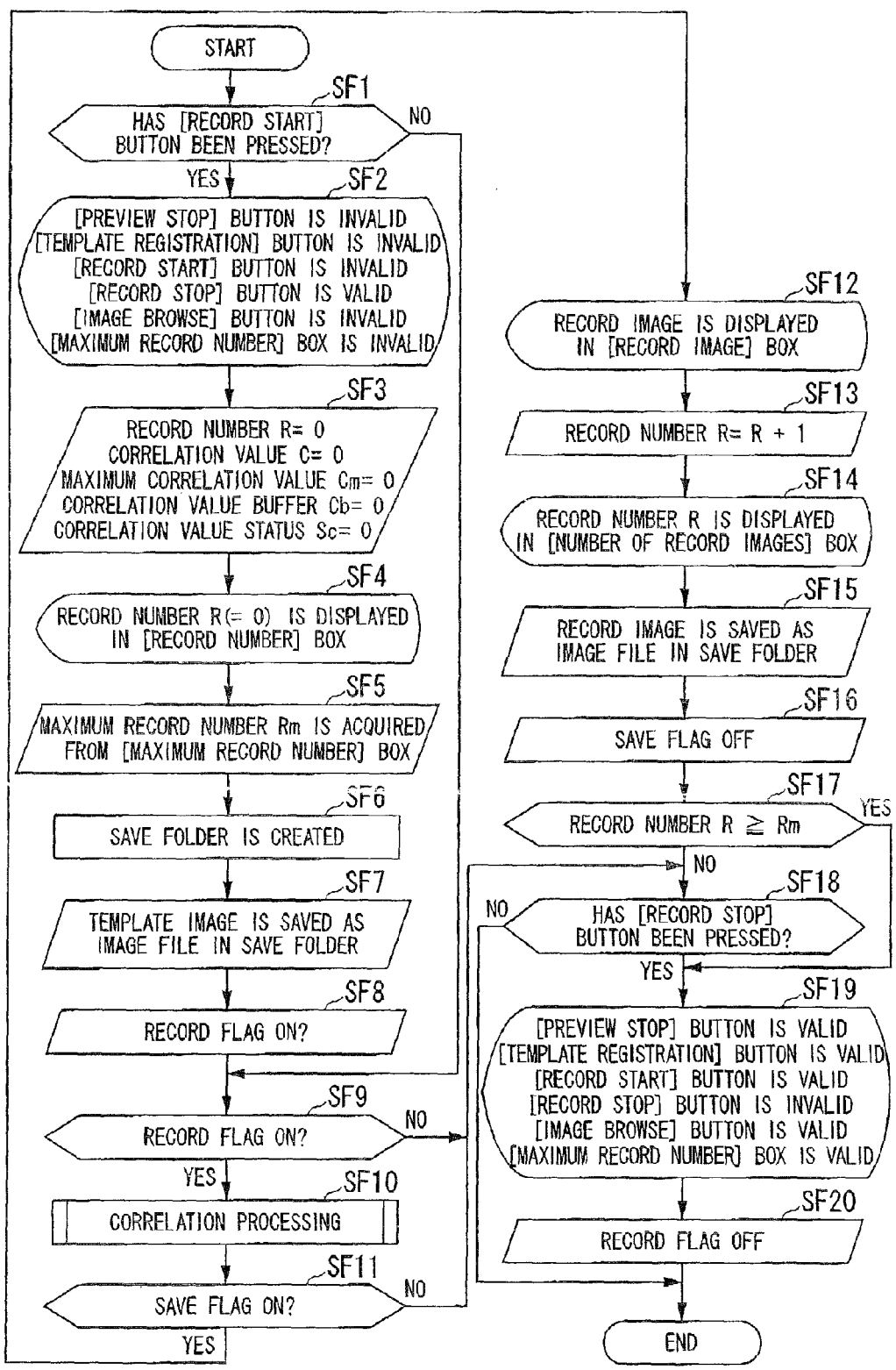
FIG. 15 is a flow chart showing the procedure of an operation based on blade recording software according to the first embodiment of the invention.

Next, the flow of record processing in step SF will be described with reference to FIG. 15. In step SF1, the CPU 34c checks whether or not the [record start] button has been pressed by the user. If the [record start] button has been pressed, the process proceeds to step SF2. If the [record start] button has not been pressed, the process proceeds to step SF9.

In step SF2, the CPU 34c makes the [preview stop] button invalid, the [template registration] button invalid, the [record start] button invalid, the [record stop] button valid, the [image browse] button invalid, and the [maximum record number] box invalid. In step SF3, the CPU 34c records in the RAM 34a a record number R, a correlation value C, a maximum correlation value Cm, a correlation value buffer Cb, and a correlation value status Sc all of which are set to 0 (R=0, C=0, Cm=0, Cb=0, Sc=0). Details of the correlation value C, the maximum correlation value Cm, the correlation value buffer Cb, and the correlation value status Cd will be described later.

In step SF4, the CPU 34c performs a processing for displaying the record number R (=0) in the [record number] box. In step SF5, the CPU 34c acquires the maximum record number Rm input in the [maximum record number] box and records it in the RAM 34a. In step SF6, the CPU 34c creates a save folder in the memory card 50. In this case, the date and time the [record start] button is pressed by the user becomes the folder name of the save folder.

In step SF7, the CPU 34c saves the template image recorded in the RAM 34a in step SE2 of FIG. 14, as an image file (hereinafter, described as a template image file), in the save folder in the memory card 50. In this case, the template image file name becomes "Temp.jpg". In step SF8, the CPU 34c sets a record flag to ON and records it in the RAM 34a.

In step SF9, the CPU 34c checks whether or not the record flag recorded in the RAM 34a is ON. If the record flag is ON, the process proceeds to step SF10. If the record flag is OFF, the process proceeds to step SF18.

In step SF10, the CPU 34c calculates the correlation value between the template image and the frame image and executes correlation processing for determining the timing when the record image is saved on the basis of the correlation value. Details of the correlation processing will be described later. In step SF11, the CPU 34c checks whether or not the save flag recorded in the RAM 34a is ON. If the save flag is ON, the process proceeds to step SF12. If the save flag is OFF, the process proceeds to step SF18.

In step SF12, the CPU 34c performs a processing for displaying the record image, which is recorded in the RAM 34a during the correlation processing in step SF10, in the [record image] box. In step SF13, the CPU 34c increments the record number R by 1 (R+1 is substituted for R) and records it in the RAM 34a. In step SF14, the CPU 34c performs a processing for displaying the record number R in the [record image] box.

In step SF15, the CPU 34c saves the record image, which is recorded in the RAM 34a during the correlation processing in step SF10, as an image file in the save folder. In step SF16, the CPU 34c sets a save flag to OFF and records it in the RAM 34a. In step SF17, the CPU 34c checks whether or not the record number R is equal to or larger than the maximum record number Rm. (R≥Rm). If the record number R is equal to or larger than the maximum record number Rm, the process proceeds to step SF19. If the record number R is smaller than the maximum record number Rm, the process proceeds to step SF18.

In step SF18, the CPU 34c checks whether or not the [record stop] button has been pressed by the user. If the [record stop] button has been pressed, the process proceeds to step SF19. If the [record stop] button has not been pressed, the process proceeds to step SG.

In step SF19, the CPU 34c makes the [preview stop] button valid, the [template registration] button valid, the [record start] button valid, the [record stop] button invalid, the [image browse] button valid, and the [maximum record number] box valid. In step SF20, the CPU 34c sets a record flag to OFF and records it in the RAM 34a. After the processing in step SF20 ends, the process proceeds to step SG.

Figure 16:
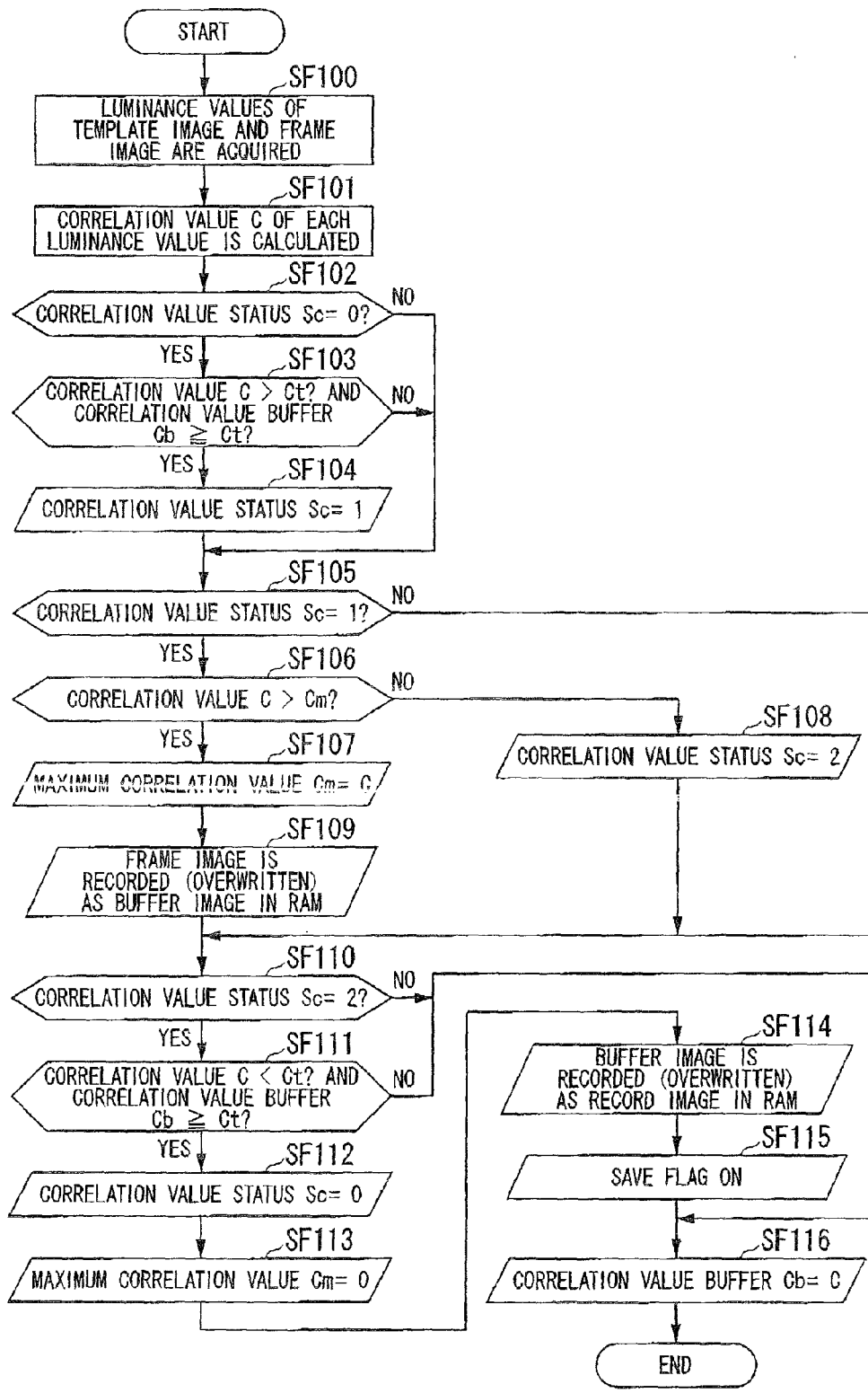
FIG. 16 is a flow chart showing the procedure of an operation based on blade recording software according to the first embodiment of the invention.

Next, the flow of correlation processing in step SF10 will be described with reference to FIG. 16. The correspondence relationship between the correlation processing shown in FIG. 16 and an actual correlation value change will be described later with reference to FIG. 17. In step SF100, the CPU 34c acquires the luminance value (brightness value) of each pixel of the template image and the flame image recorded in the RAM 34a. Here, the luminance value of a pixel expressed with the luminance of each component of RGB is calculated using the following expression (1), for example.

$$Y = 0.299 \times R + 0.587 \times G + 0.114 \times B \tag{1}$$

In step SF101, the CPU 34c calculates the correlation value C between the frame image and the template image recorded in the RAM 34a. Hereinafter, details of the correlation value C will be described. Assuming that the luminance values of pixel positions (x, y) of certain two images are $f1(x, y)$ and $f2(x, y)$, the average luminance values of the two images are expressed as expressions (2) and (3), respectively. In this case, X and Y are the number of pixels in the x and y directions, respectively, and Size is a total pixel number (Size=X×Y).

$$\bar{f}_1 = \frac{\sum_{y=1}^{Y} \sum_{x=1}^{X} f_1(x, y)}{\text{Size}} \tag{2}$$

-continued $$\bar{f}_2 = \frac{\sum_{y=1}^{Y}\sum_{x=1}^{X} f_2(x, y)}{Size} \quad (3)$$

In addition, standard deviations of the two images are expressed as expressions (4) and (5), respectively.

$$StdDev_1 = \sqrt{\frac{\sum_{y=1}^{Y}\sum_{x=1}^{X}(f_1(x, y) - \bar{f}_1)^2}{Size}} \quad (4)$$

$$StdDev_2 = \sqrt{\frac{\sum_{y=1}^{Y}\sum_{x=1}^{X}(f_2(x, y) - \bar{f}_2)^2}{Size}} \quad (5)$$

In addition, the covariance of the two images is expressed as an expression (6).

$$CoVar = \frac{\sum_{y=1}^{Y}\sum_{x=1}^{X}(f_1(x, y) - \bar{f}_1)(f_2(x, y) - \bar{f}_2)}{Size} \quad (6)$$

In addition, the correlation value C of the two images is expressed as an expression (7). This correlation value C is an index which indicates whether or not the two images are similar. Generally, the correlation value is a value close to 1 if similar and tends to approach 0 if not similar.

$$C = \frac{CoVar}{StdDev_1 \cdot StdDev_2} \quad (7)$$

In the case of calculating the correlation value after thinning out the image size, it is preferable to change the increased step number of x and y when calculating the total sum regarding x and y and to change the total pixel number Size in the above expressions. For example, in the case of calculating the correlation value after thinning out the image size to ¼, it is preferable to set the increased step number of x and y to 4 and to set the total pixel number Size to Size=(X×Y)/(4×4). This is effective for the case where the speed of correlation processing needs to be improved, since the amount of calculation is reduced if a thinning-out processing is used.

In step SF102, the CPU 34c checks whether or not the correlation value status Sc is 0 (Se=0). The correlation value status Sc is a status of the correlation value C. The correlation value status Sc has values of 0 to 2. The case where the correlation value status Sc is 0 is an initial state. The case where the correlation value status Sc is 1 is a state until the CPU 34c finds a frame image to be saved as a record image. The case where the correlation value status Sc is 2 is a state when the CPU 34c has found a frame image to be saved as a record image. When the correlation value status Sc is 0, the process proceeds to step SF103. When the correlation value status Sc is not 0, the process proceeds to step SF105.

In step SF103, the CPU 34c checks whether or not the correlation value C is larger than the correlation threshold value Ct (C>Ct) and the correlation value buffer Cb is equal to or smaller than the correlation threshold value Ct (Cb≤Ct). The correlation threshold value Ct is a threshold value of the correlation value C, and a predetermined value is recorded in the RAM 34a as the correlation threshold value Ct. The correlation value status Sc changes according to which value the correlation value C has compared with the correlation threshold value Ct. It will be described later which value is set as the correlation threshold value Ct. The correlation value buffer Cb is a value in a buffer which is provided in the RAM 34a in order to hold the correlation value C calculated immediately before by the CPU 34c. If C>Ct and Cb≤Ct in step SF103, the process proceeds to step SF104. If C≤Ct or Cb>Ct in step SF103, the process proceeds to step SF105.

In step SF104, the CPU 34c sets the correlation value status Sc to 1 (Sc=1) and records it in the RAM 34a. In step SF105, the CPU 34c checks whether or not the correlation value status Sc is 1 (Sc=1). When the correlation value status Sc is 1, the process proceeds to step SF106. When the correlation value status Sc is not 1, the process proceeds to step SF110.

In step SF106, the CPU 34c checks whether or not the correlation value C is larger than the maximum correlation value Cm (C>Cm). The maximum correlation value Cm is a value of a buffer for holding the maximum value of the correlation value C. The process proceeds to step SF107 if C>Cm, and the process proceeds to step SF108 if C≤Cm.

In step SF107, the CPU 34c sets the maximum correlation value Cm to the correlation value C (Cm=C) and records it in the RAM 34a. In step SF109, the CPU 34c records a frame image as a buffer image in the RAM 34a. The buffer image recorded in the RAM 34a is overwritten whenever processing in step SF109 is executed. The buffer image is an image in a buffer which is provided in the RAM 34a in order to hold a frame image temporarily until the CPU 34c can check that the frame image is a record image (image highly correlated with a template image).

In step SF108, the CPU 34c sets the correlation value status Sc to 2 (Sc=2) and records it in the RAM 34a. In step SF110, the CPU 34c checks whether or not the correlation value status Sc is 2 (Sc=2). When the correlation value status Sc is 2, the process proceeds to step SF111. When the correlation value status Sc is not 2, the process proceeds to step SF116.

In step SF111, the CPU 34c checks whether or not the correlation value C is smaller than the correlation threshold value Ct (C<Ct) and the correlation value buffer Cb is equal to or larger than the correlation threshold value Ct (Cb≥Ct). If C<Ct and Cb≥Ct in step SF111, the process proceeds to step SF112. If C≥Ct or Cb<Ct in step SF111, the process proceeds to step SF116.

In step SF112, the CPU 34c sets the correlation value status Sc to 0 (Sc=0) and records it in the RAM 34a. In step SF113, the CPU 34c sets the maximum correlation value Cm to 0 (Cm=0) and records it in the RAM 34a. In step SF114, the CPU 34c records a buffer image as a record image in the RAM 34a. The record image recorded in the RAM 34a is overwritten whenever processing in step SF114 is executed. In step SF115, the CPU 34c sets a save flag to ON and records it in the RAM 34a.

In step SF116, the CPU 34c sets the correlation value buffer Cb to the correlation value C (Cb=C) and records it in the RAM 34a. After the processing in step SF116 ends, the process proceeds to step SF11.

Figure 17:
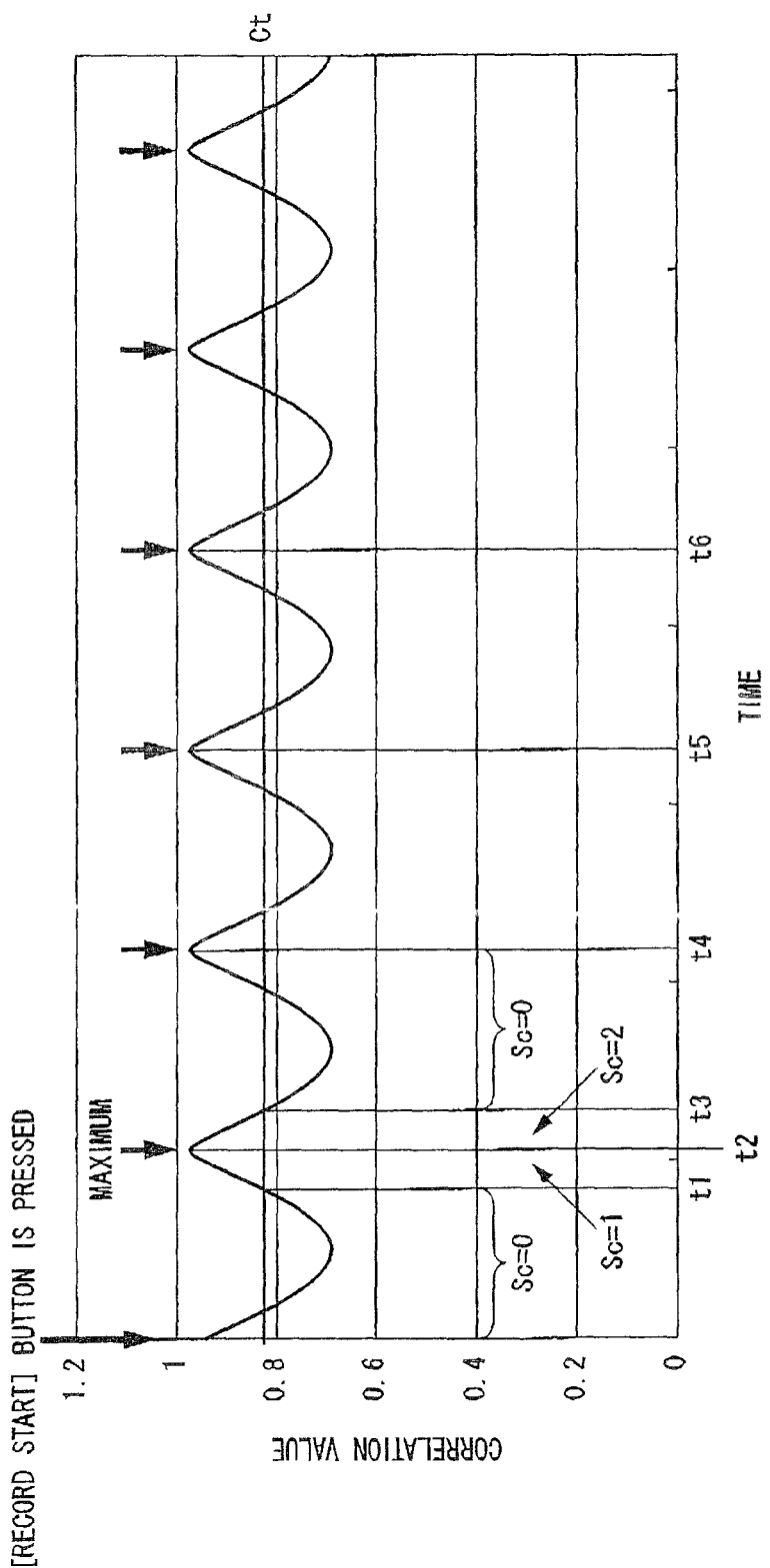
FIG. 17 is a graph showing a temporal change of the correlation value according to the first embodiment of the invention.

FIG. 17 is a graph showing a temporal change of the correlation value C. Hereinafter, details of record processing and correlation processing will be described with reference to FIG. 17.

The horizontal axis in the graph shown in FIG. 17 indicates a time, and the vertical axis indicates the correlation value C calculated by the CPU 34c in step SF101. A maximum and a minimum appear periodically at the correlation value C. A region where the correlation value C is a maximum indicates a correlation value between a template image and a blade image (image obtained by imaging blades). In addition, a region where the correlation value C is a minimum indicates a correlation value between a template image and the background (inner wall and the like of a jet engine) of a blade. The correlation threshold value Ct is set to become an approximately middle value of both and is recorded in the RAM 34a.

First, the correlation value status Sc is 0 (Sc=0) from timing (t=0), at which a user presses the [record start] button, to timing (t=t1), at which the correlation value C becomes larger than the correlation threshold value Ct. Then, the correlation value status Sc is 1 (Sc=1) from t=t1 to timing (t=t2) at which the correlation value C is a maximum. During this period, the maximum correlation value Cm is sequentially updated to the correlation value C (Cm=C: step SF107), and frame images are sequentially recorded as buffer images in the RAM 34a (step SF109).

Then, the correlation value status Sc is 2 (Sc=2) from t=t2 to timing (t=t3) at which the correlation value C becomes smaller than the correlation threshold value Ct. During this period, the maximum correlation value Cm is not updated and stays fixed, and a frame image is not recorded as a buffer image in the RAM 34a.

Then, in t=t3, the correlation value status Sc becomes 0 again (Sc=0) (step SF112), and the buffer image is recorded as a record image in the RAM 34a (step SF114). In this case, the buffer image is a frame image at a timing when the correlation value C is the maximum at t=t2. Then, until the user presses the [record stop] button, frame images at timing (t=t4, t5, t6, . . . ) when the correlation value C is a maximum are sequentially saved as record images.

Figure 18:
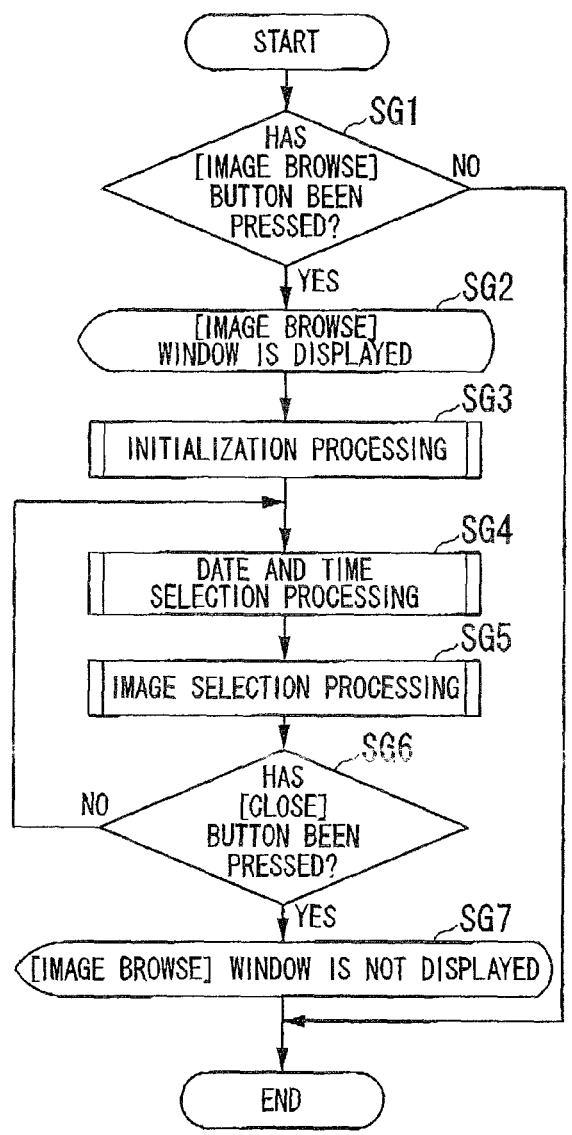
FIG. 18 is a flow chart showing the procedure of an operation based on blade recording software according to the first embodiment of the invention.

Next, the flow of image browse processing in step SG will be described with reference to FIG. 18. In step SG1, the CPU 34c checks whether or not the [image browse] button has been pressed by the user. If the [image browse] button has been pressed, the process proceeds to step SG2. If the [image browse] button has not been pressed, the process proceeds to step SH.

In step SG2, the CPU 34c performs a processing for displaying an [image browse] window. As described above, a user operation on the main window is invalid while the [image browse] window is being displayed. In step SG3, the CPU 34c performs initialization processing. The initialization processing is a processing of setting the initial states of various GUIs within the [image browse] window or processing of setting the initial values of various kinds of data recorded in the RAM 34a. Details of the initialization processing will be described later.

In step SG4, the CPU 34c performs date and time selection processing. The date and time selection processing is a processing in which the CPU 34c detects that the user has changed the selection of a record start date and time in the [date and time selection] box and changes an image displayed in the [browse image] box. Details of the date and time selection processing will be described later.

In step SG5, the CPU 34c performs image selection processing. The image selection processing is processing in which the CPU 34c detects that the user has pressed the [<<back] button or the [next>>] button and changes an image displayed in the [browse image] box. Details of the image selection processing will be described later.

In step SG6, the CPU 34c checks whether or not the [close] button has been pressed by the user. If the [close] button has been pressed, the process proceeds to step SG7. If the [close] button has not been pressed, the process proceeds to step SG4. In step SG7, the CPU 34c performs a processing for making the [image browse] window not be displayed. After the processing in step SG7 ends, the process proceeds to step SH.

Figure 19:
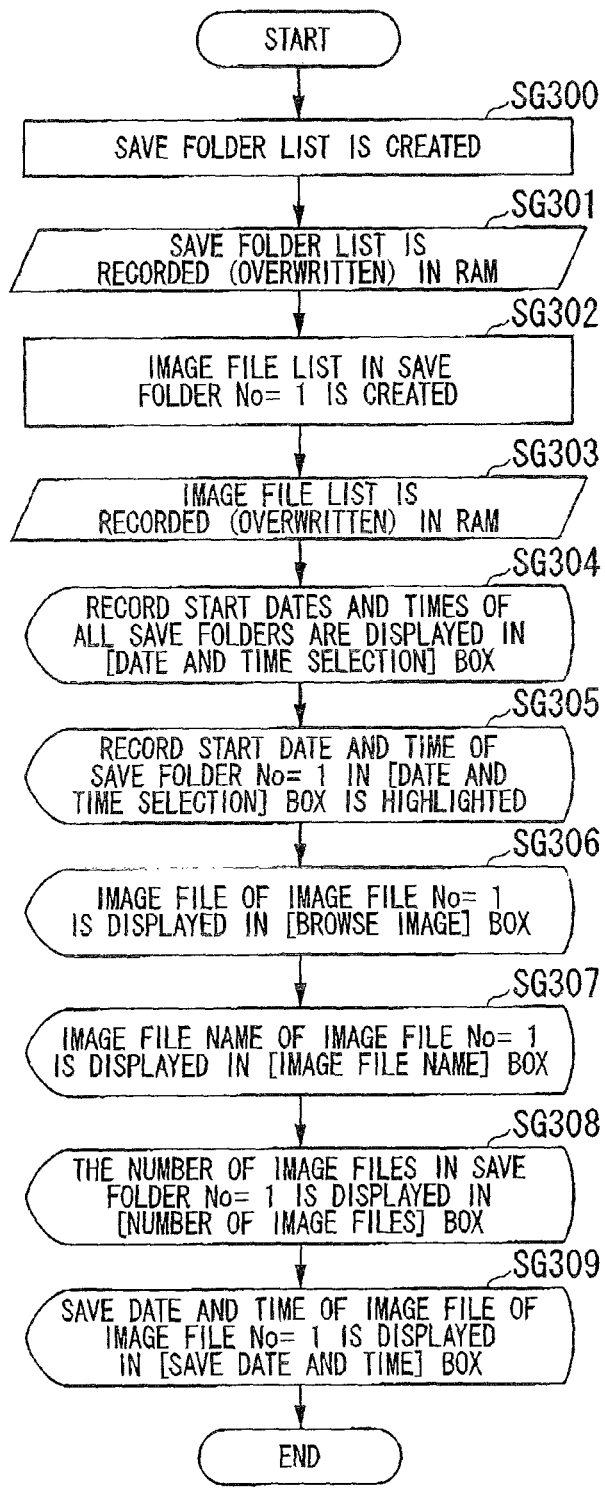
FIG. 19 is a flow chart showing the procedure of an operation based on blade recording software according to the first embodiment of the invention.

Next, the flow of initialization processing in step SG3 will be described with reference to FIG. 19. In step SG300, the CPU 34c creates a save folder list. In step SG301, the CPU 34c records the created save folder list in the RAM 34a. The save folder list recorded in the RAM 34a is overwritten whenever a save folder list is created.

In step SG302, the CPU 34c creates an image file list in a save folder, of which save folder No is 1, in the save folder list. In step SG303, the CPU 34c records the created image file list in the RAM 34a. The image folder list recorded in the RAM 34a is overwritten whenever an image folder list is created.

In step SG304, the CPU 34c performs a processing for displaying, in the [date and time selection] box, a list of all record start dates and times in the save folder list. In step SG305, the CPU 34c performs a processing for highlighting a record start date and time in the save folder list, which corresponds to save folder No of 1, among the record start dates and times displayed in a list in the [date and time selection] box.

In step SG306, the CPU 34c performs a processing for displaying an image file, of which image file No is 1 in the image file list, in the [browse image] box. In step SG307, the CPU 34c performs a processing for displaying an image file, of which image file No is 1 in the image file list, in the [image file name] box.

In step SG308, the CPU 34c performs a processing for displaying in the [number of image files] box the number of image files in a save folder, of which save folder No is 1 within the save folder list. In step SG309, the CPU 34c performs a processing for displaying in the [save date and time] box save date and time of an image file, of which image file No is 1 in the image file list. After the processing in step SG309 ends, the process proceeds to step SG4.

Figure 20:
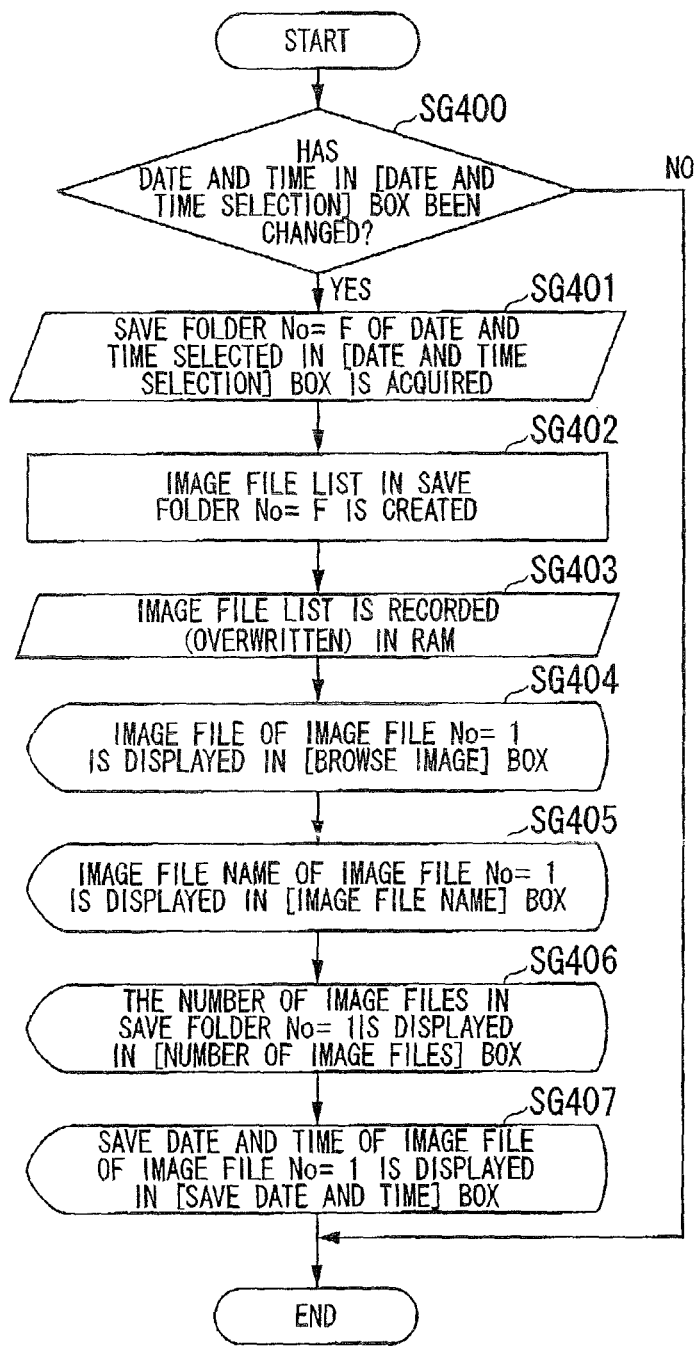
FIG. 20 is a flow chart showing the procedure of an operation based on blade recording software according to the first embodiment of the invention.

Next, the flow of date and time selection processing in step SG4 will be described with reference to FIG. 20. In step SG400, the CPU 34c checks whether or not the selection of record start date and time in the [date and time selection] box has been changed by the user. If the selection of record start date and time has been changed, the process proceeds to step SG401. If the selection of a record start date and time has not been changed, the process proceeds to step SG5.

In step SG401, the CPU 34c acquires the save folder No of a save folder, which has a record start date and time that the user has selected in the [date and time selection] box, from the save folder list. In this case, the acquired folder number is set to F. In step SG402, the CPU 34c creates an image file list in a save folder, of which the save folder No is F, in the save folder list. In step SG403, the CPU 34c records the image file list created in step SG402 in the RAM 34a. The image file list recorded in the RAM 34a is overwritten whenever an image file list is created.

In step SG404, the CPU 34c performs a processing for displaying in the [browse image] box an image file, of which image file No is 1 in the image file list. In step SG405, the CPU 34c performs a processing for displaying an image file name, of which the image file No is 1 in the image file list in the [image file name] box.

In step SG406, the CPU 34c performs a processing for displaying in the [number of image files] box the number of image files in a save folder, of which the save folder No is 1 within the save folder list. In step SG407, the CPU 34c performs a processing for displaying in the [save date and time] box save date and time of an image file, of which image file No is 1 in the image file list. After the processing in step SG407 ends, the process proceeds to step SG5.

Figure 21:
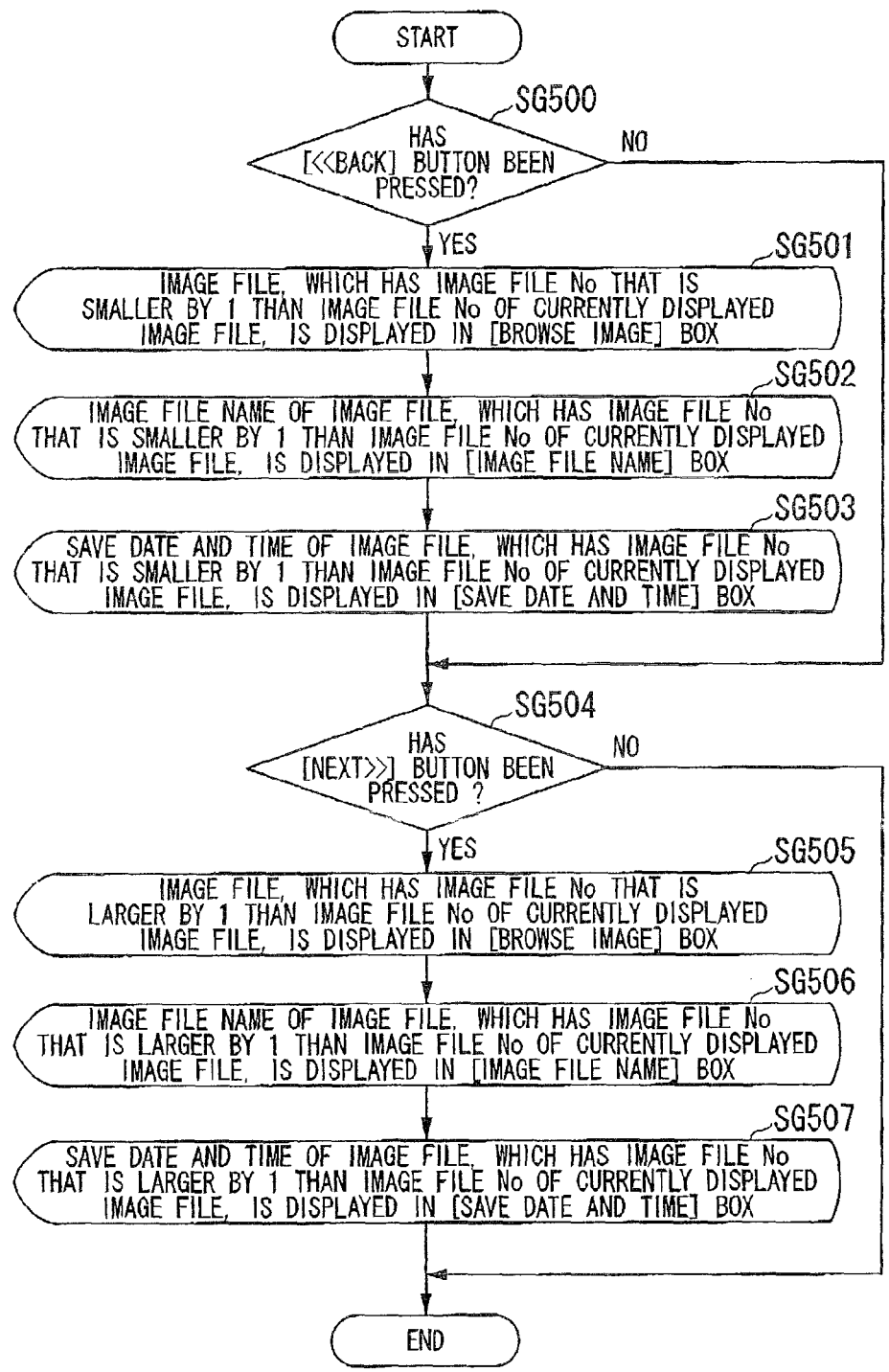
FIG. 21 is a flow chart showing the procedure of an operation based on blade recording software according to the first embodiment of the invention.

Next, the flow of image selection processing in step SG5 will be described with reference to FIG. 21. In step SG500, the CPU 34c checks whether or not the [<<back] button has been pressed by the user. If the [<<back] button has been pressed, the process proceeds to step SG501. If the [<<back] button has not been pressed, the process proceeds to step SG504.

In step SG501, the CPU 34c performs a processing for displaying in the [browse image] box an image file, which has image file No that is smaller by 1 than image file No of an image file displayed in the current [browse image] box in the image file list. In step SG502, the CPU 34c performs a processing for displaying in the [image file name] box an image file name of the image file, which has image file No that is smaller by 1 than image file No of the currently displayed image file in the image file list.

In step SG503, the CPU 34c performs a processing for displaying in the [save date and time] box the save date and time of an image file, which has image file No smaller by 1 than the image file No of the currently displayed image file in the image file list. In step SG504, the CPU 34c checks whether or not the [next>>] button has been pressed by the user. If the [next>>] button has been pressed, the process proceeds to step SG505. If the [next>>] button has not been pressed, the process proceeds to step SG6.

In step SG505, the CPU 34c performs a processing for displaying in the [browse image] box an image file, which has image file No that is larger by 1 than the image file No of an image file displayed in the current [browse image] box in the image file list. In step SG506, the CPU 34c performs a processing for displaying in the [image file name] box an image file name of the image file, which has an image file No that is larger by 1 than the image file No of the currently displayed image file in the image file list.

In step SG507, the CPU 34c performs a processing for displaying in the [save date and time] box the save date and time of an image file, which has image file No that is larger by 1 than image file No of the currently displayed image file in the image file list. After the processing in step SG507 ends, the process proceeds to step SG6.

As a modification of the present embodiment, it is also possible to provide a means for identifying the individual jet engine 1, store in the endoscope apparatus 3 the maximum number of the turbine blade 10 for every jet engine, and use the maximum number corresponding to the identified jet engine 1 at the time of operation of blade recording software. As a means for identifying the individual jet engine 1, for example, a bar code or an IC tag may be attached to the jet engine 1. Then, a reader, such as a bar code reader or an IC tag reader, may be connected to the endoscope apparatus 3 so that the identification information of the jet engine 1 can be read from the bar code or the IC tag using the reader.

According to the present embodiment, the following effects can be acquired. In the present embodiment, a frame image when the position or angle of a turbine blade in a frame image become equal to the position or angle of a turbine blade in a template image can be acquired by selecting some frame images from a plurality of frame images, which are obtained by imaging turbine blades, on the basis of the correlation value which is a result of image comparison between the frame images and the template image. Images of turbine blades can be acquired by a simple method without requiring a special control for matching the rotation of turbine blades with the imaging timing.

Using the turbine blade image acquired by the method illustrated in the present embodiment, it is possible to inspect a turbine blade. Particularly by displaying a record image in the record image box 603 shown in FIG. 6, a turbine blade can be inspected in real time. In addition, a time for which inspection can be performed or the location where inspection can be performed can be extended by saving the record image as an image file in a recording medium. When saving a turbine blade image, the file size becomes large if an endoscope image is saved as a video file as it is. However, if some frame images among endoscope images are saved as still image files like the present embodiment a turbine blade images required for inspection can be saved while preventing an increase in the required storage capacity of a recording medium.

Moreover, by acquiring a frame image when the position or angle of a turbine blade in a frame image becomes equal to the position or angle of a turbine blade in a template image using the template image as a reference image, it is possible to acquire a frame image which is imaged in a state suitable for inspecting a turbine blade by the user. As a result, the inspection can be performed efficiently. In addition, since a template image selected from frame images is used, a temporal change in the correlation value shown in FIG. 17 is clear. Accordingly, it is possible to improve the precision when acquiring a frame image obtained by imaging in a desired state. In addition, since a template image selected from frame images is displayed, the user can check whether or not the state of a turbine blade in the acquired frame image is a state suitable for the user.

Second Embodiment

Next, a second embodiment of the invention will be described. Although only a browse function of a record image file is set on the [image browse] window of the blade recording software in the first embodiment, not only the browse function of a record image file but also a blade defect extracting function and a stereo measurement function are set on the [image browse] window in the present embodiment.

Figure 22:
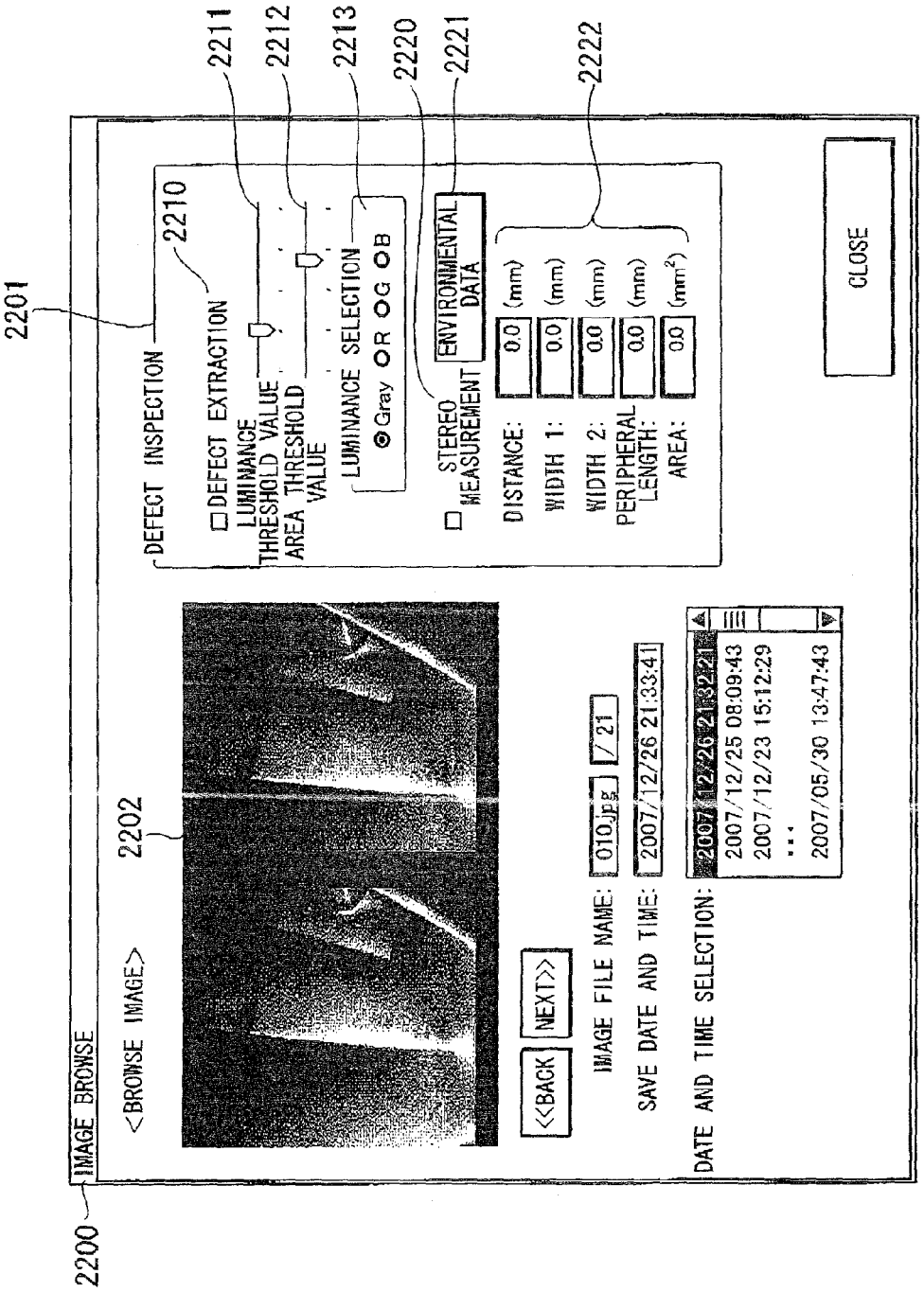
FIG. 22 is a reference view showing a screen of blade recording software according to a second embodiment of the invention.

FIG. 22 shows an [image browse] window in the present embodiment. An [image browse] window 2200 shown in FIG. 22 is different from the [image browse] window 700 (FIG. 7) in the first embodiment in that a [defect inspection] group box 2201 is disposed on the right side of the [image browse] window 2200. Various kinds of GUIs for performing defect extraction and stereo measurement are disposed in the [defect inspection] group box 2201. The following explanation will be focused on the case where the browse image 2202 is a pair of left and right images, which is imaged through a stereo optical adapter capable of forming two subject images regarding the same subject. The stereo optical adapter is mounted at the tip of the endoscope insertion section 20. Hereinafter, an image displayed on the left side is described as a left image, and an image displayed on the right side is described as a right image.

Figure 23:
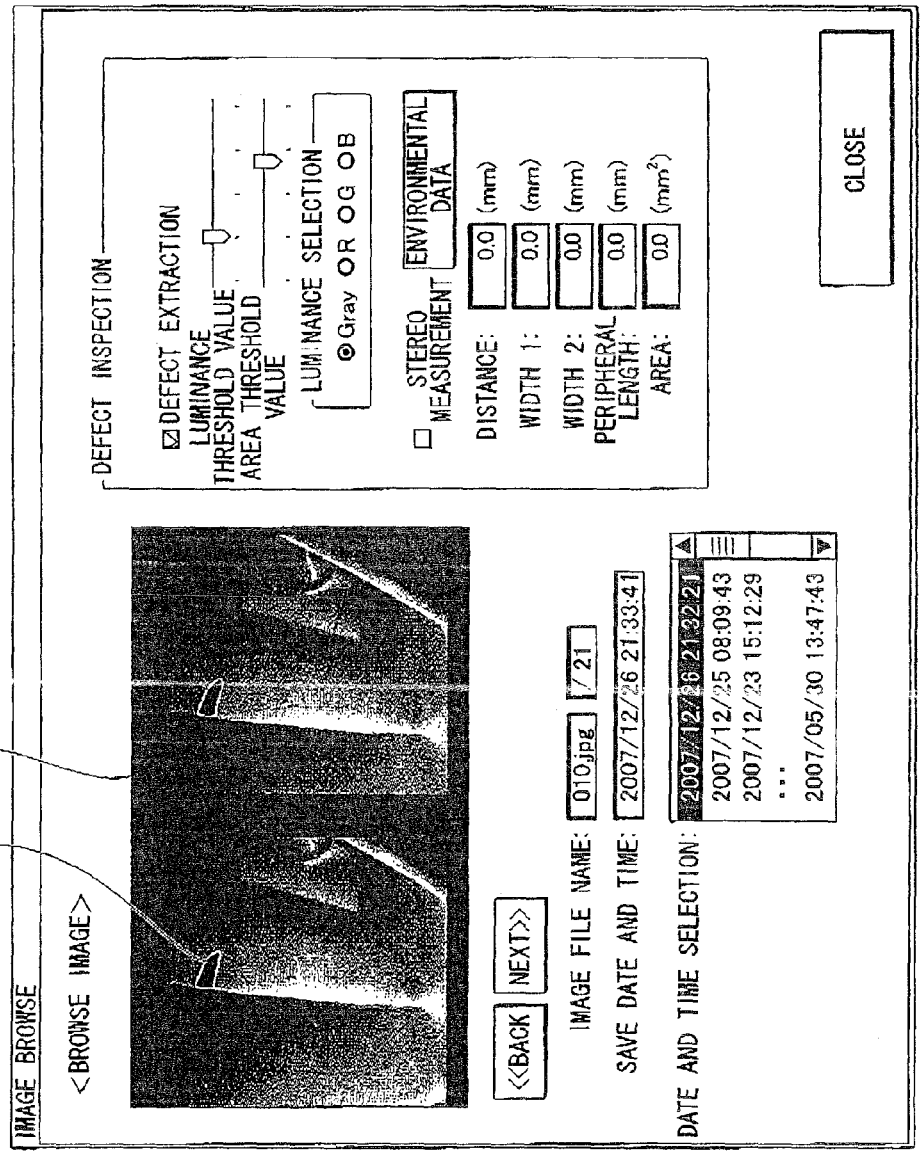
FIG. 23 is a reference view showing a screen of blade recording software according to the second embodiment of the invention.

Hereinafter, functions of various kinds of GUIs in the [defect extraction] group box 2201 will be described. A [defect extraction] check box 2210 is a check box for performing defect extraction processing on the browse image 2202. If a user puts a check mark in the [defect extraction] check box 2210, a defect contour 2230 is superimposed on the browse image 2202 as shown in FIG. 23. Details of the defect extraction processing will be described later. Here, an operation in which the defect contour 2230 is superimposed on the browse image 2202 as shown in FIG. 23 after the user puts a check mark in the [defect extraction] check box 2210 is performed by a defect extracting section $34c_4$ of the CPU 34c.

A [luminance threshold value] bar 2211 is a bar for setting the luminance threshold value which is one of the inspection parameters in the defect extraction processing to be described later. The luminance threshold value is used when binarizing the browse image 2202 in the defect extraction processing. An [area threshold value] bar 2212 is a bar for setting the area threshold value which is one of the inspection parameters in the defect extraction processing to be described later. The area threshold value is used when removing a small blob (particle) within a browse image in the defect extraction processing. A [luminance selection] radio button 2213 is a radio button for setting the type of luminance value which is one of the inspection parameters in the defect extraction processing to be described later. The luminance value is used when converting an image into a gray-scale image in the defect extraction processing.

Figure 24:
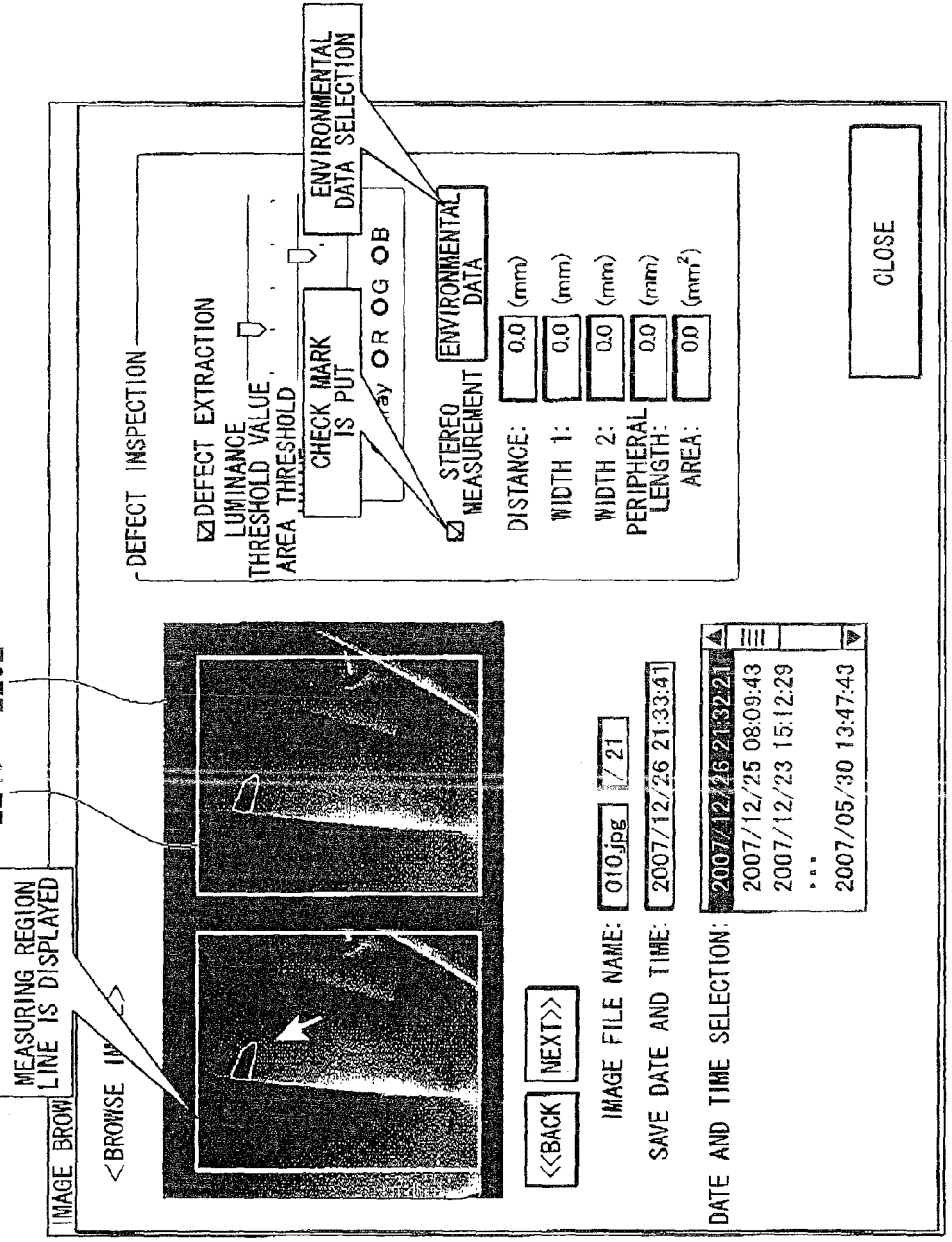
FIG. 24 is a reference view showing a screen of blade recording software according to the second embodiment of the invention.

A [stereo measurement] check box 2220 is a check box for performing stereo measurement, which will be described later, on the browse image 2202. If the user puts a check mark in the [stereo measurement] check box 2220 in a state where the [defect extraction] check box 2210 is checked, a measurement region line 2240 is superimposed on the browse image 2202 as shown in FIG. 24, such that the defect extracted by the defect extraction processing can be subjected to stereo measurement.

Figure 25:
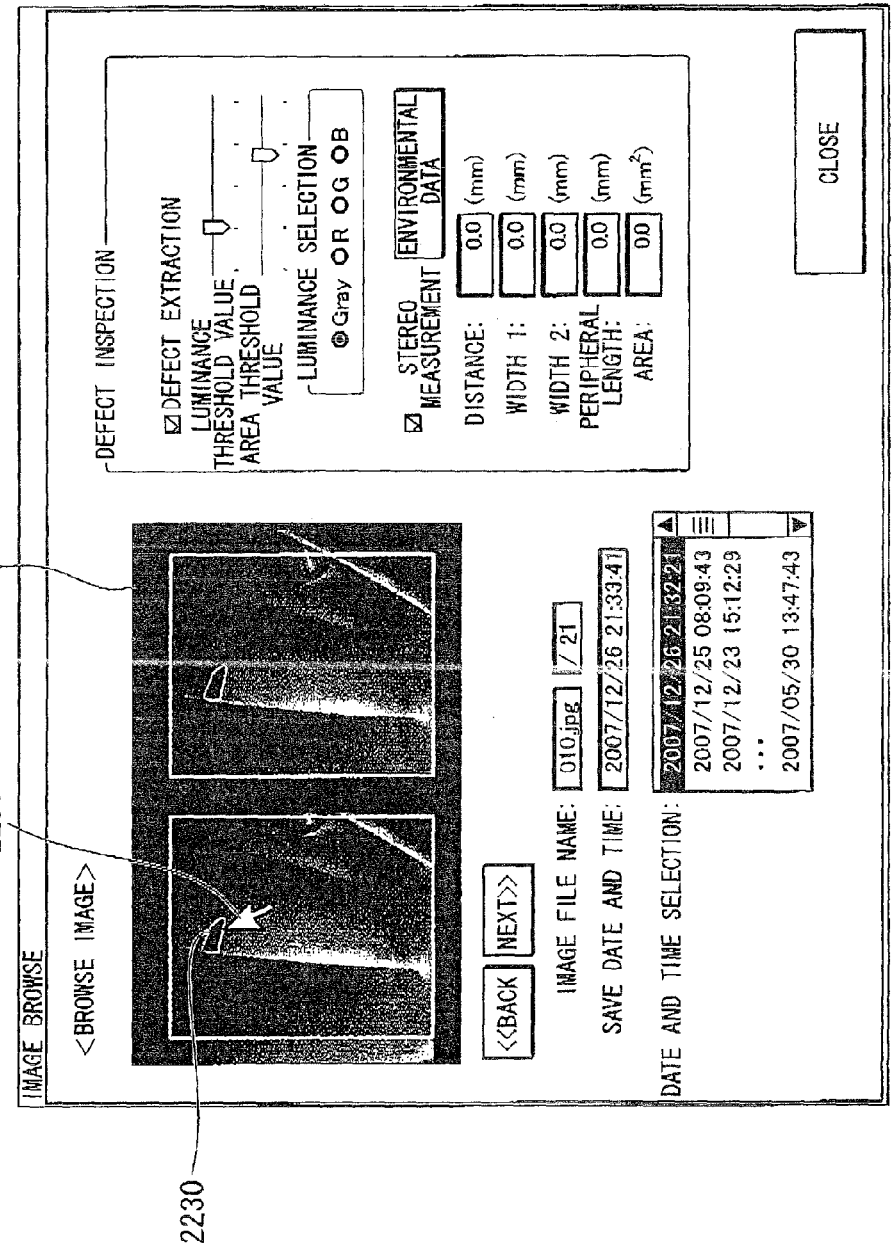
FIG. 25 is a reference view showing a screen of blade recording software according to the second embodiment of the invention.
Figure 26:
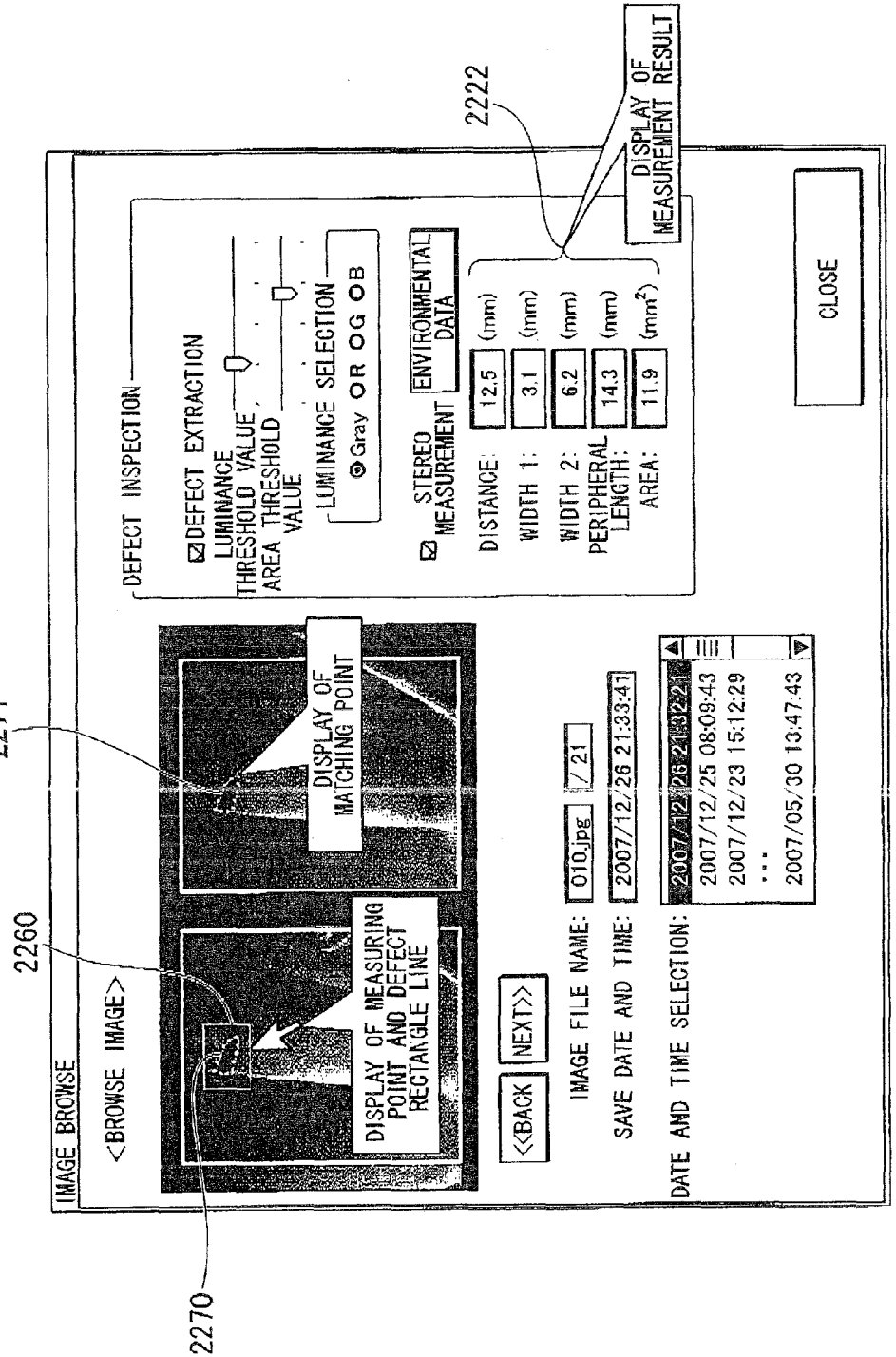
FIG. 26 is a reference view showing a screen of blade recording software according to the second embodiment of the invention.

The measurement region line 2240 is a borderline of the region where the stereo measurement can be performed in the browse image 2202, and is displayed as a pair of left and right rectangle lines. In addition, if a user moves a cursor 2250 to the defect contour 2230 superimposed on a left image of the browse image 2202 and designates the defect contour 2230 by left clicking or the like as shown in FIG. 25, the defect contour 2230 is surrounded by a defect rectangle line 2260 and a measurement point 2270 is displayed on the left image and a matching point 2271 is displayed on the right image as shown in FIG. 26. Details of a defect rectangle line, a measurement point, and a matching point will be described later. In addition, a result of stereo measurement regarding the designated defect is displayed in a [measurement result] box 2222 to be described later. This operation in which a result of stereo measurement regarding the designated defect is displayed in the [measurement result] box 2222 after the user put a check mark in the [stereo measurement] check box 2220 is performed by a measurement section 34$c_5$ of the CPU 34$c$. Here, the operation in which the user moves the cursor 2250 to the defect contour 2230, which is superimposed on the left image of the browse image 2202, and designates the defect contour 2230 by left clicking or the like, that is, an instruction to select among the defects extracted by the defect extracting section 34$c_4$ is made by inputting an instruction to an input unit 100 such as a mouse which is connected to the PC 6.

An [environmental data] button 2221 shown in FIG. 22 is a button for selecting the environmental data. The environmental data is data used when performing stereo measurement and includes data for correcting optical distortion of a stereo optical adapter. The environmental data is the same as that disclosed in Japanese Unexamined Patent Application, First Publication No. 2001-275934.

If the [environmental data] button 2221 is pressed, a file selection dialog (not shown) is opened. Then, a user selects the environmental data on the file selection dialog. The environmental data selected at this time is data corresponding to a stereo optical adapter used when imaging an image. Moreover, the [stereo measurement] check box 2220 changes from an invalid state to a valid state, so that it becomes possible to put a check mark in the [stereo measurement] check box 2220.

In addition, when the browse image is not an image for stereo measurement (a pair of left and right images), the [stereo measurement] check box and the [environmental data] button become always invalid so that the stereo measurement cannot be performed.

The [measurement result] box 2222 is a box for displaying a measurement result. There are five kinds of measurement results including a distance, widths 1 and 2, a peripheral length, and an area. Details of the measurement result will be described later.

Figure 27:
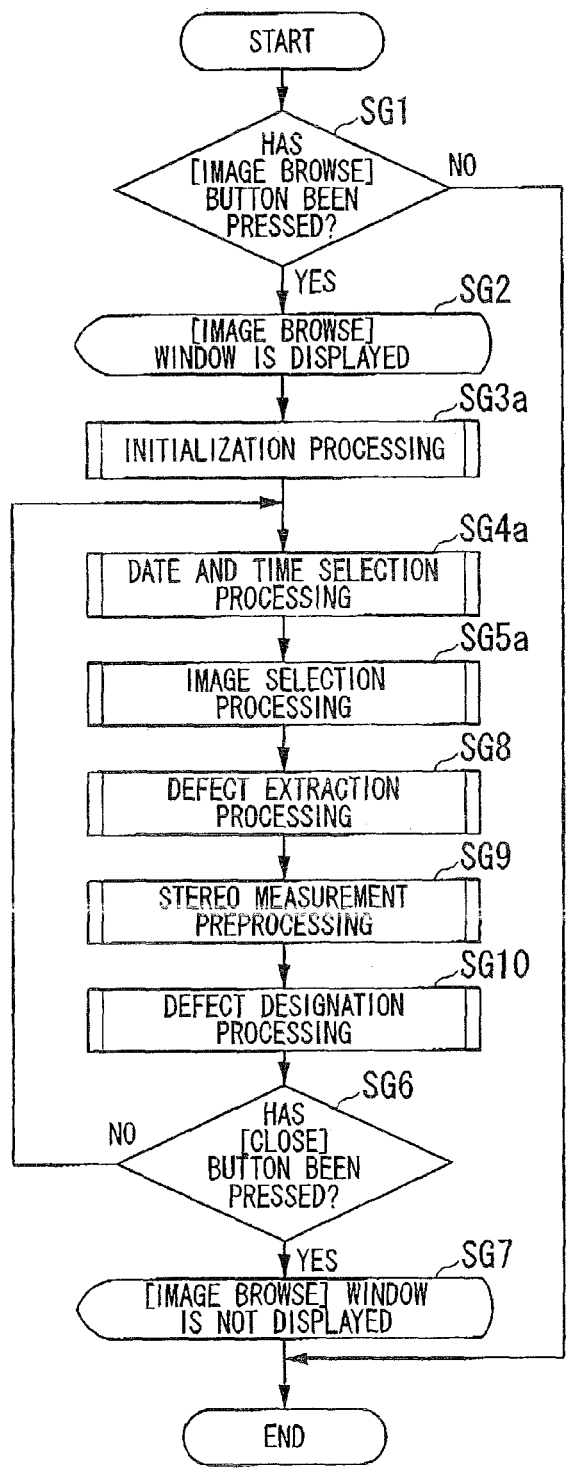
FIG. 27 is a flow chart showing the procedure of an operation based on blade recording software according to the second embodiment of the invention.

Next, the flow of image browse processing in the present embodiment will be described with reference to FIG. 27. The contents of initialization processing in step SG3$a$, the date and time selection processing in step SG4$a$, and image selection processing in step SG5$a$ shown in FIG. 27 are different from the flow (FIG. 18) of the image browse processing in the first embodiment. In addition, the flow of image browse processing in the present embodiment is also different from the flow (FIG. 18) of the image browse processing in the first embodiment in that defect extraction processing in step SG8, stereo measurement preprocessing in step SG9, and defect designation processing in step SG10 are added between step SG5$a$ and step SG6 shown in FIG. 27. Hereinafter, only a different point from the flow (FIG. 18) of the image browse processing in the first embodiment will be described.

In step SG3$a$, the CPU 34$c$ performs initialization processing. Details of the initialization processing will be described later. In step SG4$a$, the CPU 34$c$ performs date and time selection processing. Details of the date and time selection processing will be described later. In step SG5$a$, the CPU 34$c$ performs image selection processing. Details of the image selection processing will be described later.

In step SG8, the CPU 34$c$ performs defect extraction processing. The defect extraction processing is a processing for extracting a defect on a browse image on the basis of a set inspection parameter and superimposing the extracted defect on the browse image. Details of the defect extraction processing will be described later.

In step SG9, the CPU 34$c$ performs stereo measurement preprocessing. The stereo measurement preprocessing is a processing of correcting a browse image on the basis of selected environmental data so that stereo measurement of the browse image is possible. Details of the stereo measurement preprocessing will be described later.

In step SG10, the CPU 34$c$ performs defect designation processing. The defect designation processing is a processing in which the CPU 34$c$ detects that a user has designated a defect superimposed on the browse image and displays a measurement result of a defect size in the [measurement result] box 2222. Details of the defect designation processing will be described later.

Figure 28:
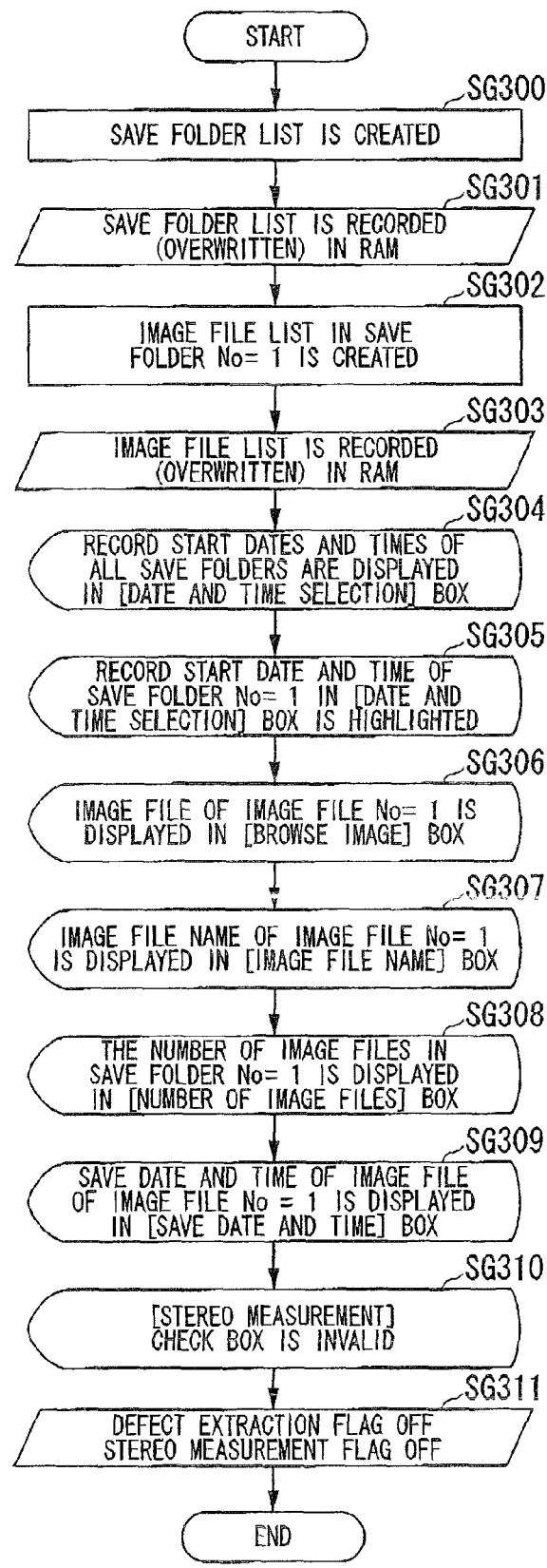
FIG. 28 is a flow chart showing the procedure of an operation based on blade recording software according to the second embodiment of the invention.

Next, the flow of initialization processing in step SG3$a$ will be described with reference to FIG. 28. The point that steps SG310 and SG311 are added after step SG309 shown in FIG. 28 is different from the flow (FIG. 19) of the initialization processing in the first embodiment. Hereinafter, only a different point from the flow (FIG. 19) of the initialization processing in the first embodiment will be described.

Figure 29:
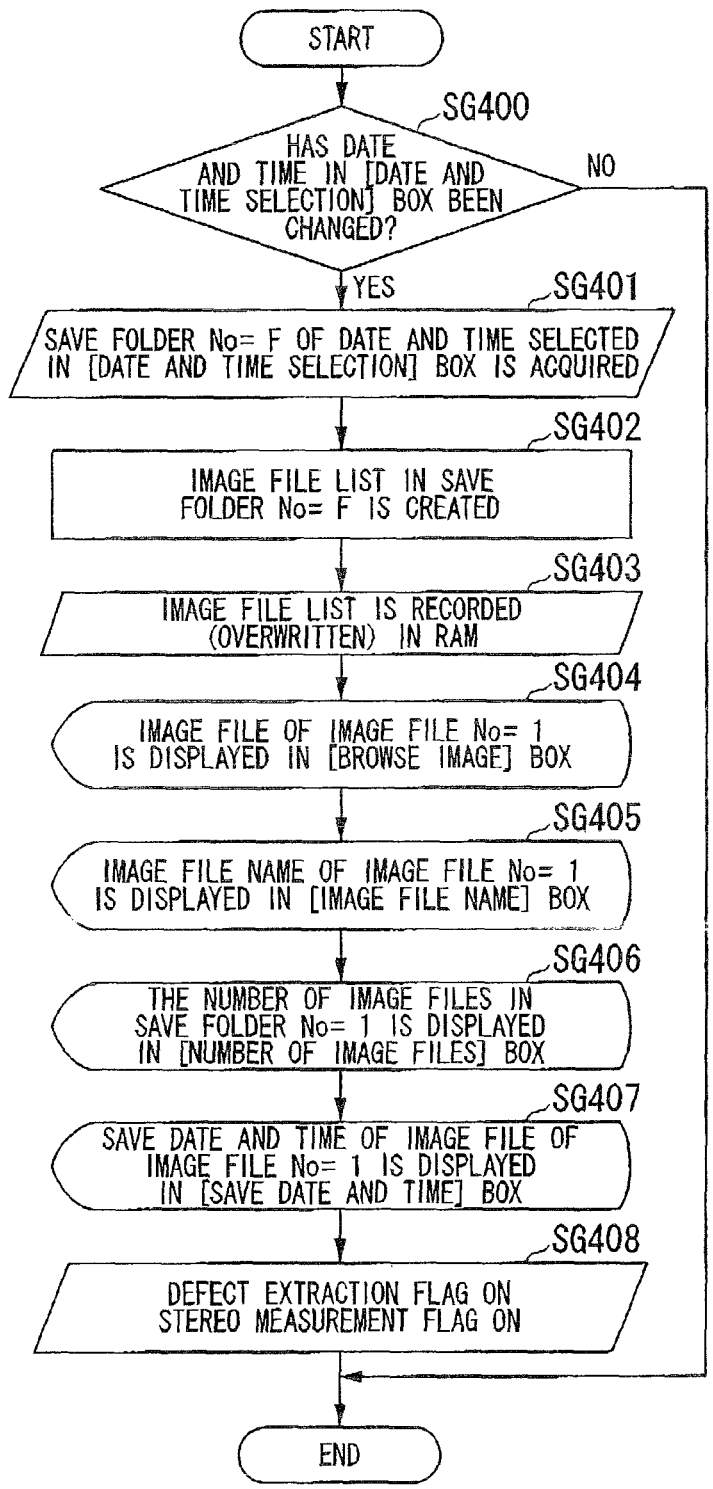
FIG. 29 is a flow chart showing the procedure of an operation based on blade recording software according to the second embodiment of the invention.

In step SG310, the CPU 34$c$ invalidates a [stereo measurement] check box. In step SG311, the CPU 34$c$ sets a defect extraction flag and a stereo measurement flag to OFF and records them in the RAM 34$a$. The defect extraction flag is a flag indicating whether or not to perform the defect extraction processing. The stereo measurement flag is a flag indicating whether or not to perform the stereo measurement preprocessing. Next, the flow of date and time selection processing in step SG4$a$ will be described with reference to FIG. 29. The point that step SG408 is added after step SG407 shown in FIG. 29 is different from the flow (FIG. 20) of the date and time selection processing in the first embodiment. Hereinafter, only a different point from the flow (FIG. 20) of the date and time selection processing in the first embodiment will be described.

In step SG408, the CPU 34c sets a defect extraction flag and a stereo measurement flag to ON and records them in the RAM 34a. The reason why the defect extraction flag and the stereo measurement flag are set to ON in step SG408 is that if the selection of record start date and time of a [date and time selection] box is changed in step SG400, it is necessary to perform the defect extraction processing and the stereo measurement preprocessing again since the browse image is changed. Moreover, when an image file is displayed in the [browse image] box in step SG404, all measurement region lines and the like which are already superimposed are not displayed.

Figure 30:
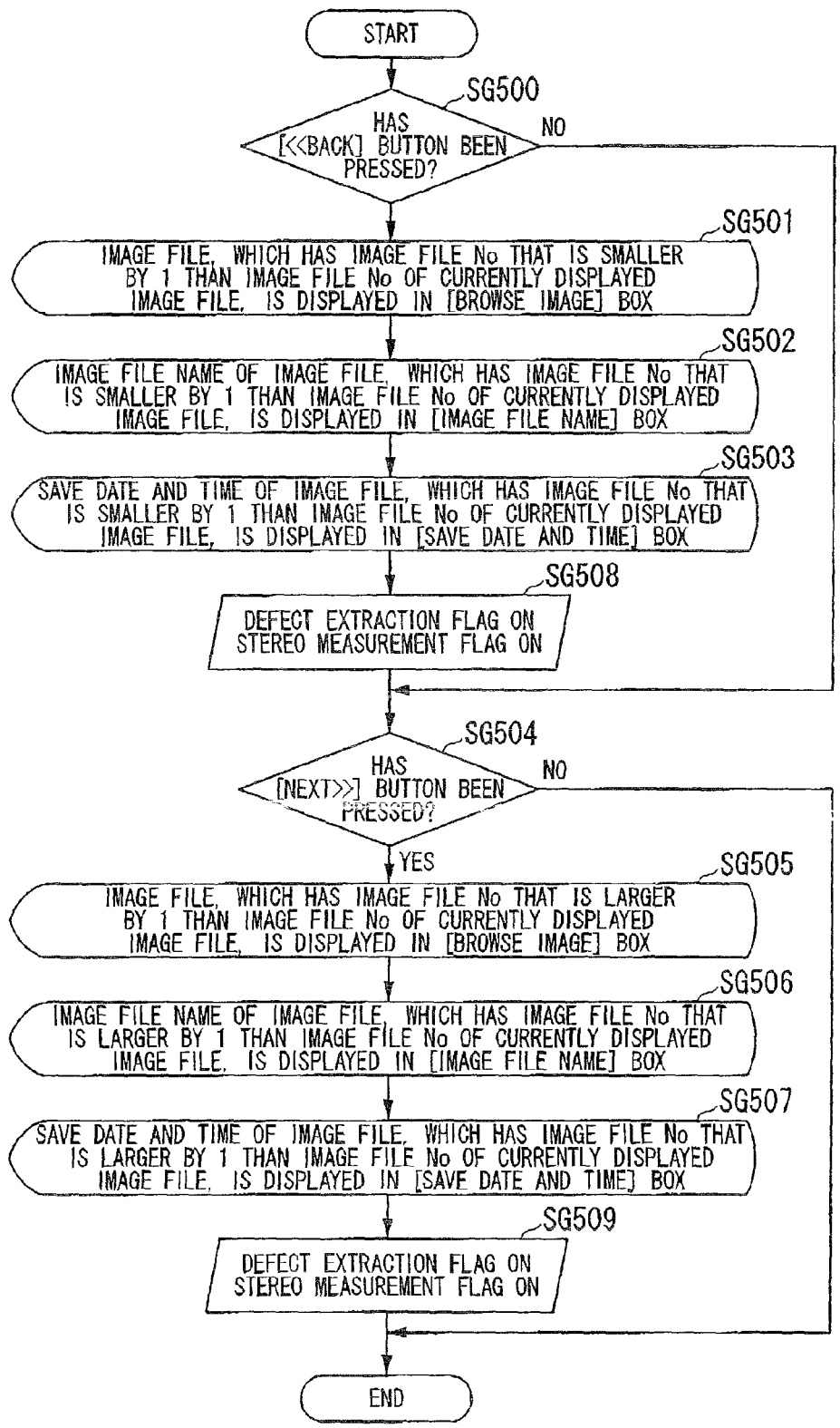
FIG. 30 is a flow chart showing the procedure of an operation based on blade recording software according to the second embodiment of the invention.

Next, the flow of image selection processing in step SG5 will be described with reference to FIG. 30. The point that step SG508 is added after step SG503 shown in FIG. 30 and step SG509 is added after step SG507 is different from the flow (FIG. 21) of the image selection processing in the first embodiment. Hereinafter, only a different point from the flow (FIG. 21) of the image selection processing in the first embodiment will be described.

In step SG508, the CPU 34c sets a defect extraction flag and a stereo measurement flag to ON and records them in the RAM 34e. In step SG509, the CPU 34c sets a defect extraction flag and a stereo measurement flag to ON and records them in the RAM 34a. The reason why the defect extraction flag and the stereo measurement flag are set to ON in steps SG508 and SG509 is that if the [<<back] button and the [next>>] button are pressed in steps SG500 and SG504, it is necessary to perform the defect extraction processing and the stereo measurement preprocessing again since the browse image is changed. Moreover, when an image file is displayed in the [browse image] box in steps SG501 and SG505, all measurement region lines and the like which are already superimposed are not displayed.

Figure 31:
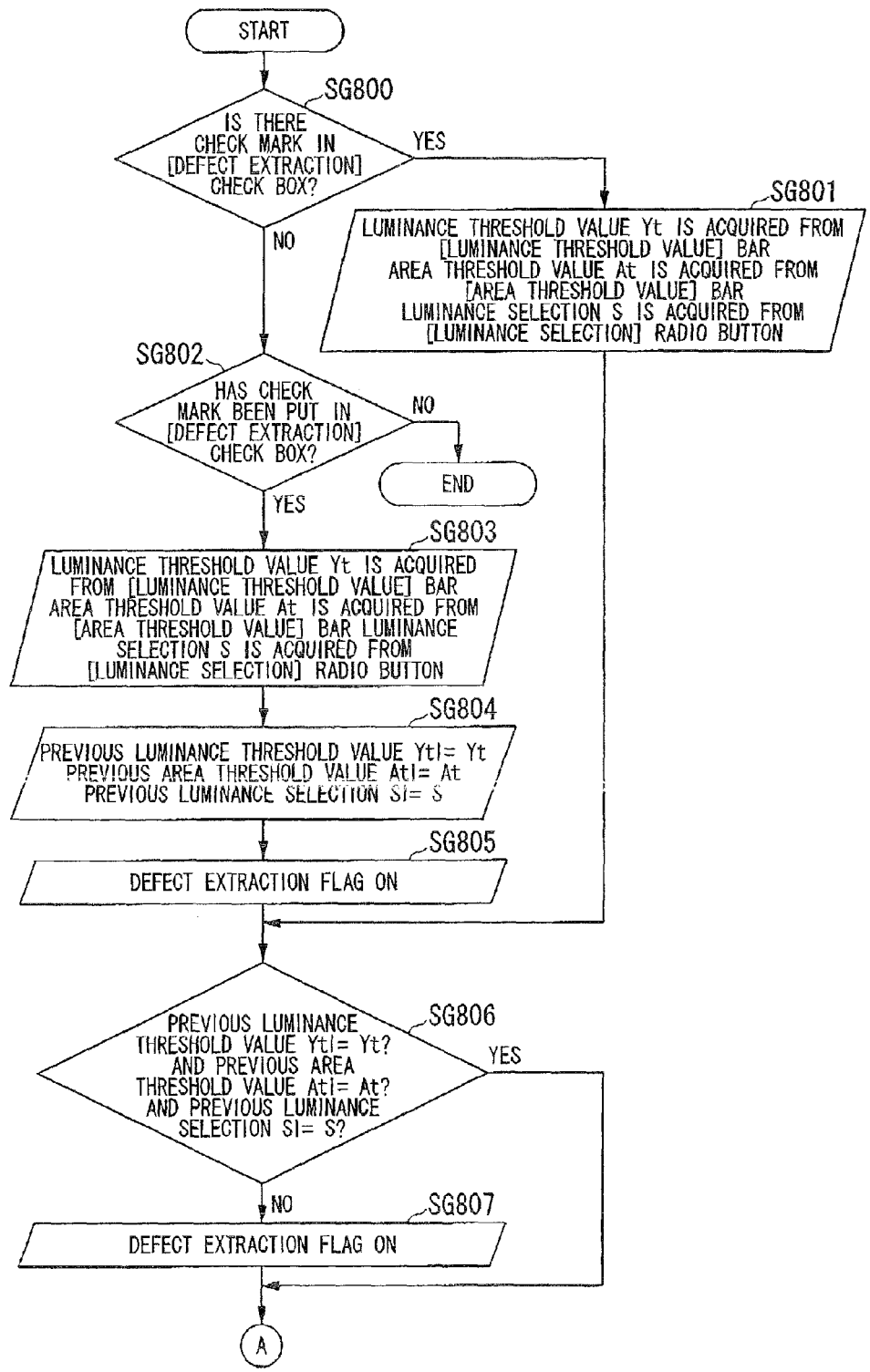
FIG. 31 is a flow chart showing the procedure of an operation based on blade recording software according to the second embodiment of the invention.
Figure 32:
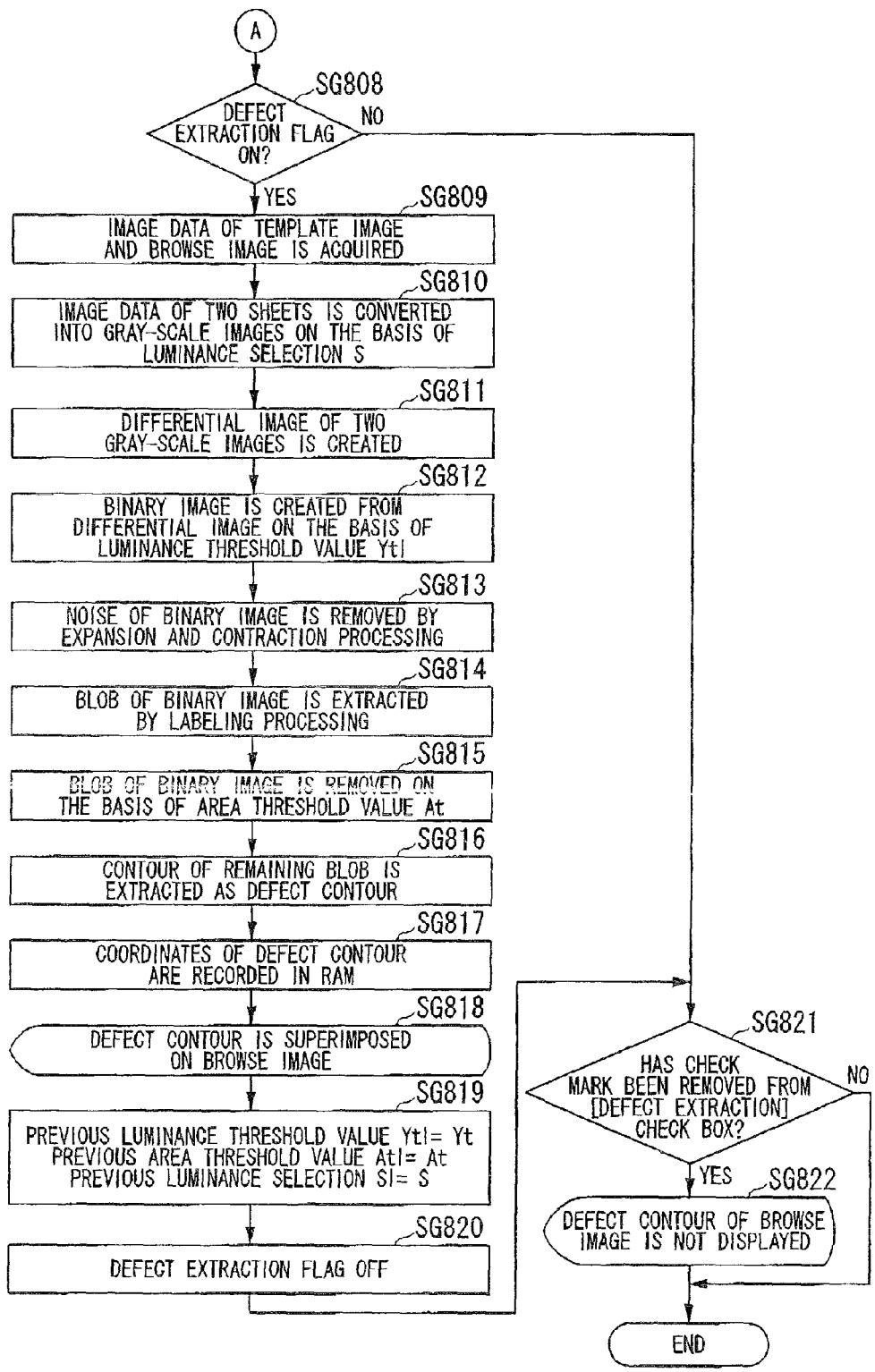
FIG. 32 is a flow chart showing the procedure of an operation based on blade recording software according to the second embodiment of the invention.

Next, the flow of defect extraction processing in step SG8 will be described with reference to FIGS. 31 and 32. In step SG800, the CPU 34c checks whether or not the [defect extraction] check box has been checked. If the [defect extraction] check box has been checked, the process proceeds to step SG801. If the [defect extraction] check box is not checked, the process proceeds to step SG802.

In step SG801, the CPU 34c acquires the luminance threshold value Yt, the area threshold value At, and the luminance selection S from a [luminance threshold value] bar, an [area threshold value] bar, and a [luminance selection] radio button, respectively, and records them in the RAM 34a. In step SG802, the CPU 34c checks whether or not there has been an instruction from the user to put a check mark in the [defect extraction] check box. If there has been an instruction to put a check mark in the [defect extraction] check box, the process proceeds to step SG803. If there is no instruction to put a check mark in the [defect extraction] check box, the process proceeds to step SG9.

In step SG803, similar to step SG801, the CPU 34c acquires the luminance threshold value Yt, the area threshold value At, and the luminance selection S from a [luminance threshold value] bar, an [area threshold value] bar, and a [luminance selection] radio button, respectively, and records them in the RAM 34a. In addition, the CPU 34c performs a processing of putting a check mark in the [defect extraction] check box.

In step SG804, the CPU 34c sets the luminance threshold value Yt, the area threshold value At, and the luminance selection S, which were acquired in step SG803, as a previous luminance threshold value Yt1, a previous area threshold value At1, and a previous luminance selection S1, respectively, and records them in the RAM 34a. The luminance threshold value Yt, the area threshold value At, and the luminance selection S used when performing the previous defect extraction processing are temporarily recorded as the previous luminance threshold value Yt1, the previous area threshold value At1, and the previous luminance selection S1, respectively. In step SG805, the CPU 34c sets a defect extraction flag to ON and records it in the RAM 34a.

In step SG806, the CPU 34c checks whether or not the luminance threshold value Yt is equal to the previous luminance threshold value Yt1, whether or not the area threshold value At is equal to the previous area threshold value At1, and whether or not the luminance selection S is equal to the previous luminance selection S1. The processing in step SG806 is processing of checking whether or not inspection parameters used when performing the previous defect extraction processing have been changed by the user. If all inspection parameters are equal to those used when performing the previous defect extraction processing, the process proceeds to step SG808. If one or more inspection parameters are different from those used when performing the previous defect extraction processing, the process proceeds to step SG807. In step SG807, the CPU 34c sets a defect extraction flag to ON and records it in the RAM 34a.

In step SG808, the CPU 34c checks whether or not the defect extraction flag is ON. If the defect extraction flag is ON, the process proceeds to step SG809. If the defect extraction flag is OFF, the process proceeds to step SG821.

Figure 33:
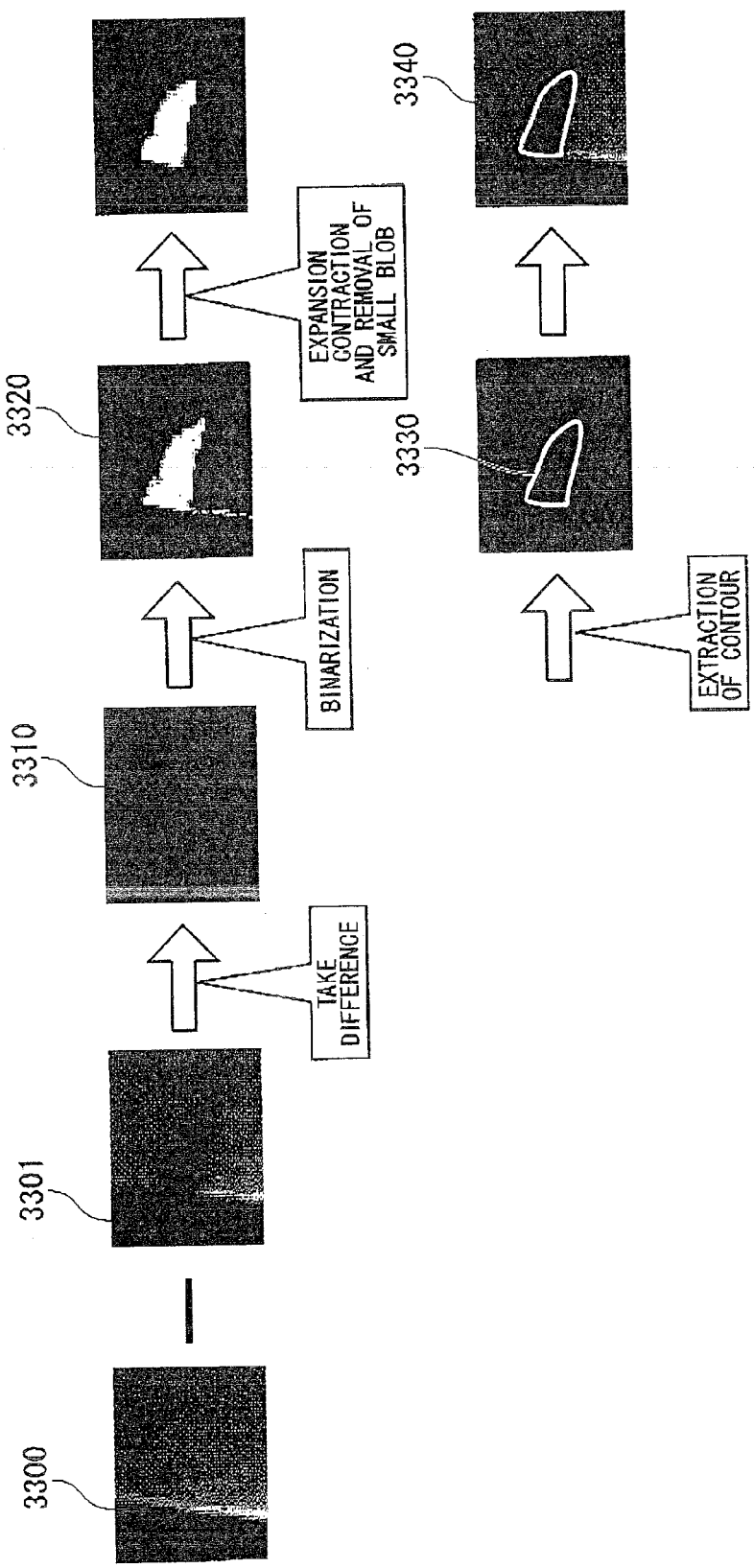
FIG. 33 is a reference view for showing defect extraction processing according to the second embodiment of the invention.

Hereinafter, FIG. 33 will also be used appropriately to describe steps SG809 to SG818. In step SG809, the CPU 34c acquires the image data of the template image file and the browse image file saved in a save folder and records them in the RAM 34a. The image data refers to the RGB luminance value of each pixel of an image.

In step SG810, the CPU 34c converts the acquired two image data into gray-scale images on the basis of the luminance selection S recorded in the RAM 34a in step SG801 or SG803. When the luminance selection S is "Gray", the luminance value Y of each pixel of the gray-scale image is calculated from the RGB luminance value of each pixel of image data using the following expression (8), $$Y=0.299 \times R+0.587 \times G+0.114 \times B \tag{8}$$

In addition, when the luminance selection S is one of "R", "G", and "B", the luminance value of each of R, G, and B of each pixel of the image data becomes a luminance value Y of each pixel of a gray-scale image as it is.

In step SG811, the CPU 34c creates an image (hereinafter, described as a differential image) corresponding to the difference between the two gray-scale images created in step SG810. (a), (b), and (c) of FIG. 33 show a situation where a differential image 3310 is created by taking a difference between a gray-scale image 3300 of the template image and a gray-scale image 3301 of the browse image. These series of operations are performed by a first difference extracting section $34c_6$ of the CPU 34c.

In step SG812, the CPU 34c creates a binary image by binarizing the differential image on the basis of the luminance threshold value Yt recorded in the RAM 34a. (c) and (d) of FIG. 33 show a situation where a binary image 3320 is created by binarizing the differential image 3310.

In step SG813, the CPU 34c removes a small noise by performing expansion and contraction processing on the created binary image. In step SG814, the CTU 34c extracts a blob (particle) by performing labeling processing on the binary image from which noise was removed in step SG813. In step SG815, the CPU 34c removes a blob with an area, which is smaller than the area threshold value At recorded in the RAM 34a, from the image from which noise was removed in step SG814. (d) and (e) of FIG. 33 show a situation where a small blob is removed from the binary image 3320.

In step SG816, the CPU 34c extracts the contour of a remaining blob, as a defect contour, from the binary image from which a small blob was removed in step SG814. (e) and (d) of FIG. 33 show a situation where a contour 3330 of a blob was extracted. In step SG817, the CPU 34c records the coordinates of the defect contour extracted in step SG816 in the RAM 34a.

In step SG818, the CPU 34c performs a processing of superimposing the defect contour on the browse image on the basis of the coordinates of the defect contour recorded in the RAM 34a. (f) and (g) of FIG. 33 show a situation where the defect contour 3330 is superimposed on a browse image 3340. In step SG819, the CPU 34c sets the luminance threshold value Yt, the area threshold value At, and the luminance selection S, which were recorded in the RAM 34a in step SG801 or SG803, as the previous luminance threshold value Yt1, the previous area threshold value At1, and the previous luminance selection S1, respectively, and records them in the RAM 34a.

In step SG820, the CPU 34c sets a defect extraction flag to OFF and records it in the RAM 34a. In step SG821, the CPU 34c checks whether or not there has been an instruction from the user to remove a check mark from the [defect extraction] check box. If there has been an instruction to remove a check mark from the [defect extraction] check box, the process proceeds to step SG822. If there is no instruction to remove a check mark from the [defect extraction] check box, the process proceeds to step SG9.

In step SG822, the CPU 34c performs a processing of making the defect contour, which is displayed on the browse image, not displayed on the basis of the coordinates of the defect contour recorded in the RAM 34a in step SG817. In addition, the CPU 34c performs a processing of removing a check mark from the [defect extraction] check box. After the processing in step SG822 ends, the process proceeds to step SG9.

Figure 34:
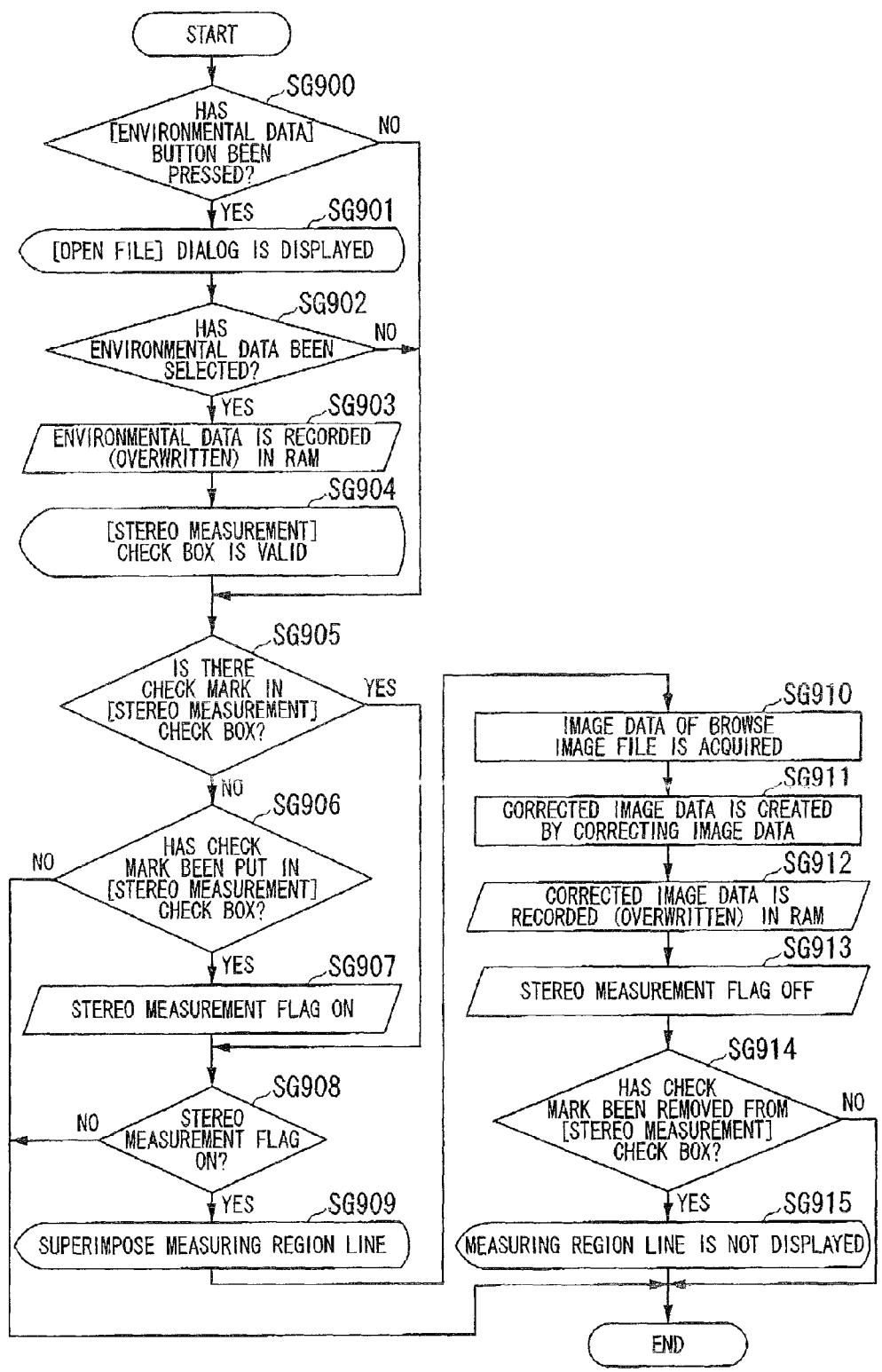
FIG. 34 is a flow chart showing the procedure of an operation based on blade recording software according to the second embodiment of the invention.

Next, the flow of stereo measurement preprocessing in step SG9 will be described with reference to FIG. 34. In step SG900, the CPU 34c checks whether or not an [environmental data] button has been pressed by the user. If the [environmental data] button has been pressed, the process proceeds to step SG901. If the [environmental data] button is not pressed, the process proceeds to step SG905.

In step SG901, the CPU 34c performs a processing for displaying an [open a file] dialog (not shown). In step SG902, the CPU 34c checks whether or not the user has selected the environmental data on the [open a file] dialog. If the environmental data has been selected, the process proceeds to step SG903. If the environmental data has not been selected, the process proceeds to step SG905.

In step SG903, the CPU 34c records the selected environmental data in the RAM 34a. The environmental data recorded in the RAM 34a is overwritten whenever the environmental data is selected. In step SG904, the CPU 34c validates the [stereo measurement] check box. In step SG905, the CPU 34c checks whether or not there is a check mark in the [stereo measurement] check box. If there is a check mark in the [stereo measurement] check box, the process proceeds to step SG908. If there is no check mark in the [stereo measurement] check box, the process proceeds to step SG906.

In step SG906, the CPU 34c checks whether or not there has been an instruction from the user to put a check mark in the [stereo measurement] check box. If there has been an instruction to put a check mark in the [stereo measurement] check box, the process proceeds to step SG907. If there is no instruction to put a check mark in the [stereo measurement] check box, the stereo measurement preprocessing (SG9) ends and the process proceeds to step SG10.

In step SG907, the CPU 34c sets a stereo measurement flag to ON and records it in the RAM 34a. In addition, the CPU 34c performs a processing of putting a check mark in the [stereo measurement] check box. In step SG908, the CPU 34c checks whether or not the stereo measurement flag is ON. If the stereo measurement flag is ON, the process proceeds to step SG909. If the stereo measurement Dag is OFF, the process proceeds to step SG10.

In step SG909, the CPU 34c performs a processing of superimposing a measurement region line on the browse image on the basis of the coordinates of the measurement region line recorded in the RAM 34a. The coordinates of the measurement region line are recorded in the RAM 34a as a part of the environmental data.

In step SG910, the CPU 34c acquires the image data of the browse image file saved in the save folder and records it in the RAM 34a. In step SG911, the CPU 34c corrects the image data acquired in step SG910. The correction processing performed in step SG911 is the same as that disclosed in Japanese Unexamined Patent Application No. H10-248806.

In step SG912, the CPU 34c records the image data corrected in step SG911, as correction image data, in the RAM 34a. The correction image data recorded in the RAM 34a is overwritten whenever the correction image data is created. In step SG913, the CPU 34c sets a stereo measurement flag to OFF and records it in the RAM 34a.

In step SG914, the CPU 34c checks whether or not there has been an instruction from the user to remove a check mark from the [stereo measurement] check box. If there has been an instruction to remove a check mark from the [stereo measurement] check box, the process proceeds to step SG915. If there is no instruction to remove a check mark from the [stereo measurement] check box, the process proceeds to step SG10. In step SG915, the CPU 34c performs a processing of making the measurement region line, which is displayed on the browse image, not displayed on the basis of the coordinates of the measurement region line recorded in the RAM 34a. In addition, the CPU 34c performs a processing of removing a check mark from the [stereo measurement] check box. After the processing in step SG915 ends, the process proceeds to step SG10.

Figure 35:
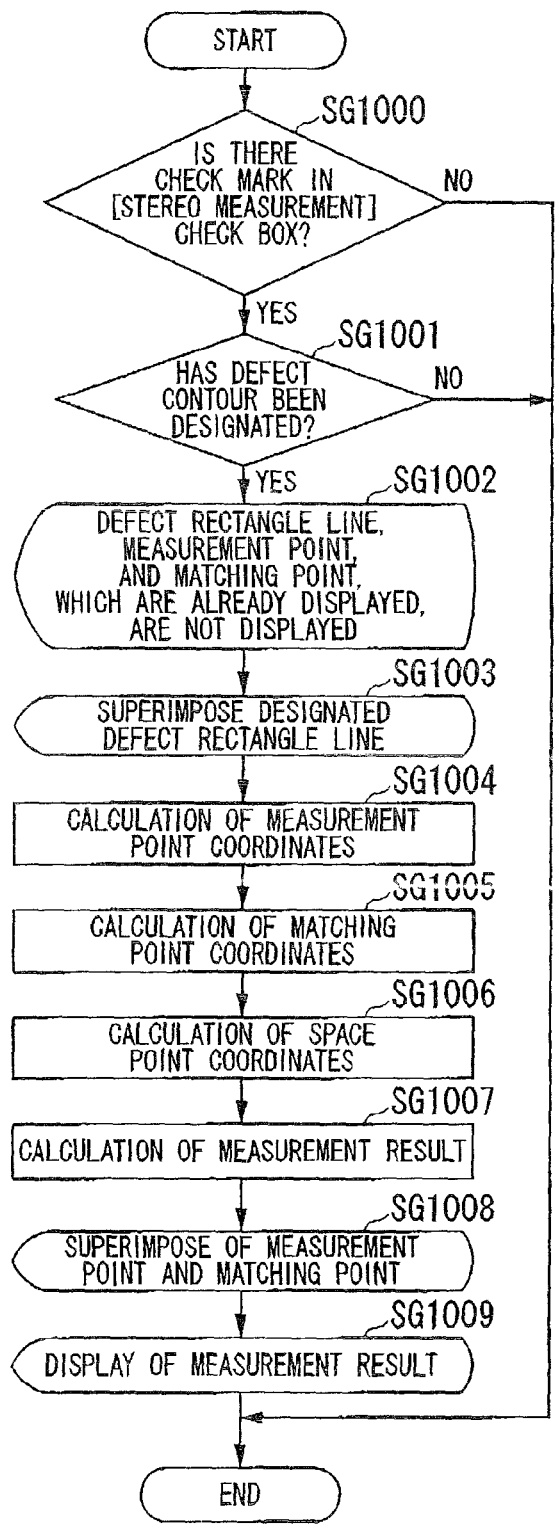
FIG. 35 is a flow chart showing the procedure of an operation based on blade recording software according to the second embodiment of the invention.

Next, the flow of defect designation processing in step SG10 will be described with reference to FIG. 35. In step SG1000, the CPU 34c checks whether or not there is a check mark in the [stereo measurement] check box. If there is a check mark in the [stereo measurement] check box, the process proceeds to step SG1001. If there is no check mark in the [stereo measurement] check box, the process proceeds to step SG6. In step SG1001, the CPU 34c checks whether or not the defect contour displayed in the left measurement region of the browse image has been designated by the user. If the defect contour has been designated by the user, the process proceeds to step SG1002. If the defect contour is not designated by the user, the process proceeds to step SG6.

In step SG1002, the CPU 34c performs a processing of making the defect rectangle line, the measurement point, and the matching point, which are already superimposed on the browse image, not be displayed. In step SG1003, the CPU 34c performs a processing of superimposing the defect rectangle line on the browse image. The defect rectangle line is a rectangle line displayed around a defect region line designated by the user, and indicates that it is the defect contour currently designated by the user.

Hereinafter, FIG. 36 will also be used appropriately to describe steps SG1004 to SG1009. In step SG1004, the CPU 34c calculates the measurement point coordinates on the basis of the coordinates of the defect contour currently designated by the user, which are recorded in the RAM 34a. The measurement point is a point used when measuring the size of a defect. As shown in FIGS. 36A and 36B, measurement points 3610 are located with equal distances on a defect contour 3600.

In step SG1005, the CPU 34c calculates the matching point coordinates in the right measurement region, which correspond to the measurement point coordinates in the left measurement region, on the basis of the image data of the browse image. More specifically, the CPU 34c calculates the coordinates of a matching point, which is corresponding points of the two left and right images, by executing pattern matching processing on the basis of the measurement point coordinates. This pattern matching processing method is the same as that disclosed in Japanese Unexamined Patent Application No. 2004-49638.

In step SG1006, the CPU 34c calculates the space point coordinates (three-dimensional coordinates in the actual space) of each measurement point on the basis of the measurement point coordinates and the matching point coordinates calculated in step SG1004 and SG1005. The method of calculating the space point coordinates is the same as that disclosed in Japanese Unexamined Patent Application No. 2004-49638.

In step SG1007, the CPU 34c calculates a measurement result on the basis of the space point coordinates calculated in step SG1006. There are five kinds of measurement result including a distance, widths 1 and 2, a peripheral length, and an area of a defect.

The distance is an average value of coordinates of all space points in the depth direction. As shown in FIGS. 36C and 36D, the width 1 is a spatial distance between measurement points located nearest to intersections between an equivalent ellipse 3620, which is calculated from all measurement point coordinates, and a long axis 3621 of the ellipse 3620. As shown in FIGS. 36C and 36D, the width 2 is a spatial distance between measurement points located nearest to intersections between the equivalent ellipse 3620 and a short axis 3622 of the ellipse 3620. In addition, the equivalent ellipse is an ellipse which can be approximated from a plurality of coordinates. The peripheral length is the sum of space point distances 3630 of all adjacent measurement points, as shown in FIG. 36E. The area is a space area of a region 3640 surrounded by all adjacent measurement points, as shown in FIG. 36F.

In step SG1008, the CPU 34c performs a processing of superimposing the measurement point in the left measurement region of the browse image while superimposing the matching point in the right measurement region. In step SG1009, the CPU 34c performs a processing of displaying the measurement result calculated in step SG1007 in the [measurement result] box. After the processing in step SG1009 ends, the process proceeds to step SG6.

Figure 37:
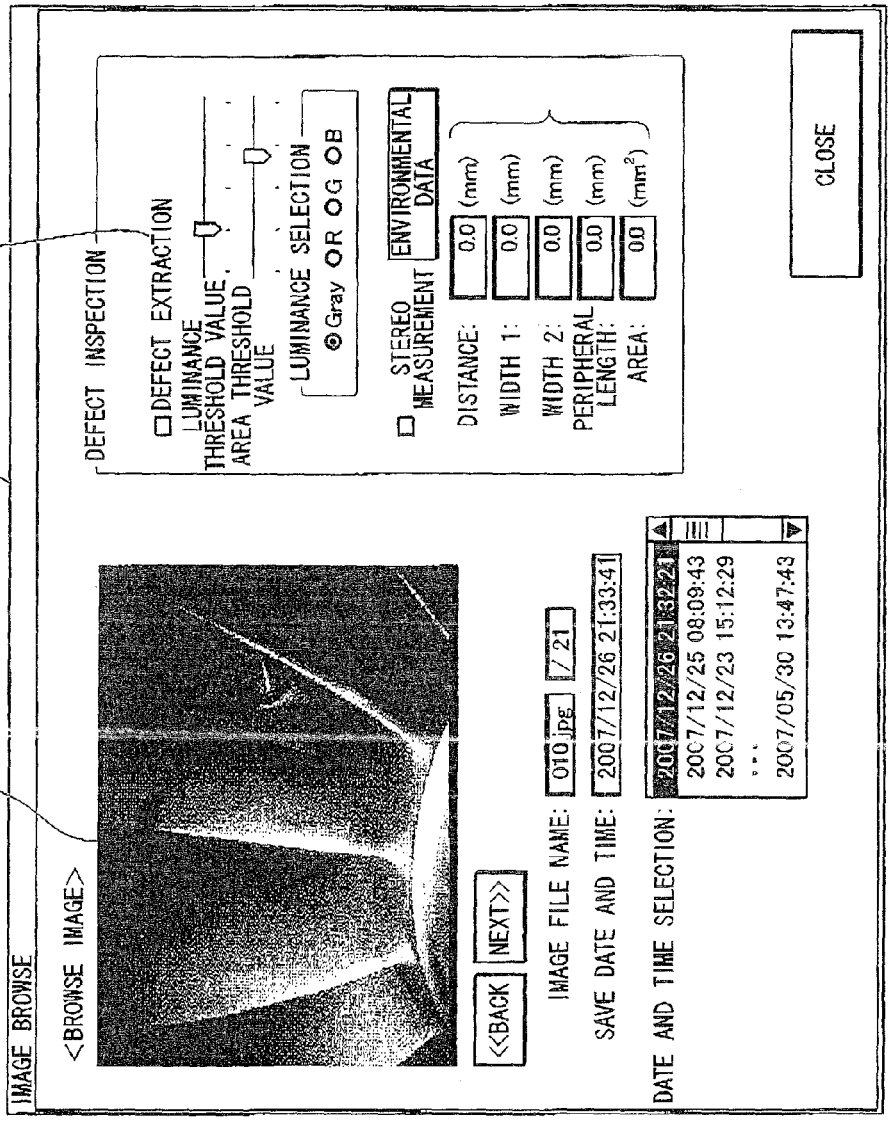
FIG. 37 is a reference view showing a screen of blade recording software according to the second embodiment of the invention.
Figure 38:
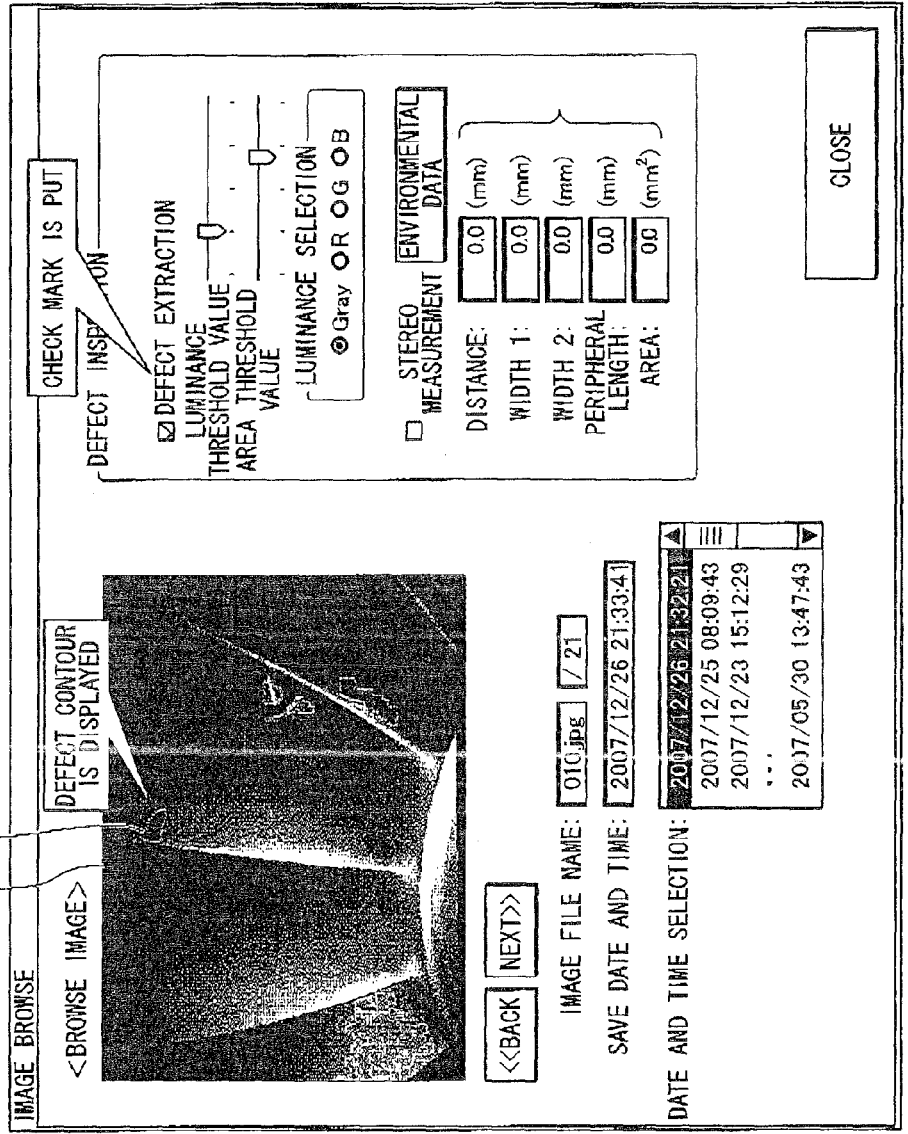
FIG. 38 is a reference view showing a screen of blade recording software according to the second embodiment of the invention.

In the present embodiment, a browse image obtained by imaging using the stereo optical adapter is used. However, a browse image obtained by imaging using optical adapters other than the stereo optical adapter may also be used in the defect extraction processing. On an [image browse] window 3700 shown in FIG. 37, a browse image 3701 obtained by imaging one subject image, which is formed by the optical adapter, is displayed. If a user puts a check mark in the [defect extraction] check box 3710, a defect contour 3720 is superimposed on the browse image 3701 as shown in FIG. 38.

Moreover, in the present embodiment, the defect contour 2230 is displayed at the position, which corresponds to the defect extracted by the defect extraction processing, on the browse image 2202 as shown in FIG. 23. However, things other than a line may also be displayed as long as they can specify the position of a defect. For example, a figure, such as an arrow, may be displayed at the position corresponding to a defect or a phrase, such as "defect", may be displayed.

According to the present embodiment, a defect in a blade can be extracted regardless of the kind of defect by extracting the difference between a browse image and a template image. In addition, it becomes easy for a user to recognize the position of a defect by superimposing the defect contour or the like on the extracted defect.

In addition, the size of a defect can be checked by measuring the extracted defect. In addition, the size of a defect that the user wants to know can be checked by measuring a defect, which is designated when the user designates the defect contour, among defects displayed on the browse image. In addition, the three-dimensional size of a defect can be checked by performing defect extraction processing using a browse image, which is obtained by imaging using a stereo optical adapter, and executing stereo measurement on the basis of the extracted defect.

Third Embodiment

Next, a third embodiment of the invention will be described. On an [image browse] window of blade recording software in the present embodiment, a blade region extracting function is set in addition to the defect extracting function and the stereo measurement function in the second embodiment.

Figure 39:
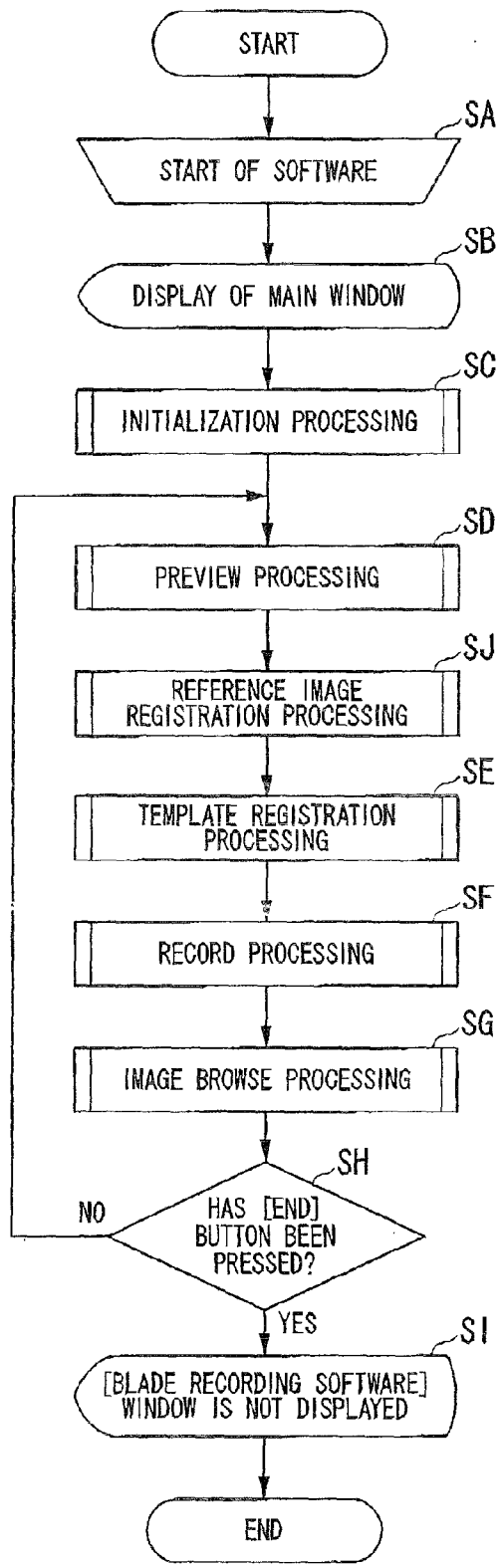
FIG. 39 is a flow chart showing the procedure of an operation based on blade recording software according to a third embodiment of the invention.

Hereinafter, the flow of operation of the blade recording software in the present embodiment will be described with reference to FIG. 39. The contents of initialization processing in step SC, template registration processing in step SE, and record processing in step SF shown in FIG. 39 are different from the flow (FIG. 11) of operation of the blade recording software in the first embodiment. In addition, the point that reference image registration processing in step SJ is added between steps SD and SE shown in FIG. 39 is also different from the flow (FIG. 11) of operation of the blade recording software in the first embodiment. Hereinafter, only a different point from the flow (FIG. 11) of operation of the blade recording software in the first embodiment will be described.

In step SC, the CPU 34c performs initialization processing. Details of the initialization processing will be described later.

In step SJ, the CPU 34c performs reference image registration processing. The reference image is a frame image after one frame from a template image. The reference image is used when extracting a blade region, and will be described later. Details of reference image registration processing will be described later. This reference image registration processing is performed by a reference image extracting section $34c_7$ of the CPU 34c.

In step SE, the CPU 34c performs template registration processing. Details of the template registration processing will be described later.

In step SF, the CPU 34c performs record processing. Details of the record processing will be described later.

Figure 40:
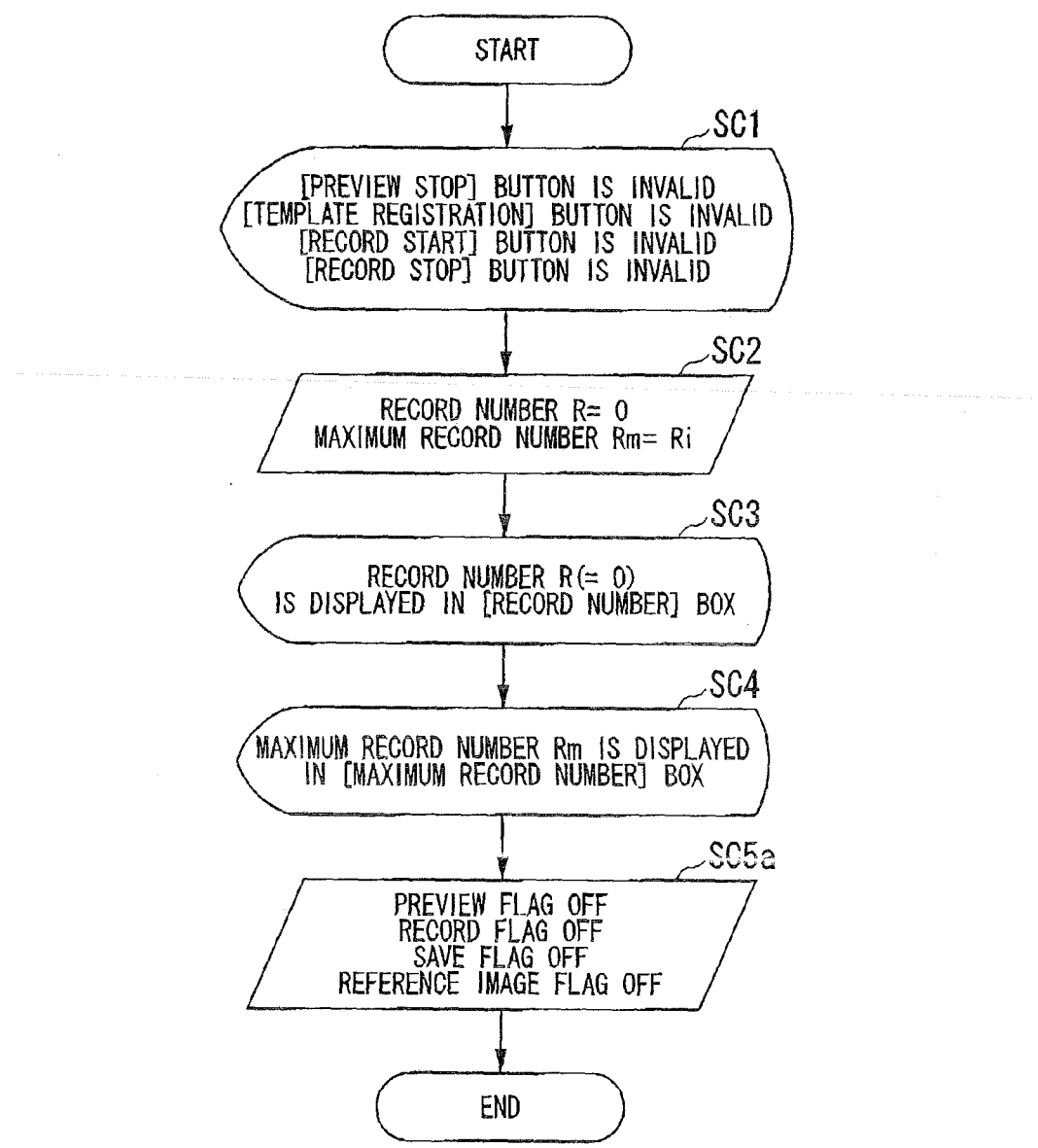
FIG. 40 is a flow chart showing the procedure of an operation based on blade recording software according to the third embodiment of the invention.

Next, the flow of initialization processing in step SC will be described with reference to FIG. 40. The contents of step SC5a shown in FIG. 40 are different from the flow (FIG. 12) of operation of the blade recording software in the first embodiment. Hereinafter, the contents of step SC$5_a$ will be described.

In step SC5a, the CPU 34c sets all of a preview flag, a record flag, a save flag, and a reference image flag to OFF and records them in the RAM 34a. The reference image flag is a flag indicating whether or not a reference image is saved as an image file. Similar to the template image file, the reference image file is saved in a save folder in the memory card 50. A file name of the reference image becomes "Ref.jpg". After the processing in step SC5a ends, the process proceeds to step SD.

Figure 41:
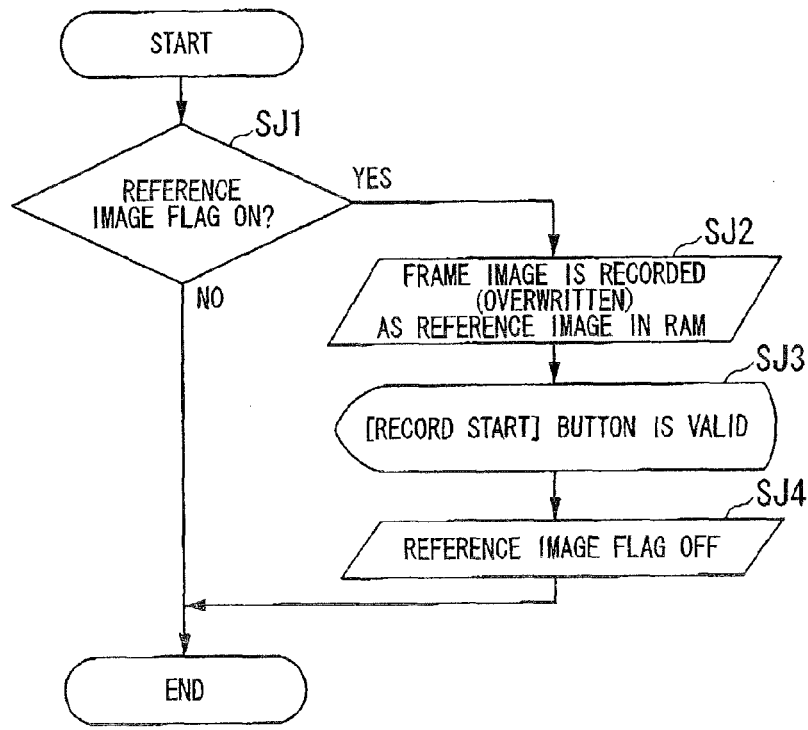
FIG. 41 is a flow chart showing the procedure of an operation based on blade recording software according to the third embodiment of the invention.

Next, the flow of reference image registration processing in step SJ will be described with reference to FIG. 41. In step SJ1, the CPU 34c checks whether or not the reference image flag is ON. If the reference image flag is ON, the process proceeds to step SJ2. If the reference image flag is OFF, the process proceeds to step SE.

In step SJ2, the CPU 34c records the frame image, which is recorded in the RAM 34a, as a reference image in the RAM 34a. In step SJ3, the CPU 34c validates the [record start] button. In step SJ4, the CPU 34c sets a reference image flag to OFF and records it in the RAM 34a. After the processing in step SJ4 ends, the process proceeds to step SE.

Figure 42:
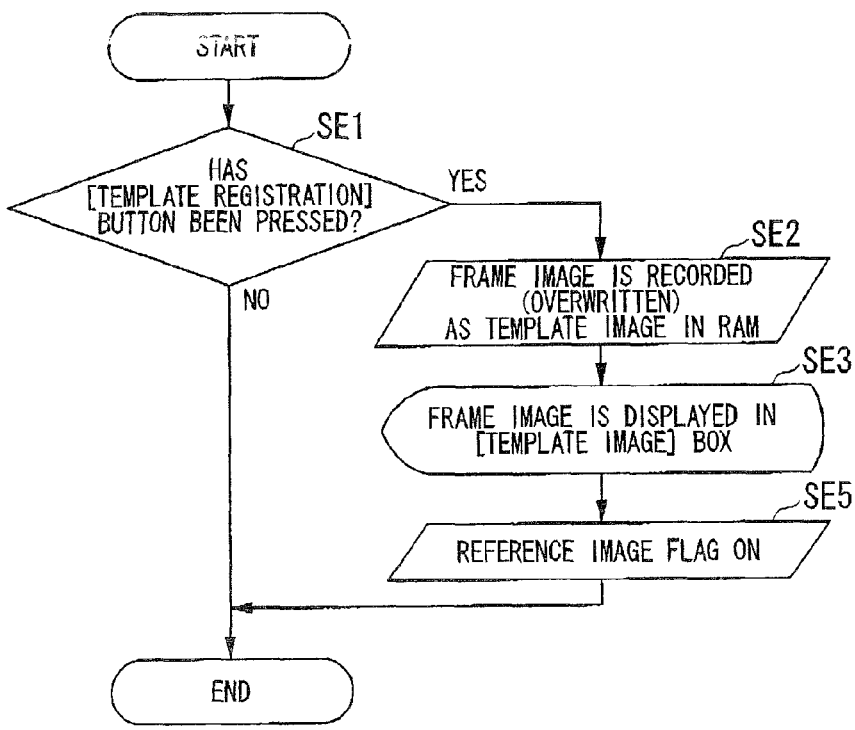
FIG. 42 is a flow chart showing the procedure of an operation based on blade recording software according to the third embodiment of the invention.

Next, the flow of template registration processing in step SE will be described with reference to FIG. 42. The point that step SE4 shown in FIG. 14 is changed to step SE5 is different from the flow (FIG. 14) of operation of the blade recording software in the first embodiment. Hereinafter, the contents of step SE5 will be described.

In step SE5, the CPU 34c sets a reference image flag to ON and records it in the RAM 34a. After the processing in step SE5 ends, the process proceeds to step SF. After a frame image of a certain frame is recorded as a template image in the RAM 34a, the reference image flag is set to ON in step SE5. Accordingly, in step SJ2 shown in FIG. 41, a frame image of the next frame is recorded as a reference image in the RAM 34a.

Figure 43:
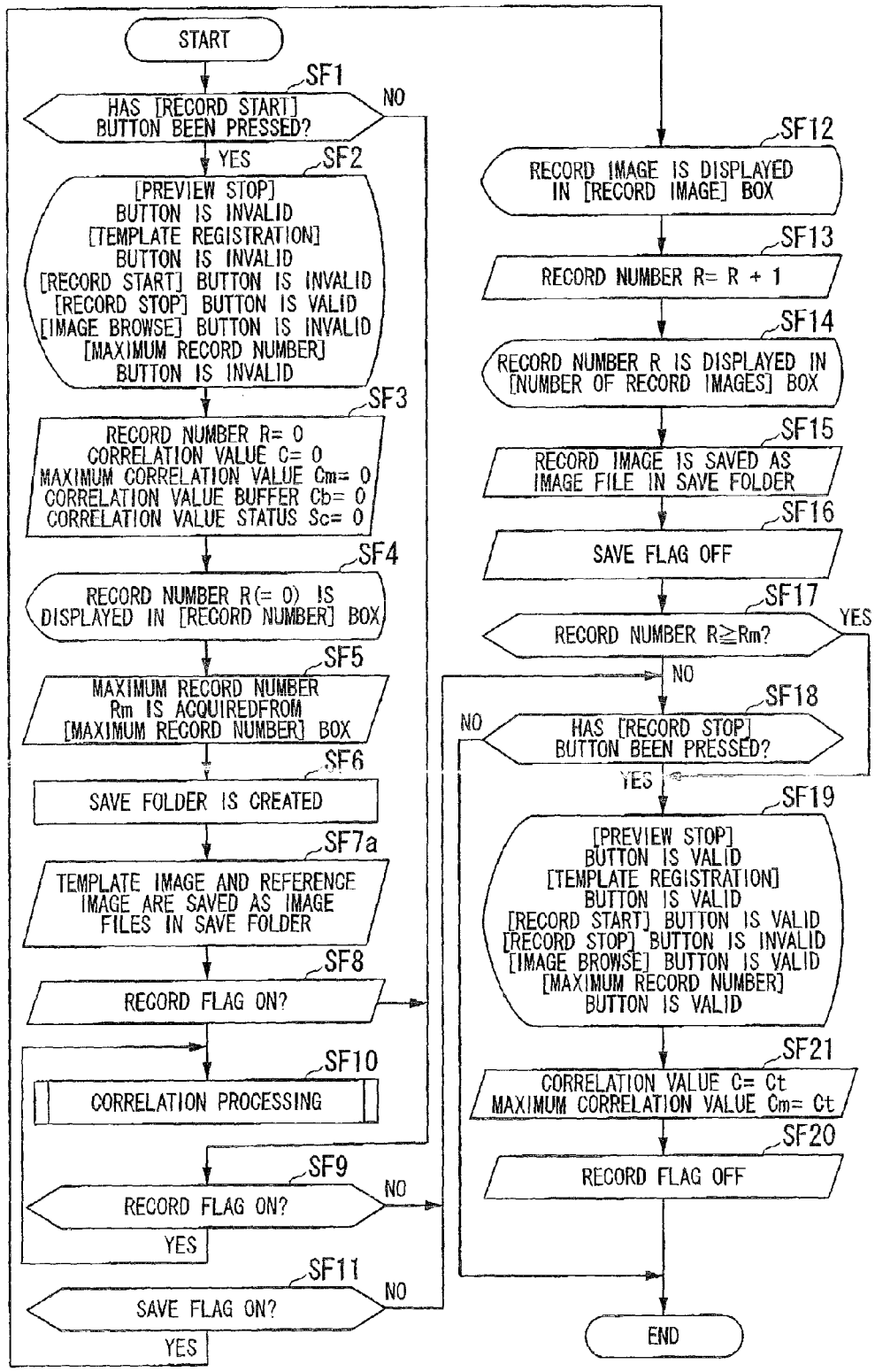
FIG. 43 is a flow chart showing the procedure of an operation based on blade recording software according to the third embodiment of the invention.

Next, the flow of record processing in step SF will be described with reference to FIG. 43. The contents of step SF7a shown in FIG. 43 are different from the contents of step SF7 of the flow (FIG. 15) of operation of the blade recording software in the first embodiment. Hereinafter, the contents of step SF7a will be described.

In step SF7a, the CPU 34c saves the template image and the reference image, which are recorded in the RAM 34a, as image files in a save folder in the memory card 50.

Figure 44:
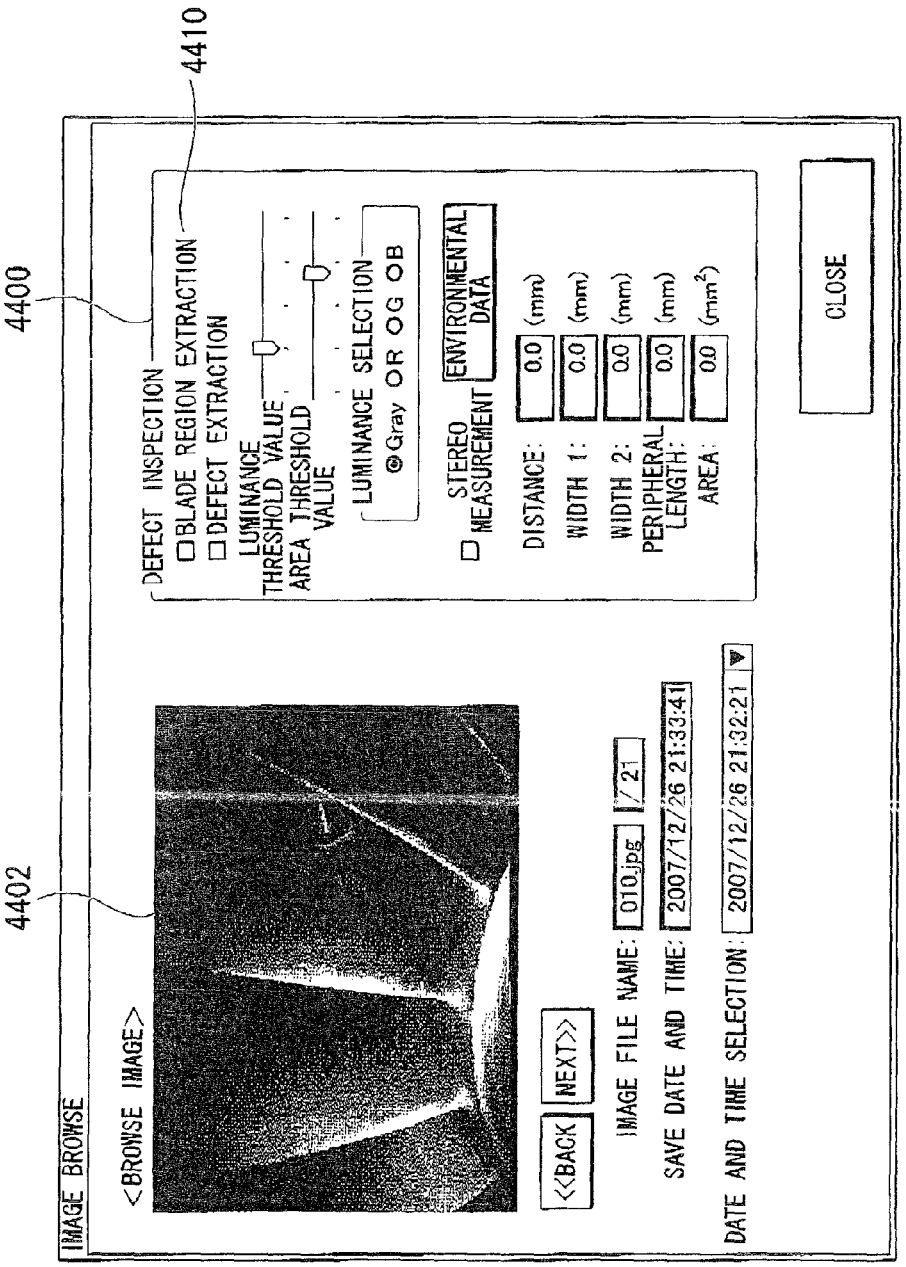
FIG. 44 is a reference view showing a screen of blade recording software according to the third embodiment of the invention.

FIG. 44 shows an [image browse] window in the present embodiment. A point, which is different from the [image browse] window (FIG. 22) in the second embodiment, is that a [blade region extraction] check box 4410 is disposed in a [defect inspection] group box 4400. The following explanation will be focused on the case where a browse image 4402 (display section) is not an image for stereo measurement (a pair of left and right images).

Figure 45:
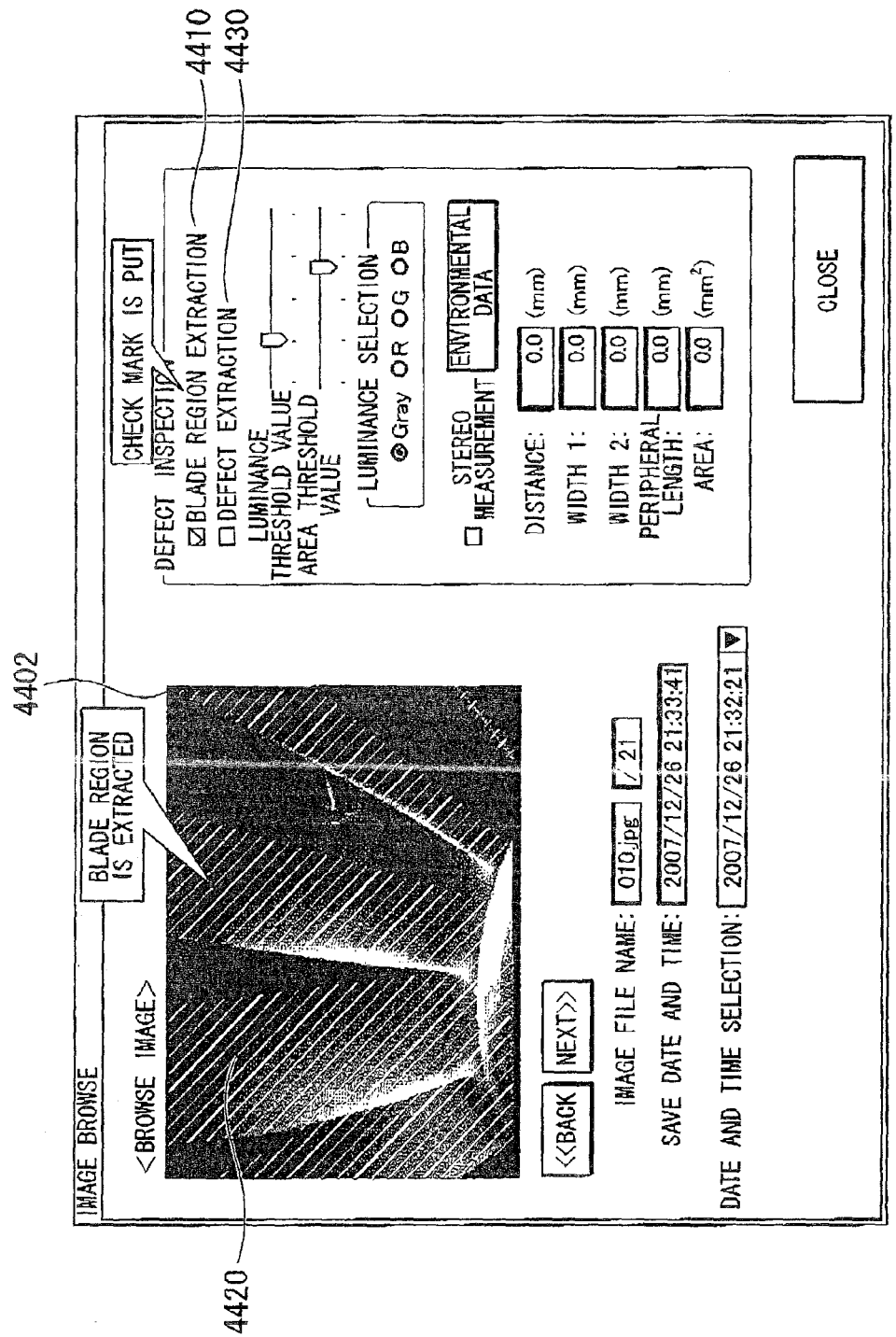
FIG. 45 is a reference view showing a screen of blade recording software according to the third embodiment of the invention.

The [blade region extraction] check box 4410 is a check box for performing blade region extraction processing on the browse image 4402. If a user puts a check mark in the [blade region extraction] check box 4410, a blade region 4420 is superimposed on the browse image 4402 as shown in FIG. 45. In this case, a graphic image showing the blade region 4420 is superimposed on the browse image 4402 so that a user can easily distinguish the blade region 4420 from other regions.

Figure 46:
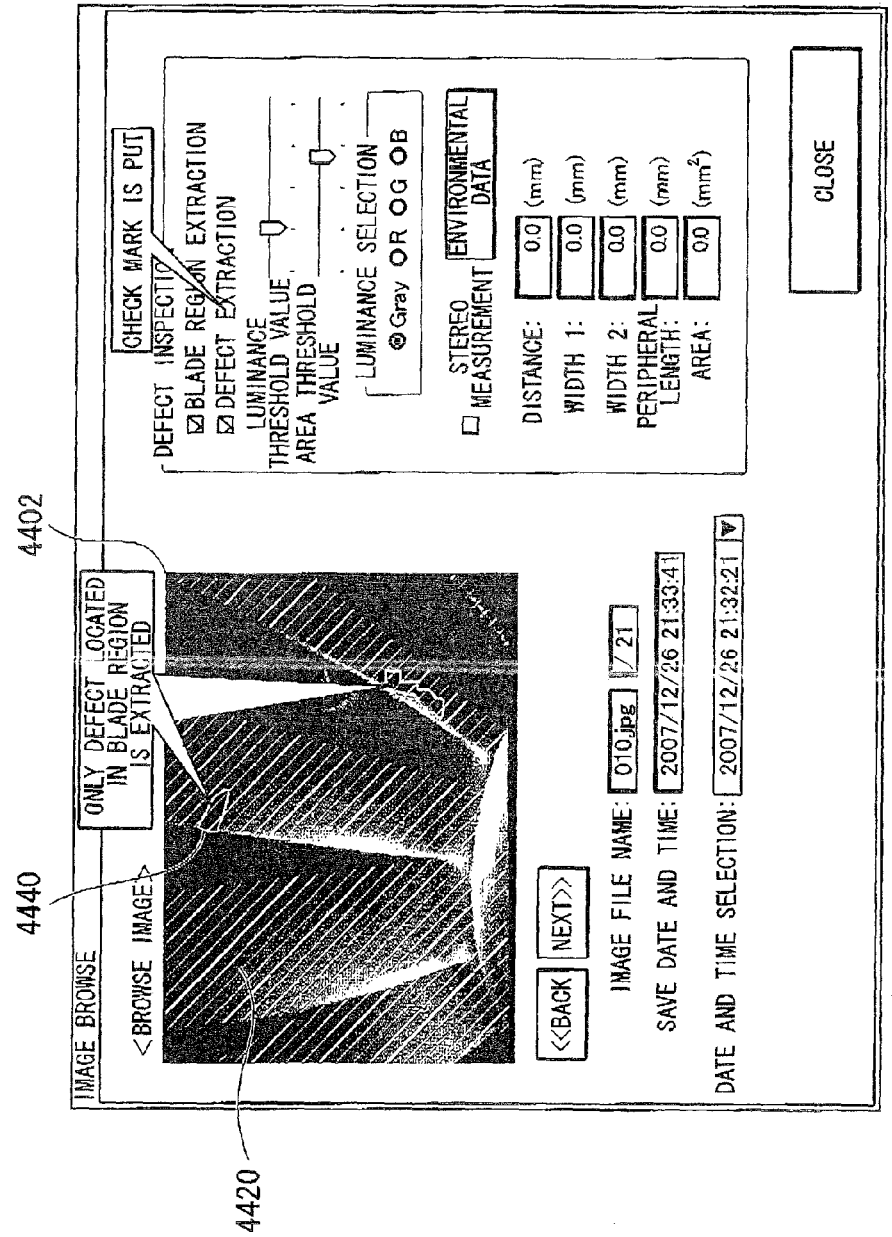
FIG. 46 is a reference view showing a screen of blade recording software according to the third embodiment of the invention.

In addition, if a check mark is put in a [defect extraction] check box 4430 in a state where a check mark is put in the [blade region extraction] check box 4410, a defect contour 4440 is superimposed on the browse image 4402 only for a defect, which is located in the blade region 4420, among the defects extracted by the defect extraction processing and the other defect contour is not displayed, as shown in FIG. 46. Details of the blade region extraction processing will be described later.

Figure 47:
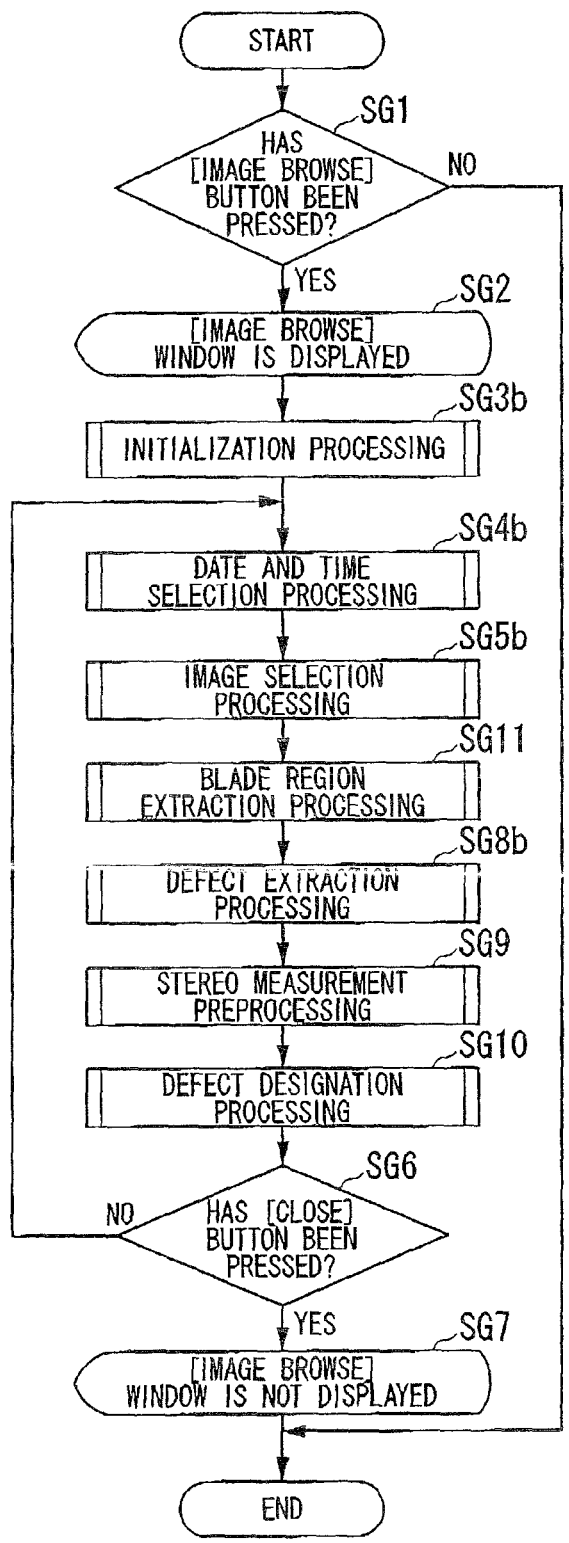
FIG. 47 is a flow chart showing the procedure of an operation based on blade recording software according to the third embodiment of the invention.

Next, the flow of image browse processing in the present embodiment will be described with reference to FIG. 47. The contents of initialization processing in step SG3b, date and time selection processing in step SG4b, image selection processing in step SG5b, and defect extraction processing in step SG8b are different from the contents of steps SG3a, SG4a, SG5a, and SG8 of the flow (FIG. 27) of the image browse processing in the second embodiment. In addition, the point that blade region extraction processing in step SG11 is added between step SG5b and step SG8b shown in FIG. 47 is also different from the flow (FIG. 27) of the image browse processing in the second embodiment. Hereinafter, only a different point from the flow (FIG. 27) of the image browse processing in the second embodiment will be described.

In step SG3b, the CPU 34c performs initialization processing. Details of the initialization processing will be described later. In step SG4b, the CPU 34c performs date and time selection processing. Details of the date and time selection processing will be described later. In step SG5b, the CPU 34c performs image selection processing. Details of the image selection processing will be described later.

In step SG11, the CPU 34c performs blade region extraction processing. The blade region extraction processing is a processing of extracting a blade region by performing the same processing as the defect extraction processing on a browse image and superimposing the extracted blade region on the browse image. In addition, the blade region extraction processing also includes processing of making only a defect, which is located in a blade region among the defects superimposed on the browse image, displayed and the other defects not be displayed. Details of the blade region extraction processing will be described later.

In step SG8b, the CPU 34c performs defect extraction processing. Details of the defect extraction processing will be described later.

Figure 48:
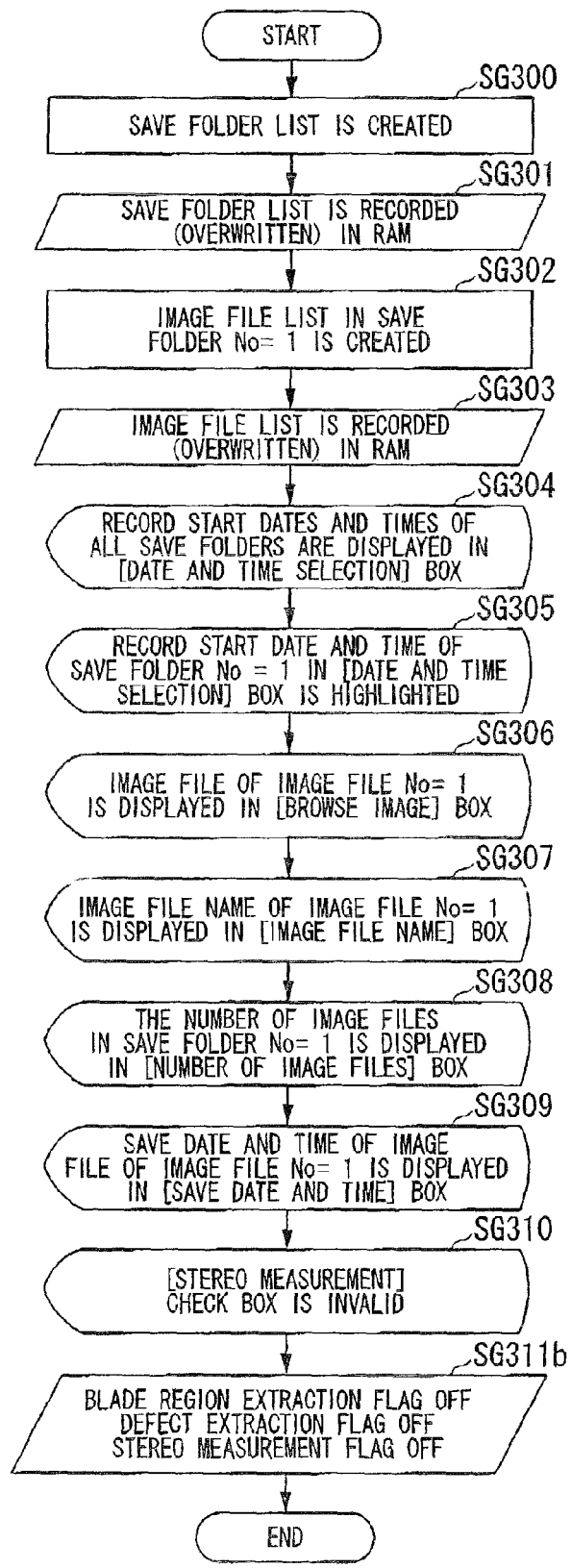
FIG. 48 is a flow chart showing the procedure of an operation based on blade recording software according to the third embodiment of the invention.

Next, the flow of initialization processing in step SG3b will be described with reference to FIG. 48. The contents of step SG311b shown in FIG. 48 are different from the contents of steps SG311 of the flow (FIG. 28) of operation of the blade recording software in the second embodiment. Hereinafter, the contents of step SG311b will be described.

In step SG311b, the CPU 34c sets a blade region extraction flag, a defect extraction flag, and a stereo measurement flag to OFF and records them in the RAM 34a. The blade region extraction flag is a flag indicating whether to perform blade region extraction. After the processing in step SG311b ends, the process proceeds to step SG4b.

Figure 49:
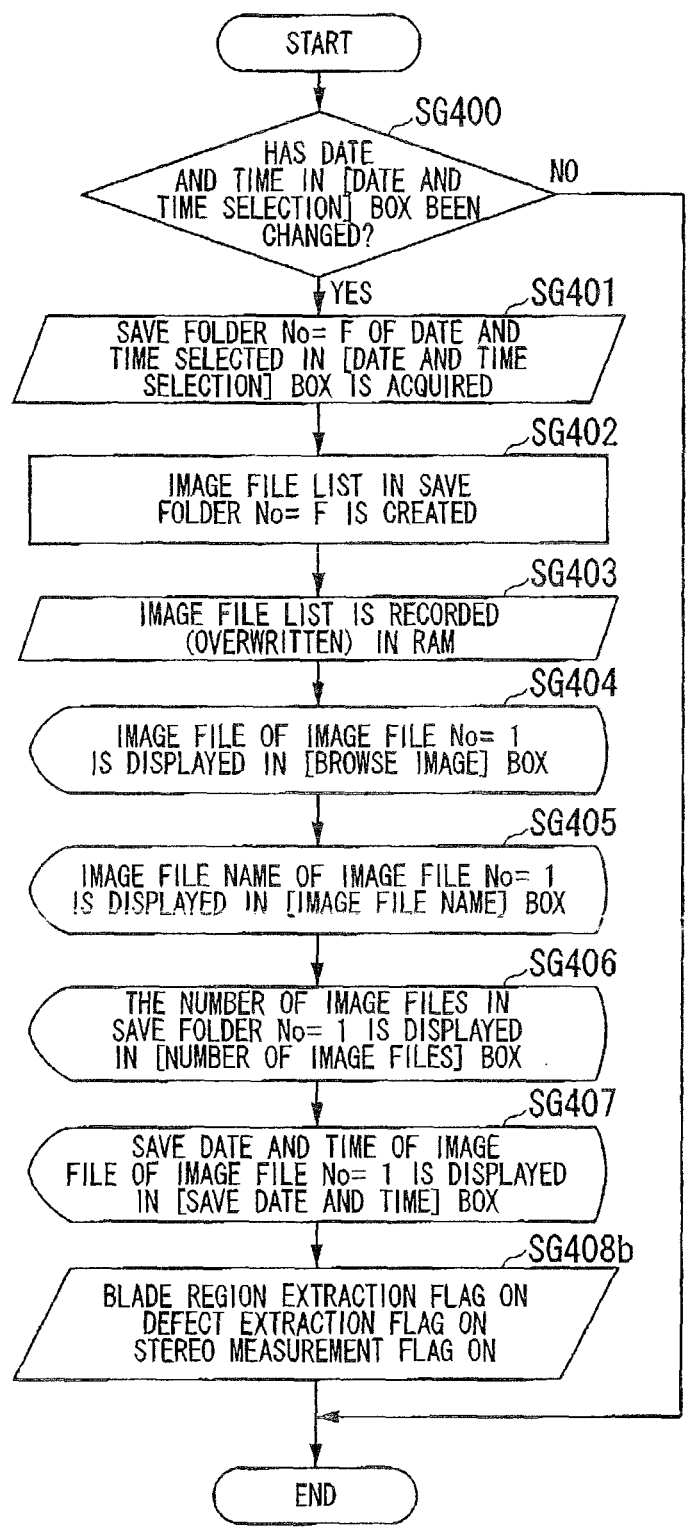
FIG. 49 is a flow chart showing the procedure of an operation based on blade recording software according to the third embodiment of the invention.

Next, the flow of date and time selection processing in step SG4b will be described with reference to FIG. 49. The contents of step SG408b shown in FIG. 49 are different from the contents of SG408 of the flow (FIG. 29) of operation of the blade recording software in the second embodiment. Hereinafter, the contents of step SG408b will be described.

In step SG408b, the CPU 34c sets a blade region extraction flag, a defect extraction flag, and a stereo measurement flag to ON and records them in the RAM 34a. After the processing in step SG408b ends, the process proceeds to step SG5b. The reason why the blade region extraction flag, the defect extraction flag, and the stereo measurement flag are set to ON in step SG408b is that if the selection of record start date and time of a [date and time selection] box is changed in step SG400, it is necessary to perform the blade region extraction processing, the defect extraction processing, and the stereo measurement processing again since the browse image is changed.

Figure 50:
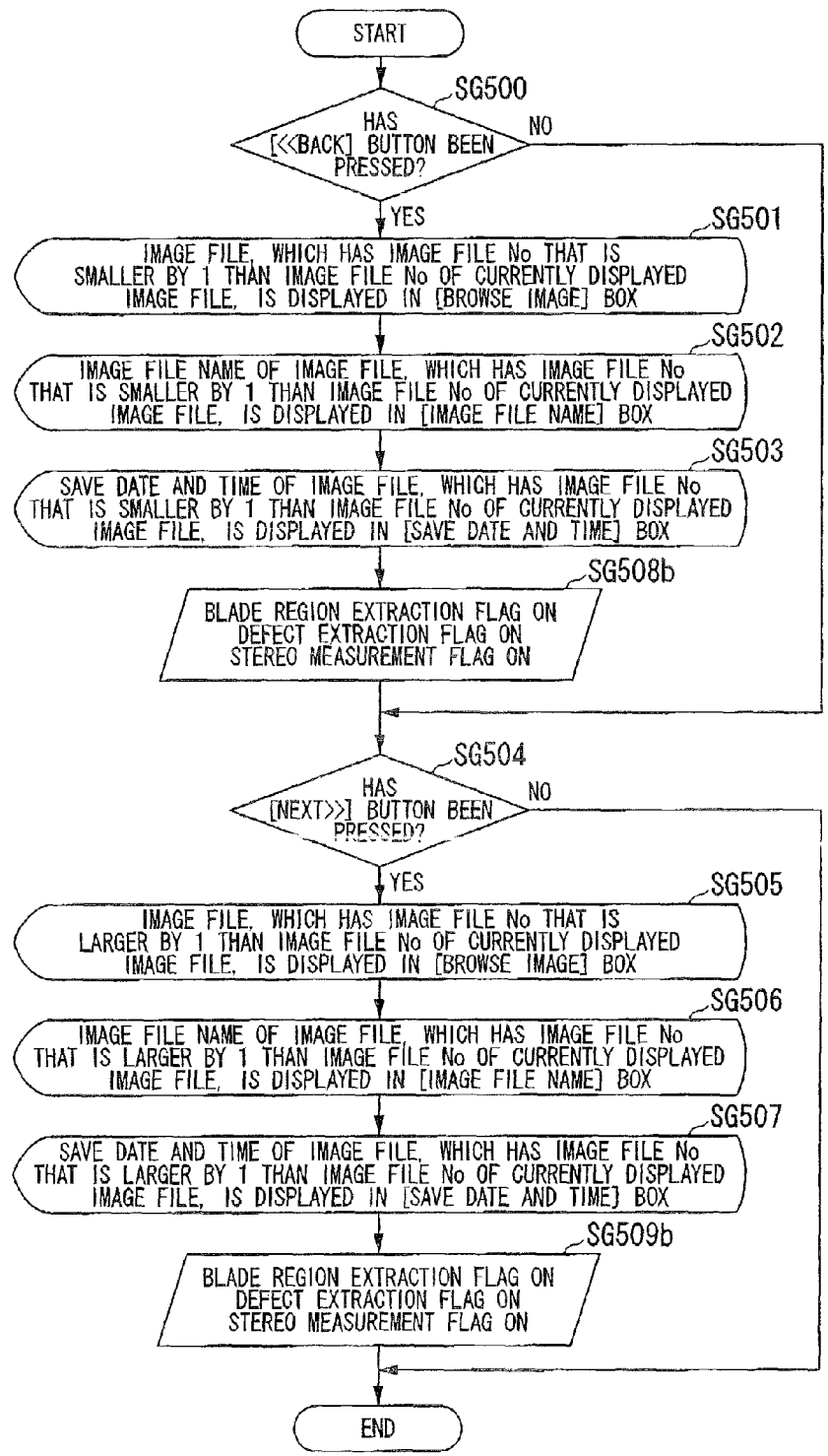
FIG. 50 is a flow chart showing the procedure of an operation based on blade recording software according to the third embodiment of the invention.

Next, the flow of image selection processing in step SG5b will be described with reference to FIG. 50. The contents of steps SG508b and SG509b shown in FIG. 50 are different from the contents of steps SG508 and SG509 of the flow (FIG. 30) of operation of the blade recording software in the second embodiment. Hereinafter, the contents of steps SG508b and SG509b will be described.

In step SG508b, the CPU 34c sets a blade region, extraction flag, a defect extraction flag, and a stereo measurement flag to ON and records them in the RAM 34a. In step SG509b, the CPU 34c sets the blade region extraction flag, the defect extraction flag, and the stereo measurement flag to ON and records them in the RAM 34a. After the processing in step SG509b ends, the process proceeds to step SG11.

The reason why the blade region extraction flag, the defect extraction flag, and the stereo measurement flag are set to ON in steps SG508b and SG509b is that if the [<<back] button and the [next>>] button are pressed in steps SG500 and SG504, it is necessary to perform the blade region extraction processing, the defect extraction processing, and the stereo measurement processing again since the browse image is changed.

Figure 51:
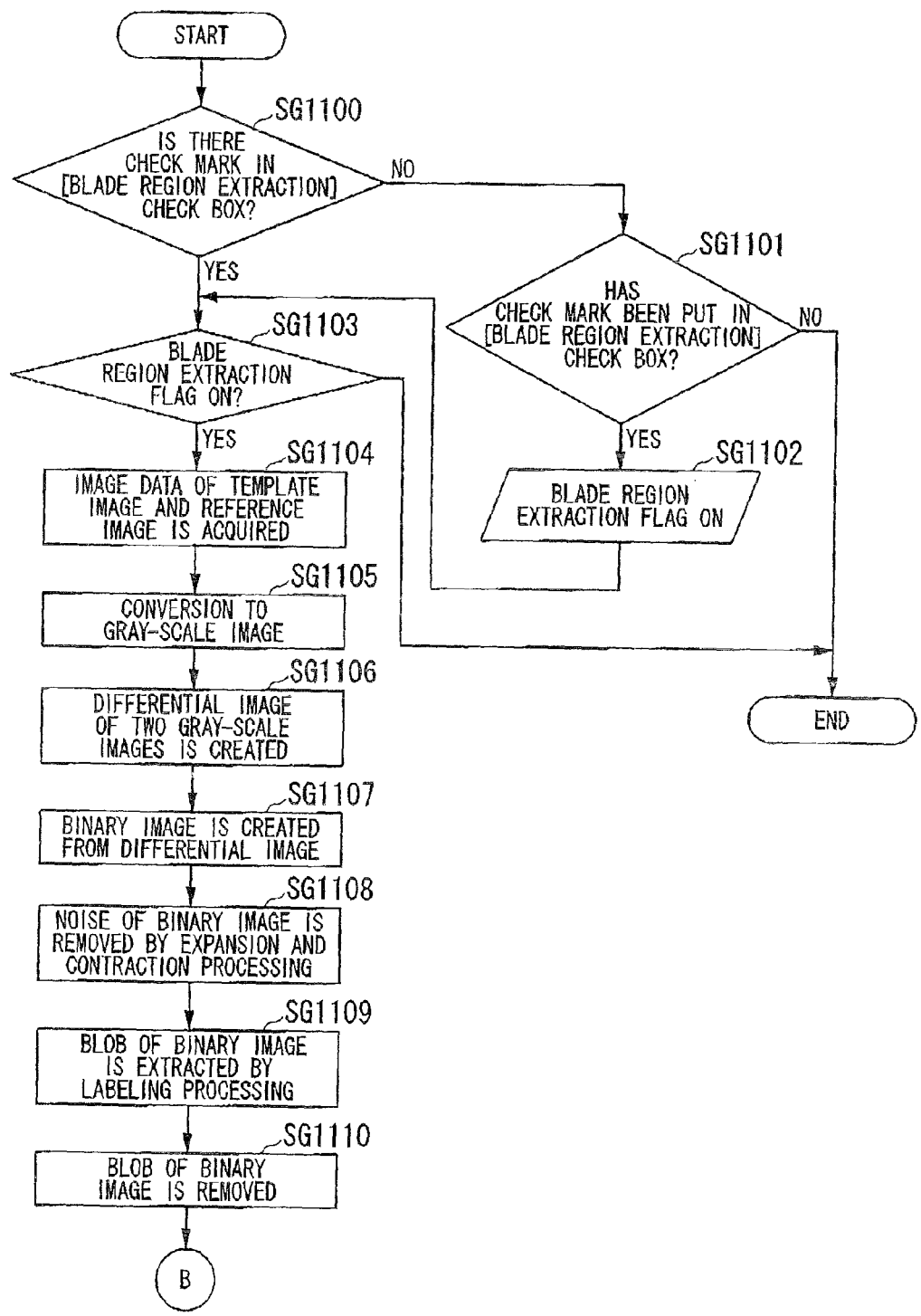
FIG. 51 is a flow chart showing the procedure of an operation based on blade recording software according to the third embodiment of the invention.
Figure 52:
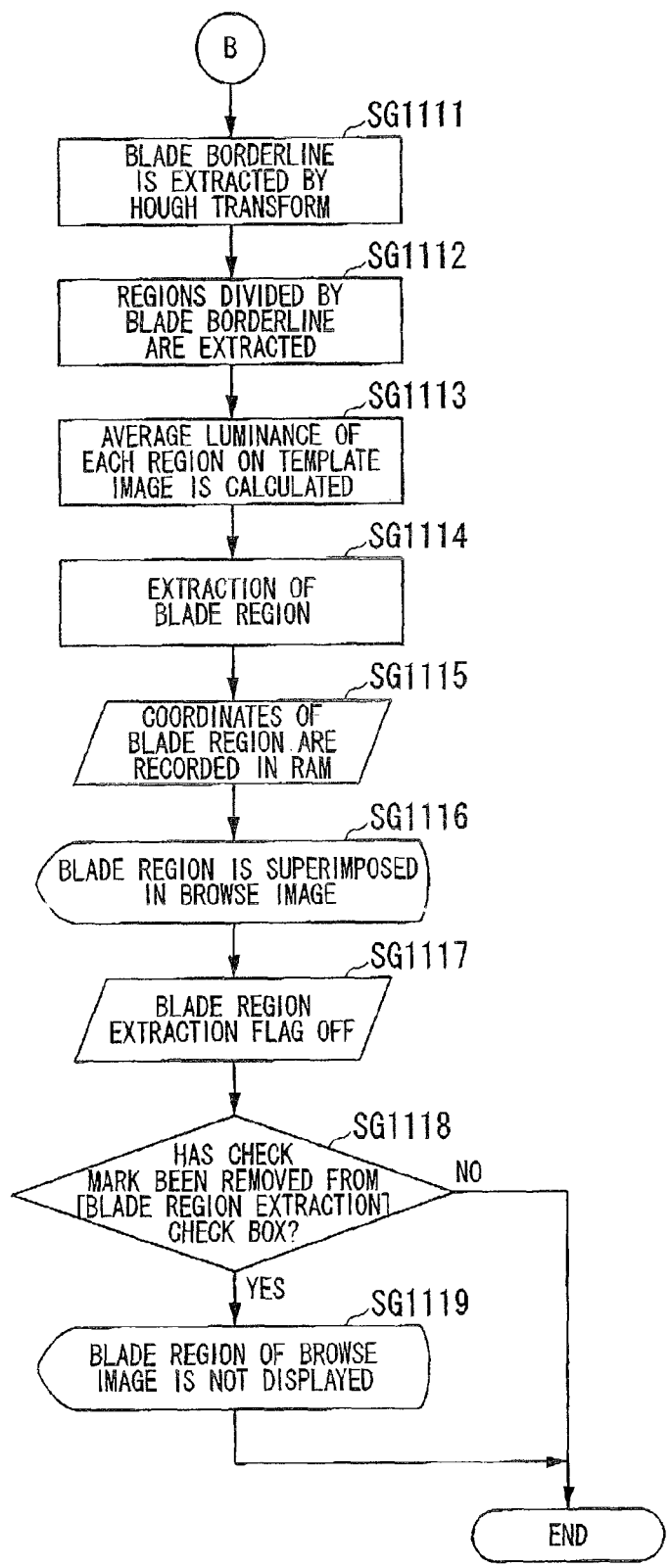
FIG. 52 is a flow chart showing the procedure of an operation based on blade recording software according to the third embodiment of the invention.

Next, the flow of blade region extraction processing in step SG11 will be described with reference to FIGS. 51 and 52. In step SG1100, the CPU 34c checks whether or not there is a check mark in the [blade region extraction] check box. If there is a check mark in the [blade region extraction] check box, the process proceeds to step SG1103. If there is no check mark in the [blade region extraction] check box, the process proceeds to step SG1101.

In step SG1101, the CPU 34c checks whether or not there has been an instruction from the user to put a check mark in the [blade region extraction] check box. If there has been an instruction to put a check mark in the [blade region extraction] check box, the process proceeds to step SG1102. If there is no instruction to put a check mark in the [blade region extraction] check box, the process proceeds to step SG8b.

In step SG1102, the CPU 34c sets the blade region extraction flag to ON and records it in the RAM 34a. In addition, the CPU 34c performs a processing of putting a check mark in the [blade region extraction] check box.

In step SG1103, the CPU 34c checks whether or not the blade region extraction flag is ON. If the blade region extraction flag is ON, the process proceeds to step SG1104. If the blade region extraction flag is OFF, the process proceeds to step SG8b.

Hereinafter, FIGS. 53 and 54 will also be used appropriately to describe steps SG1104 to SG1116. In step SG1104, the CPU 34c acquires the image data of the template image file and the reference image file saved in a save folder and records them in the RAM 34a. The image data refers to the RGB luminance value of each pixel of an image.

In step SG1105, the CPU 34c converts into gray-scale images the image data of two sheets acquired in step SG1104. The luminance value Y of each pixel of the gray-scale image is calculated from the RGB luminance value of each pixel of image data using the following expression (9).

$$Y0.299 \times R + 0.587 \times G + 0.114 \times B \quad (9)$$

In step SG1106, the CPU 34c creates an image (hereinafter, described as a differential image) corresponding to the difference between the two gray-scale images created in step SG1105. FIG. 53 shows a situation where a differential image 5310 is created by taking a difference between a gray-scale image 5300 of a template image and a gray-scale image 5301 of a reference image. Since the template image and the reference image deviate from each other by one frame, a difference is extracted in the boundary of a blade region as shown in FIG. 53. The operation of taking the difference between the gray-scale image 5300 of the template image and the gray-scale image 5301 of the reference image, that is, an operation of taking a difference between a template image and a reference image is performed by a second difference extracting section $34c_g$ of the CPU 34c.

In step SG1107, the CPU 34c creates a binary image by binarizing the differential image on the basis of a predetermined threshold value. FIG. 53 shows a situation where a binary image 5320 is created by binarizing the differential image 5310.

In step SG1108, the CPU 34c removes a small noise by performing expansion and contraction processing on the created binary image. In step SG1109, the CPU 34c extracts a blob (particle) by performing labeling processing on the binary image from which noise was removed in step SG1108. In step SG1110, the CPU 34c removes a blob with an area, which is smaller than a predetermined area, from the image from which noise was removed in step SG1108. FIG. 53 shows a situation where a small blob is removed from the binary image 5320.

In step SG1111, the CPU 34c extracts a straight line by performing Hough transform on the binary image from which a small blob was removed in step SG1110. In this case, the extracted straight line is assumed to be a blade borderline. FIG. 54 shows a situation where a blade borderline 5400 is extracted.

In step SG1112, the CPU 34c extracts a plurality of regions divided by a blade borderline. FIG. 54 shows a situation where a plurality of regions A to I divided by the blade borderline 5400 are extracted. The regions A to I are located in a line in order of regions adjacent to each other.

In step SG1113, the CPU 34c calculates the average luminance of each region, which was extracted in step SG1112, on the template image. FIG. 55 shows a graph of the average luminance of regions A to I. From this graph, it can be seen that a region with a high average luminance and a region with a low average luminance appear alternately. This is because a blade region with high luminance and a background region with low luminance are alternately located in a line like the browse image 5410 shown in FIG. 54. Only a blade region can be extracted using this relationship.

In step SG1114, the CPU 34c extracts a blade region on the basis of the average luminance of each region calculated in step SG1113. For example, the CPU 34c compares the luminance of two regions adjacent to each other and sets a region with higher luminance as a blade region and a region with lower luminance as a background region. The CPU 34c determines whether a corresponding region is a blade region or a background region while shifting two adjacent regions. Thus, the operation of extracting (detecting) a blade region on the basis of the difference between the template image and the reference image is performed by a detecting section $34c_9$ of the CPU 34c.

In step SG1115, the CPU 34c records the coordinates of the blade region extracted in step SG1114 in the RAM 34a. The coordinates of the blade region are coordinates of a representative point among the points which form the blade region, for example. In this case, the coordinates of the blade region recorded in the RAM 34a are overwritten whenever a blade region is extracted. FIG. 54 shows a situation where a blade region 5430 is extracted from a browse image 5420.

In step SG1116, the CPU 34c performs a processing of superimposing the blade region on the browse image on the basis of the coordinates of the blade region recorded in the RAM 34a. FIG. 54 shows a situation where a blade region 5450 is superimposed on a browse image 5440. The blade region may be superimposed as shown in FIG. 54, or a line showing a blade region may be superimposed.

In step SG1117, the CPU 34c sets the blade region extraction flag to OFF and records it in the RAM 34a. In step SG1118, the CPU 34c checks whether or not there has been an instruction from the user to remove a check mark from the [blade region extraction] check box. If there has been an instruction to remove a check mark from the [blade region extraction] check box, the process proceeds to step SG1119. If there is no instruction to remove a check mark from the [blade region extraction] check box, the process proceeds to step SG8b.

In step SG1119, the CPU 34c performs a processing of making the blade region, which is displayed on the browse image, not displayed on the basis of the coordinates of the blade region recorded in the RAM 34a in step SG1115. In addition, the CPU 34c performs a processing of removing a check mark from the [blade region extraction] check box. After the processing in step SG1119 ends, the process proceeds to step SG8b.

Figure 56:
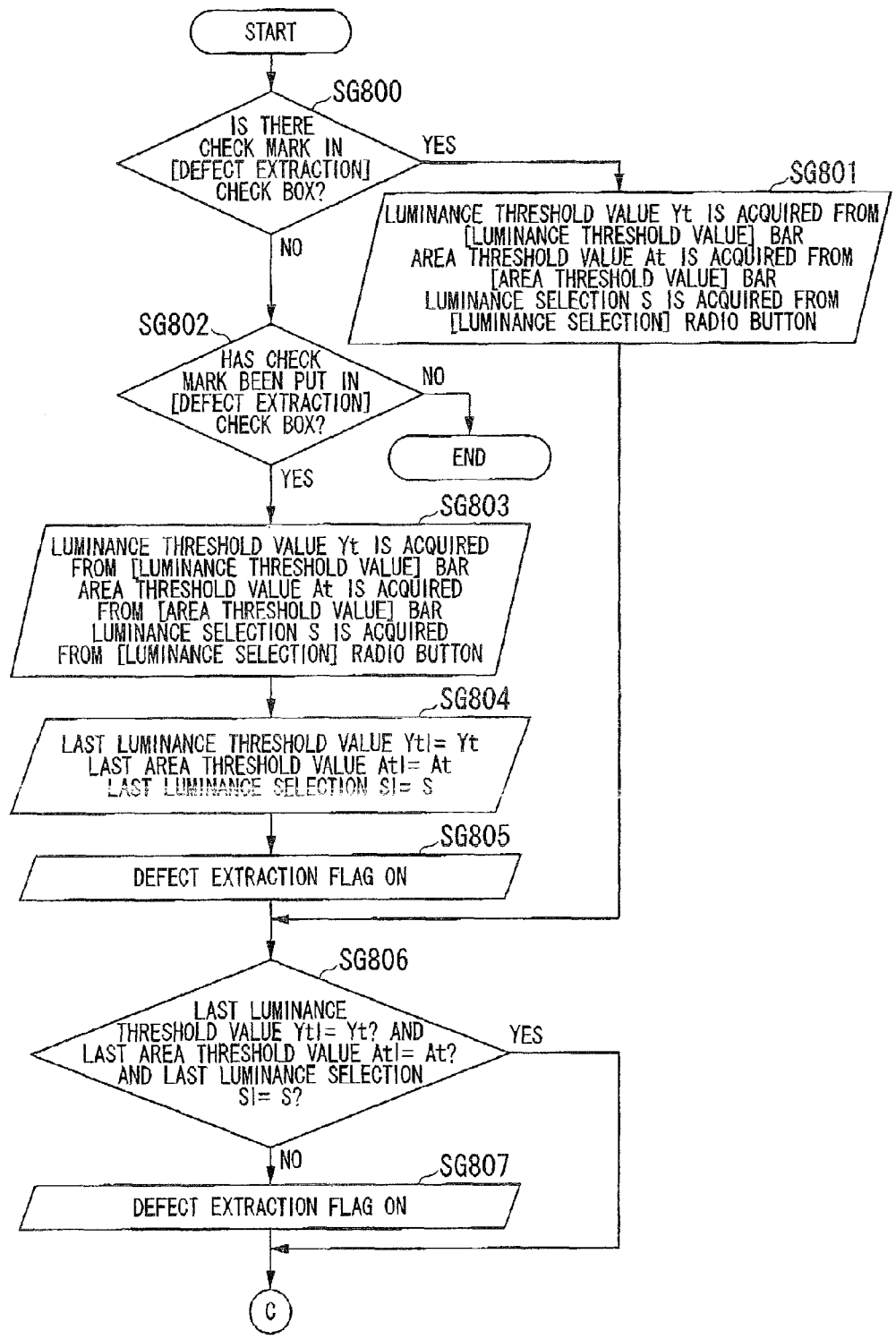
FIG. 56 is a flow chart showing the procedure of an operation based on blade recording software according to the third embodiment of the invention.
Figure 57:
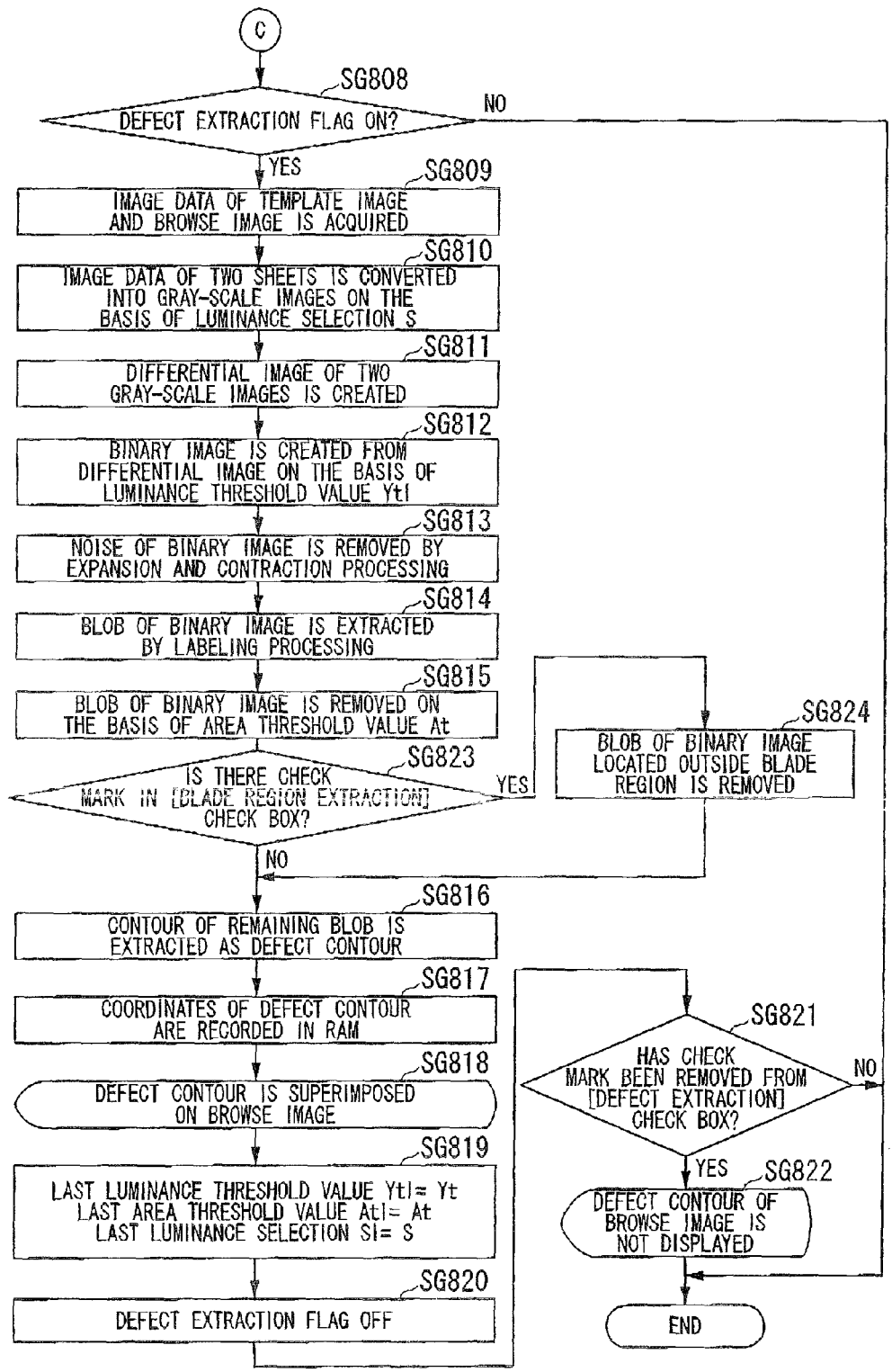
FIG. 57 is a flow chart showing the procedure of an operation based on blade recording software according to the third embodiment of the invention.

Next, the flow of defect extraction processing in step SG8b will be described with reference to FIGS. 56 and 51. The point that steps SG823 and SG824 are added between steps SG815 and SG816 shown in FIG. 57 is different from the flow (FIGS. 31 and 32) of the defect extraction processing in the second embodiment. Hereinafter, the contents of steps SG823 and SG824 will be described.

In step SG823, the CPU 34c checks whether or not there is a check mark in the [blade region extraction] check box. If there is a check mark in the [blade region extraction] check box, the process proceeds to step SG824. If there is no check mark in the [blade region extraction] check box, the process proceeds to step SG816.

In step SG824, the CPU 34c removes a blob located outside the blade region on the basis of the coordinates of the blade region recorded in the RAM 34a in step SG1115. Accordingly, in step SG816 performed subsequent to step SG824, the defect contour within the blade region is extracted. This operation, that is an operation for determining whether or not the defect is within the blade region of the blade image, is performed by a defect position determining section $34c_{10}$ of the CPU 34c.

In the present embodiment, a browse image obtained by imaging using an optical adapter other than a stereo optical adapter is used. However, a browse image obtained by imaging using the stereo optical adapter may also be used. By using the browse image obtained by imaging using the stereo optical adapter, a defect of the blade region can be measured by defect designation processing in step SG-10.

Moreover, in the present embodiment, a blade region extracted by blade region extraction processing is displayed on the browse image 4402 as shown in FIG. 45. However, the display mode of a blade region is not limited if the position of the blade region can be specified. For example, a figure, such as an arrow, may be displayed at the position corresponding to the blade region or a phrase, such as "blade", may be displayed.

According to the present embodiment, when a user browses a record image file, a blade region can be extracted and only a defect in the blade region can be extracted. According to the invention, an image of blades can be acquired by a simple method without requiring a special control for matching the rotation of blades with the imaging timing by selecting some images from the images, which are obtained by imaging the blades, on the basis of a result of image comparison with the template image. A defect of a blade can be detected regardless of the kind of defect by extracting the difference between the template image and the image acquired as described above. In addition, according to the invention, a blade region within a blade image can be detected.

In addition, in accordance with the above-described embodiments, it is possible to have the following image processing method. The image processing method includes; a step of extracting a template image from blade images obtained by capturing blades periodically arrayed in a jet engine; a step of comparing the template image with the blade images; a step of selecting an image from the blade images based on a result of the image comparison in the comparing step, and a step of extracting a difference between the template image and the image selected in the selecting step. The image processing method also includes: a step of extracting a reference image, which is distant by a predetermined number of frames from the template image, from the blade images; a step of extracting a difference between the template image and the reference image; and a step of detecting a blade region based on the difference extracted in the difference extracting step.

While the embodiments of the invention have been described in detail with reference to the accompanying drawings, the specific configuration is not limited to the above-described embodiments but a design change and the like within the scope without departing from the subject matter of the invention are also included.

What is claimed is:
1. An endoscope, comprising:
an imaging element disposed at a distal end of the endoscope that obtains images through a stereo optical adapter;
a template image extracting unit comprising hardware that extracts a template image from blade images obtained by the imaging element by capturing blades periodically arrayed in a jet engine;
an image comparing unit comprising hardware that compares the template image with the blade images;
an image selecting unit comprising hardware that selects an image from the blade images based on a result of the image comparison of the image comparing unit;
a first difference extracting unit comprising hardware that extracts a plurality of differences between the template image and the image selected by the image selecting unit;
a measurement unit comprising hardware that executes measurement based on an image corresponding to the position of one of the plurality of differences extracted by the first difference extracting unit; and
an input unit comprising hardware to which an instruction by a user to select one of the plurality of differences extracted by the first difference extracting unit is input;
wherein the measurement unit executes, based on an image corresponding to the position of the difference indicated by the instruction input by the user to the input unit, stereo measurement using environmental data for correcting optical distortion of the stereo optical adapter to display a result of the measurement based on the environmental data.

2. The endoscope according to claim 1, further comprising:
a display unit that displays information on the image selected by the image selecting unit, wherein
the information indicates at least one of the differences extracted by the first difference extracting unit.
3. The endoscope according to claim 1,
wherein each of the blade images includes a plurality of subject images regarding the same subject, and
the measurement unit sets a measurement point at the position, which corresponds to the difference indicated by the instruction input by the user, on one subject image included in the image selected by the image selecting unit, calculates a matching point corresponding to the measurement point on another subject image included in the image selected by the image selecting unit, and executes measurement based on the measurement point and the matching point.
4. The endoscope according to claim 1, further comprising:
a reference image extracting unit that extracts a reference image, which is distant by a predetermined number of frames from the template image, from the blade images;
a second difference extracting unit that extracts a difference between the template image and the reference image; and
a detecting unit that detects a blade region based on the difference extracted by the second difference extracting unit.
5. The endoscope according to claim 4, further comprising:
a display unit that displays information on the image selected by the image selecting unit, wherein
the information indicates at least one of the differences extracted by the first difference extracting unit and the blade region.
6. The endoscope according to claim 5, further comprising:
a defect position determining unit that determines whether or not the difference indicated by the instruction input by the user, as a defect, is within the blade region, wherein
the information indicates the defect determined to be within the blade region by the defect position determining unit.

* * * * *